(12) United States Patent
Gurtin et al.

(10) Patent No.: US 11,714,626 B2
(45) Date of Patent: *Aug. 1, 2023

(54) METHOD, APPARATUS, AND COMPUTER PROGRAM PRODUCT FOR INSTALLING THIRD PARTY APPLICATIONS REQUIRING VARIABLE HOST ADDRESS IDENTIFICATION IN A GROUP-BASED COMMUNICATION SYSTEM

(71) Applicant: Slack Technologies, LLC, San Francisco, CA (US)

(72) Inventors: Liza Gurtin, San Francisco, CA (US); Sachin Ranchod, San Francisco, CA (US); Elizabeth Catherine Harrigan, San Francisco, CA (US); Jammie Mountz, San Francisco, CA (US); John Agan, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,391

(22) Filed: May 31, 2022

(65) Prior Publication Data
US 2022/0291912 A1  Sep. 15, 2022

Related U.S. Application Data

(63) Continuation of application No. 16/685,417, filed on Nov. 15, 2019, now Pat. No. 11,360,754, which is a
(Continued)

(51) Int. Cl.
*G06F 8/61* (2018.01)
*H04L 9/40* (2022.01)
(Continued)

(52) U.S. Cl.
CPC ............... *G06F 8/61* (2013.01); *G06F 9/547* (2013.01); *H04L 63/0876* (2013.01);
(Continued)

(58) Field of Classification Search
None
See application file for complete search history.

(56) References Cited

U.S. PATENT DOCUMENTS 6,725,453 B1 * 4/2004 Lucas ................ G06F 8/65
717/173
6,865,737 B1 * 3/2005 Lucas ................ G06F 8/61
717/178

(Continued)

OTHER PUBLICATIONS

"Die, Email, Die! A Flickr Cofounder Aims to Cut Us all Some Slack", Readwriteweb, LexisNexis, https://advancelexis.com/api/permalink/33dd79e2-90f5-409d-ae27-5a2c7e86bf31/?context=1000516>. (dated Aug. 14, 2013) 2 pages.
(Continued)

*Primary Examiner* — Qing Chen
(74) *Attorney, Agent, or Firm* — Erise IP, P.A.

(57) ABSTRACT

Embodiments of the present disclosure provide methods, systems, apparatuses, and computer program products that provide for an improved and more efficient system of networked computing devices. The embodiments disclose an apparatus and system that enable client devices to install integrations of a third party application that supports variable host address identification. The apparatus and methods further enable a user of the client device to modify the host address identification associated with an installed integration. In this manner, the group-based communication system establishes communication links with network locations that vary from integration to integration and that may vary over time. To implement the invention, the group-based communication system supports the creation of a blueprint appli-
(Continued)

cation, with an associated blueprint row that serves as the basis from which a plurality of differing integrations are generated. Further, the blueprint row stores variable host address identifications. The reduced number of data structures that result from supporting variable host address identifications increases system efficiency and reduces infrastructure requirements.

20 Claims, 33 Drawing Sheets

Related U.S. Application Data continuation of application No. 15/977,799, filed on May 11, 2018, now Pat. No. 10,592,225.

(51) Int. Cl.
    H04L 67/00      (2022.01)
    G06F 9/54       (2006.01)
    H04L 67/01      (2022.01)
    H04L 67/53      (2022.01)

(52) U.S. Cl.
    CPC .............. H04L 67/01 (2022.05); H04L 67/34 (2013.01); H04L 67/53 (2022.05)

(56) References Cited

U.S. PATENT DOCUMENTS

| | | | | |
|---|---|---|---|---|
| 2005/0198387 A1* | 9/2005 | Willis | .................. | H04L 61/2525 709/227 |
| 2015/0242204 A1* | 8/2015 | Hassine | .............. | H04L 41/0866 717/121 |
| 2018/0157468 A1* | 6/2018 | Stachura | .................... | G06F 8/34 |
| 2018/0287982 A1 | 10/2018 | Draeger et al. | | |
| 2019/0190863 A1* | 6/2019 | Baker | .................. | H04L 63/101 |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014), 2 pages.
Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, is Valued at $1.1 Billion", The New York Times Blogs (BITS), LexisNexis, https://advancelexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

6000

8000

FIG. 9A
FIG. 9B
FIG. 9C
FIG. 9D

APP CREDENTIALS
THESE CREDENTIALS ALLOW YOUR APP TO ACCESS THE SLACK, API. THEY ARE SECRET. PLEASE DON'T SHARE YOUR APP CREDENTIALS WITH ANYONE, INCLUDE THEM IN PUBLIC CODE REPOSITORIES, OR STORE THEM IN INSECURE WAYS.

CLIENT ID
`303006767410.332966172880`

CLIENT SECRET
`••••••••••` [SHOW] [REGENERATE]

YOU'LL NEED TO SEND THIS SECRET ALONG WITH YOUR CLIENT ID WHEN MAKING YOUR OAUTH.ACCESS REQUEST

VERIFICATION TOKEN
`TZrWuUDMwcCDYI90ki7aDSY3` [REGENERATE]

FOR INTERACTIVE MESSAGES AND EVENTS, USE THIS TOKEN TO VERITY THAT REQUESTS ARE ACTUALLY COMING FROM SLACK, SLASH COMMANDS AND INTERACTIVE MESSGES BOTH WILL USE THIS VERIFICATION TOKEN.

DISPLAY INFORMATION
THIS INFORMATION WILL BE SHOWN IN THE SLACK APP DIRECTORY AND IN THE SLACK APP FOR MORE INFORMATION, VIEW OUR APP DETAIL GUIDELINES.

APP NAME | SHORT DESCRIPTION
`SUPER SERVICE` | `ADD A SHORT DESCRIPTION...`

APP ICON& PREVIEW | BACKGROUND COLOR
SUPER SERVICE | ☐ #2C2D3D

[DISCARD CHANGES] [SAVE CHANGES]

*FIG. 10B*

DELETE APP
IF YOUR APP IS LISTED IN THE APP DIRECTORY, PLEASE COMMUNICATE ANY PLANS TO DEPRECATE IT TO YOUR USERS, AND BE PREPARED TO RESPOND TO QUESTIONS AND SUPPORT REQUESTS AFTER DELETING IT. YOUR APP HAS 0 AUTHED USERS.

[DELETE APP]

[DISCARD CHANGES] [SAVE CHANGES]

*FIG. 10C*

CREATE NEW COMMAND

13100

COMMAND: /COMMAND

REQUEST URL: HTTPS://EXAMPLE.COM/SLASH/COMMAND

SHORT DESCRIPTION: LAUNCHES THE ROCKET!

USAGE HINT: [WHICH ROCKET TO LAUNCH]
OPTIONALLY LIST ANY PARAMETERS THAT CAN BE PASSED

☐ ESCAPE CHANNELS, USER, AND LINKS SENT TO YOUR APP
UNESCAPED: @USER #GENERAL

PREVIEW OF AUTOCOMPLETE ENTRY

COMMANDS MATCHING "COMMAND"
SUPER SERVICE
/COMMAND (WHICH ROCKET TO LAUNCH)   LAUNCH THE ROCKET!

[+] [/COMMAND]

☐ SUPER SERVICE ▾

SETTINGS
BASIC INFORMATION
COLLABORATORS
INSTALL APP
MANAGE DISTRIBUTION

FEATURES
INCOMING WEBHOOKS
INTERACTIVE COMPONENTS
SLASH COMMANDS
OAUTH & PERMISSIONS
EVENT SUBSCRIPTIONS
BOT USERS
USER ID TRANSLATION

SLACK •
HELP
CONTACT
POLICIES
OUR BLOG

SLASH COMMANDS

COMMANDS ENABLE USERS TO INTERACT WITH YOUR APP FROM WITHIN SLACK. LEARN MORE.

NAME          DESCRIPTION
/COMMAND     LAUNCHES THE ROCKET!

CREATE NEW COMMAND

FIG. 12B

INCOMING WEBHOOKS

ACTIVATE INCOMING WEBHOOKS     ON ◯

INCOMING WEBHOOKS ARE A SIMPLE WAY TO POST MESSAGES FROM EXTERNAL SOURCES INTO SLACK. THEY MAKE USE OF NORMAL HTTP REQUESTS WITH A JSON PAYLOAD, WHICH INCLUDES THE MESSAGE AND A FEW OTHER OPTIONAL DETAILS. YOU CAN INCLUDE MESSAGE ATTACHMENTS TO DISPLAY RICHLY-FORMATTED MESSAGES.

EACH TIME YOUR APP IS INSTALLED, A NEW WEBHOOK URL WILL BE GENERATED.

IF YOU DEACTIVATE INCOMING WEBHOOKS, NEW WEBHOOK URLS WILL NOT BE GENERATED WHEN YOUR APP IS INSTALLED TO YOUR TEAM. IF YOU'D LIKE TO REMOVE ACCESS TO EXISTING WEBHOOK URLS, YOU WILL NEED TO REVOKE ALL OAUTH TOKENS.

---

WEBHOOK URLS FOR YOUR WORKSPACE

TO DISPATCH MESSAGES WITH YOUR WEBHOOK URL, SEND YOUR MESSAGE IN JSON AS THE BODY OF AN APPLICATION/JSON POST REQUEST.

ADD THIS WEBHOOK TO YOUR WORKSPACE BELOW TO ACTIVATE THIS CURL EXAMPLE.

SAMPLE CURL REQUEST TO POST TO A CHANNEL:

```
curl -X POST -H 'CONTENT-TYPE: APPLICATION/JSON' — DATA '{"TEXT":"HELLO, WORLD! "}' YOUR_WEBHOOK_URL_HERE
```

| WEBHOOK URL | CHANNEL | ADDED BY |
|---|---|---|

NO WEBHOOKS HAVE BEEN ADDED YET.

[ ADD NEW WEBHOOK TO WORKSPACE ]

*FIG. 12C*

INTERACTIVE COMPONENTS

ANY INTERACTIONS WITH MESSAGE BUTTONS, MENUS, OR DIALOGS WILL BE SENT TO A URL YOU SPECIFY. LEARN MORE.

REQUEST URL

HTTPS://MY.APP.COM/SLACK/ACTION-ENDPOINT

WE'LL SEND AN HTTP POST REQUEST WITH INFORMATION TO THIS URL WHEN USERS INTERACT WITH A COMPONENT (LIKE A BUTTON OR DIALOG).

OPTIONS LOAD URL (FOR MESSAGE MENUS)

HTTPS://MY.APP.COM/SLACK/OPTIONS-LOAD-ENDPOINT

FOR MESSAGE MENU ACTIONS WITH "DATA_SOURCE":"EXTERNAL" WE'LL SEND AN HTTP POST REQUEST WITH INFORMATION TO LOAD OPTIONS FROM THIS URL WHEN USERS INVOKE MESSAGE MENUS.

ENABLE INTERACTIVE COMPONETS

FIG. 12D

EVENT SUBSCRIPTIONS

ENABLE EVENTS ON

YOUR APP CAN SUBSCRIBE TO BE NOTIFIED OF EVENTS IN SLACK (FOR EXAMPLE, WHEN A USER ADDS A REACTION OR CREATES A FILE) AT A URL YOU CHOOSE. LEARN MORE.

REQUEST URL

HTTPS://MY.APP.COM/SLACK/ACTION-ENDPOINT

WE'LL SEND HTTP POST REQUESTS TO THIS URL WHEN EVENTS OCCUR. AS SOON AS YOU ENTER A URL, WE'LL SEND A REQUEST WITH A CHALLENGE PARAMETER, AND YOUR ENDPOINT MUST RESPOND WITH THE CHALLENGE VALUE. LEARN MORE.

SUBSCRIBE TO WORKSPACE EVENTS

TO SUBSCRIBE TO AN EVENT, YOUR APP MUST HAVE ACCESS TO THE RELATED OAUTH PERMISSION SCOPE.

| EVENT NAME | DESCRIPTION | REQUIRED SCOPE |
|---|---|---|

NO EVENTS ADDED YET.

ADD WORKSPACE EVENT

SUBSCRIBE TO BOT EVENTS

BOT USERS CAN SUBSCRIBE TO EVENTS RELATED TO THE CHANNELS AND CONVERSATIONS THEY'RE PART OF. ADD A BOT USER TO YOUR APP TO SUBSCRIBE TO BOT EVENTS.

APP UNFURL DOMAINS

YOUR APP CAN BE NOTIFIED WHEN USERS POST LINKS FROM UP 5 DOMAINS. THIS REQUIRES THE LINKS:READ SCOPE AND A SUBSCRIPTION TO THE LINK_SHARED EVENT.

YOU'LL RECEIVE EVENTS FOR ANY SUBDOMAIN, OR PATH OF THE SELECTED DOMAINS OR HOSTS. PORTS ARE IGNORED, SO REQUESTS ON ANY PORT WILL TRIGGER AN EVENT. USING IP ADDRESSES IS NOT ALLOWED. LEARN MORE.

ADD DOMAIN

DISCARD CHANGES  SAVE CHANGES

*FIG. 12E*

OAUTH & PERMISSIONS

OAUTH TOKENS & REDIRECT URLS

TOKENS FOR YOUR WORKSPACE

THESE TOKENS WERE AUTOMATICALLY GENERATED WHEN YOU INSTALLED THE APP TO YOUR TEAM. YOU CAN USE THESE TO AUTHENTICATE YOUR APP. LEARN MORE

OAUTH ACCESS TOKEN

| XXXP-3033676７410-30406458429５-33355639705９-0F38047C273121７0B5730699 | COPY |

[REINSTALL APP]

REDIRECT URLS

YOU WILL NEED TO CONFIGURE REDIRECT URLS IN ORDER TO AUTOMATICALLY GENERATE THE ADD TO SLACK BUTTON OR TO DISTRIBUTE YOUR APP. IF YOU PASS A URL IN AN OAUTH REQUEST, IT MUST (PARTIALLY) MATCH ONE OF THE URLS YOU ENTER HERE. LEARN MORE

REDIRECT URLS

REDIRECTURL.COM

[ADD A NEW REDIRECT URL]

[SAVE URLS]

SCOPES

SCOPES DEFINE THE API METHODS THIS APP IS ALLOWED TO CALL, AND THUS WHICH INFORMATION AND CAPABILITIES ARE AVAILABLE ON A WORKSPACE IT'S INSTALLED ON. MANY SCOPES ARE RESTRICTED TO SPECIFIC RESOURCES LIKE CHANNELS OR FILES.

IF YOUR APP IS SUBMITTED TO THE SLACK APP DIRECTORY, WE'LL REVIEW YOUR REASONS FOR REQUESTING EACH SCOPE. AFTER YOUR APP IS LISTED IN THE DIRECTORY, IT WILL ONLY BE ABLE TO USE PERMISSION SCOPES SLACK HAS APPROVED

SELECT PERMISSION SCOPES

| ADD PERMISSION BY SCOPE OR API METHOD... ▶ |

OTHER

ADD COMMANDS TO MY TEST COMPANY
COMMANDS

POST TO SPECIFIC CHANNELS IN SLACK
INCOMING-WEBHOOK

[SAVE CHANGES]

*FIG. 12G*

BOT USER

YOU CAN BUNDLE A BOT USER WITH YOUR APP TO INTERACT WITH USERS IN A MORE CONVERSATIONAL MANNER. LEARN MORE ABOUT HOW BOT USERS WORK.

DISPLAY NAME

SUPER_SERVICE

NAMES MUST BE SHORTER THAN 80 CHARACTERS, AND CAN'T USE PUNCTUATION (OTHER THAN APOSTROPHES AND PERIODS).

DEFAULT USERNAME

SUPER_SERVICE

IF THIS USERNAME ISN'T AVAILABLE ON ANY WORKSPACE THAT TRIES TO INSTALL IT, WE WILL SLIGHTLY CHANGE IT TO MAKE IT WORK. USERNAMES MUST BE ALL LOWERCASE. THEY CANNOT BE LONGER THAN 21 CHARACTERS AND CAN ONLY CONTAIN LETTERS, NUMBERS, PERIODS, HYPHENS, AND UNDERSCORES.

ALWAYS SHOW MY BOT AS ONLINE   ◯ OFF

WHEN THIS OFF, SLACK AUTOMATICALLY DISPLAYS WHETHER YOUR BOT IS ONLINE BASED ON USAGE OF THE RTM API.

ADD BOT USER

FIG. 12H

PROVIDE THE SUFFIXES FOR THE FOLLOWING URL PATHS

INTERACTIVE MESSAGE REQUEST URL SUFFIX (E.G.,/API/SLACK/INTERACTIVE-MESSAGES)

[          ]

INTERACTIVE MESSAGE REQUEST URL SUFFIX (E.G.,/API/SLACK/INTERACTIVE-MESSAGES)

[          ]

SLASH COMMAND REQUEST URL SUFFIX FOR (E.G.,/API/SLACK/APPROVE)

[          ] /MYCOMMAND-APPROVE

[          ] /MYCOMMAND-PR-STATUS

OAUTH REDIRECT URL SUFFIX (E.G./AUTH/SLACK)

[          ]

EVENT API URL SUFFIX (E.G./API/SLACK/EVENTS

[          ]

[ CANCEL ]  [ CONFIRM ]  — 13101

FIG. 12K

☐ SLACK   APP DIRECTORY   🔍 SEARCH APP DIRECTORY   BROWSE  MANAGE  BUILD   ☐ ACME CORP ▾

BROWSE APPS > SERVICENOW > EDIT CONFIGURATION

☐ ACME CORP
ADDED BY CLAIRE LIU ON SEPTEMBER 7, 2017

CONNECT AN ACME CORP INSTANCE TO YOUR SLACK TEAM

WHEN YOU USE SLACK AND ACME COPR. TOGETHER, YOUR EMPLOYEES CAN START SERVICE FLOWS FROM SLACK, GET NOTIFIED WHEN ISSUES ARE UPDATED, AND GET WORK DONE SEAMLESSLY. IF YOU ARE NEW TO ACME CORP. AND SLACK, START HERE.

SETUP ACME CORP WITH SLACK

CUSTOMIZE NAME (OPTIONAL)
CHANGE THIS NAME THIS CONFIRGURATION WILL APPEAR AS.

[ACME CORP.]

CUSTOMIZE ICON (OPTIONAL)
CHANGE THE ICON THAT IS USED FOR THIS CONFIGURATION.

☐ UPLOAD AN IMAGE

16101

CONFIRM YOUR ACME CORP. WEB ADDRESS
THIS IS THE WEB ADDRESS YOU USE TO ACCESS YOUR SERVICENOW INSTANCE.

[HTTPS://]
THIS MAY LOOK LIKE ACME.SERVICENOW.COM OR SERVICENOW.ACME.COM

ADD YOUR SLACK CREDENTIALS TO ACME CORP
STEP 1: COPY THESE CREDENTIALS

```
[
'client_app' : 44852554851.1234568909.
'client_secret' : 98573d651eBfb18ab80F84fj5k2fdk4k.
'VERIFICTION_TOKEN' : BtOuiVjjGQUywXVu20KlnM19.
'app_template_id' : A730KBB32F.
'access_token' : xoxp-6050645600-6...".
"scope": "bot.commans.incomming-webhookk".
"user_id' "UD61H1BMX".
"team_name": "Your Team Name".
"team_id": "T061GASHN"
]
```

[COPY]

PASTE THESE CREDENTIALS ONTO OUR SERVICENOW SETTING PAGE.

STEP 2: ENTER THESE CREDENTIALS IN YOUR ACME CORP. SETTINGS.

16102

[CANCEL] [SAVE]

*FIG. 15*

| ☐ SLACK  APP DIRECTORY | 🔍 SEARCH APP DIRECTORY | BROWSE  MANAGE  BUILD  ☐ ACME CORP ▾ |

BROWSE APPS > SERVICENOW > EDIT CONFIGURATION

☐ ACME CORP
ADDED BY CLAIRE LIU ON SEPTEMBER 7, 2017

CONNECT AN ACME CORP INSTANCE TO YOUR SLACK TEAM

WHEN YOU USE SLACK AND ACME COPR. TOGETHER, YOUR EMPLOYEES CAN START SERVICE FLOWS FROM SLACK, GET NOTIFIED WHEN ISSUES ARE UPDATED, AND GET WORK DONE SEAMLESSLY. IF YOU ARE NEW TO ACME CORP. AND SLACK, START HERE.

⚠ WE WERE UNABLE TO CONNECT WITH YOUR ACME CORP ACCOUMNT
PLEASE CHANGE THAT YOU'VE ENTERED THE CORRECT ACME CORP WEB ADDRESS AND THAT YOU'VE ENTERED THE SLACK CONDENTIALS BELOW IN SERVICENOW.

SETUP ACME CORP WITH SLACK

CUSTOMIZE NAME (OPTIONAL)

CHANGE THIS NAME THIS CONFIRGURATION WILL APPEAR AS.

[ACME CORP.]

CUSTOMIZE ICON (OPTIONAL)
CHANGE THE ICON THAT IS USED FOR THIS CONFIGURATION.

[☐ UPLOAD AN IMAGE]

ADD YOUR ACME CORP WEB ADDRESS
THIS IS THE WEB ADDRESS YOU USE TO ACCESS YOUR SERVICENOW INSTANCE.

[HTTPS://COMPANYNAME.SERVICENOW.COM]
⚠ OOPS! THIS ADDRESS FAIL VERIFICATION    SHOW DETAILS

ADD YOUR SLACK CREDENTIALS TO ACME CORP
STEP 1: COPY THESE CREDENTIALS

```
[
'client_app' : 44852554851.1234568909.
'client_secret' : 98573d651e8fb18ab80F84fj5k2fdk4k.
'VERIFICTION_TOKEN' : BtOuiVjjGQUywXVu20KInM19.
'app_template_id' : A730KBB32F.
'access_token' : xoxp-6050645600-6...".
"scope": "bot.commans.incoming-webhookk".
"user_id" "UD61H1BMX".
"team_name": "Your Team Name".
"team_id": "T061GASHN"
]
]
```

| ⊘ COPIED TO YOUR CLIPBOARD | COPY |

STEP 2: ENTER THESE CREDENTIALS IN YOUR ACME CORP. SETTINGS.

GO TO OUR ACME CORP. SETTING PAGE AND PASTE YOUR COPIED CREDENTIALS.

[                              ]

[CANCEL]  [SAVE]

FIG. 16

| SLACK  APP DIRECTORY | 🔍 SEARCH APP DIRECTORY | BROWSE  MANAGE  BUILD  ☐ ACME CORP ▾ |

BROWSE APPS > SERVICENOW > EDIT CONFIGURATION

ACME CORP
ADDED BY CLAIRE LIU ON SEPTEMBER 7, 2017

CONNECT AN ACME CORP INSTANCE TO YOUR SLACK TEAM

WHEN YOU USE SLACK AND ACME COPR. TOGETHER, YOUR EMPLOYEES CAN START SERVICE FLOWS FROM SLACK, GET NOTIFIED WHEN ISSUES ARE UPDATED, AND GET WORK DONE SEAMLESSLY. IF YOU ARE NEW TO ACME CORP. AND SLACK, START HERE.

⚠ WE WERE UNABLE TO CONNECT WITH YOUR ACME CORP ACCOUMNT
   PLEASE CHANGE THAT YOU'VE ENTERED THE CORRECT ACME CORP WEB ADDRESS AND THAT YOU'VE ENTERED THE SLACK CONDENTIALS BELOW IN SERVICENOW.

SETUP ACME CORP WITH SLACK

CUSTOMIZE NAME (OPTIONAL)

CHANGE THIS NAME THIS CONFIRGURATION WILL APPEAR AS.

[ACME CORP.]

CUSTOMIZE ICON (OPTIONAL)
CHANGE THE ICON THAT IS USED FOR THIS CONFIGURATION.

[UPLOAD AN IMAGE]

ADD YOUR ACME CORP WEB ADDRESS
THIS IS THE WEB ADDRESS YOU USE TO ACCESS YOUR SERVICENOW INSTANCE.

[HTTPS://COMPANYNAME.SERVICENOW.COM]

⚠ OOPS! THIS ADDRESS FAIL VERIFICATION      HIDE DETAILS

WE SENT THE FOLLOWING HTTP REQUEST TO YOUR APP PAYLOAD URLS
⊘ HTTPS://COMPANYNAME.SERVICENOW.COM/COMMANDS
⊘ HTTPS://COMPANYNAME.SERVICENOW.COM/COMMANDS
⊘ HTTPS://COMPANYNAME.SERVICENOW.COM/ACTIONS
⚠ HTTPS://COMPANYNAME.SERVICENOW.COM/SUGGESTIONS
⚠ HTTPS://COMPANYNAME.SERVICENOW.COM/EVENTS

ADD YOUR SLACK CREDENTIALS TO ACME CORP
STEP 1: COPY THESE CREDENTIALS

```
[
'client_app' : 44852554851.1234568909.
'client_secret' : 98573d651e8fb18ab80F84fj5k2fdk4k.
'VERIFICTION_TOKEN' : BtOuiVjjGQUywXVu20KlnM19.
'app_template_id' : A730KBB32F.
'access_token' : xoxp-6050645600-6...".
"scope": "bot.commans.incomming-webhookk".
"user_id' "UD61H1BMX".
"team_name": "Your Team Name".
"team_id": "T061GASHN"
]
```

| ⊘ COPIED TO YOUR CLIPBOARD | COPY |

STEP 2: ENTER THESE CREDENTIALS IN YOUR ACME CORP. SETTINGS.

GO TO OUR ACME CORP. SETTING PAGE AND PASTE YOUR COPIED CREDENTIALS.

*FIG. 17*

☐ REMOVE ACME CORP FROM SLOTH CORP?

☐ I UNDERSTAND MEMBERS OF THE SLOTH CORP WORKSPACE WILL NO LONGER BE ABLE TO USE SERVICENOW.

☐ I UNDERSTAND ACME CORP WILL NO LONGER BE ABLE TO ACCESS 6 PUBLIC CHANNELS AND 7 OTHER PRIVATE CONVERSATIONS.

[ CANCEL ] [ REMOVE APP ]

*FIG. 20*

METHOD, APPARATUS, AND COMPUTER PROGRAM PRODUCT FOR INSTALLING THIRD PARTY APPLICATIONS REQUIRING VARIABLE HOST ADDRESS IDENTIFICATION IN A GROUP-BASED COMMUNICATION SYSTEM

CROSS-REFERENCE TO RELATED APPLICATIONS

The present application is a continuation of U.S. application Ser. No. 16/685,417, filed Nov. 15, 2019, entitled "METHOD, APPARATUS, AND COMPUTER PROGRAM PRODUCT FOR INSTALLING THIRD PARTY APPLICATIONS REQUIRING VARIABLE HOST ADDRESS IDENTIFICATION IN A GROUP-BASED COMMUNICATION SYSTEM," now U.S. Pat. No. 11,360,754, issued Jun. 14, 2022 ("the '754 Patent"). The '754 Patent is a continuation of U.S. application Ser. No. 15/977,799, filed May 11, 2018, entitled "METHOD, APPARATUS, AND COMPUTER PROGRAM PRODUCT FOR INSTALLING THIRD PARTY APPLICATIONS REQUIRING VARIABLE HOST ADDRESS IDENTIFICATION IN A GROUP-BASED COMMUNICATION SYSTEM," now U.S. Pat. No. 10,592,225, issued Mar. 17, 2020. The above-referenced patents are incorporated herein by reference in their entirety.

BACKGROUND

Various messaging systems may support communication and collaboration among users across an enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

Method, apparatus, and computer program product are provided to, in general, improve a group-based communication system. More specifically, embodiments provided herein may include an apparatus and method for integrating a third party application requiring variable host address identification in a group-based communication system. The group-based communication system includes a group-based communication server, a group-based communication repository, and a plurality of group-based communication channels. The apparatus and method also include at least one processor and at least one memory including a computer program code. The memory and the computer program code are configured to cause the apparatus to perform various steps. The apparatus and method include a group-based communication server that is configured to generate a blueprint row, where the blueprint row includes a third party application blueprint identifier and one or more templatized strings that include at least one placeholder. The group-based communication server is further configured to store the blueprint row in an application programming interface (API) applications table in the group-based communication repository. In response to receiving an installation request associated with a user, the group-based communication server is further configured to generate and transmit scope request interface data configured to cause a client device to render an interactive scope request interface. The interactive scope request interface enables user authorization of defined scopes by the third party application. The group-based communication server is further configured to receive a user scope definition object from the client device, which includes a user authorization of defined scopes by the third party application. In response to receiving the user scope definition object, the group-based communication server further generates and transmits a credentials set associated with the third party application and host address request interface data configured to cause the client device to render an interactive host address request interface. The interactive host address request interface is configured to enable user input of at least one host address identification for the third party application. The group-based communication server further generates an integration row by reproducing the blueprint row and substituting the placeholder(s) in each of the templatized string(s) with the host address identification (s) for the third party application. The group-based communication server further stores the integration row in the API applications table in the group-based communication repository.

In some embodiments, the apparatus and method include templatized string(s) that include a URL. In these embodiments, the placeholder corresponds to a section of the URL specifying a domain name.

In some embodiments, the apparatus and method are configured such that the user input of at least one host address identification comprises a domain name.

In other embodiments, the apparatus and method are configured to further associate the user with a user account that is associated with a first group identifier. In this embodiment, the group-based communication server is further configured to, in response to receiving a supplemental installation request associated with a subsequent user, transmit supplemental scope request interface data configured to cause a subsequent client device to render a supplemental interactive scope request interface. The supplemental interactive scope request interface is configured to enable user authorization of defined scopes by the third party application. Further, the subsequent user is associated with a second user account that is associated with a second group identifier. In this embodiment, the group-based communication server is further configured to generate and transmit, in response to receiving a supplemental scope definition object, a supplemental credentials set associated with the third party application and supplemental host address request interface data. The supplemental host address request interface data is configured to cause the subsequent client device to render a supplemental interactive string request interface. The supplemental interactive string request interface is configured to enable user input of at least one supplemental host address identification for the third party application. The group-based communication server is further configured to generate a supplemental integration row by reproducing the blueprint row and substituting the placeholder(s) in each of the templatized string(s) with the supplemental host address identification(s). The group-based communication server is further configured to store the supplemental integration row in the API applications table in the group-based communication repository.

In other embodiments, the apparatus and method are configured to further associate the user with a user account that is associated with a first group identifier. In this embodiment, the group-based communication server is further configured to, in response to receiving a supplemental installation request associated with a subsequent user, transmit supplemental scope request interface data configured to cause a subsequent client device to render a supplemental interactive scope request interface. The supplemental interactive scope request interface is configured to enable user authorization of defined scopes by the third party application. Further, the subsequent user is associated with a second user account that is associated with a second group identifier. In this embodiment, the group-based communication server is further configured to generate and transmit, in response to receiving a supplemental scope definition object, a supplemental credentials set associated with the third party application and supplemental host address request interface data. The supplemental host address request interface data is configured to cause the subsequent client device to render a supplemental interactive string request interface. The supplemental interactive string request interface is configured to enable user input of at least one supplemental host address identification for the third party application. The group-based communication server is further configured to generate a supplemental integration row by reproducing the blueprint row and substituting the placeholder(s) in each of the templatized string(s) with the supplemental host address identification(s). The group-based communication server is further configured to store the supplemental integration row in the API applications table in the group-based communication repository.

In the same embodiments discussed in the paragraph above, the group-based communication server is further configured to establish a first communication link with a first network endpoint. In this embodiment, the first location of the first network endpoint is at least partially specified by the host address identification(s), and the first communication link is associated with the first group identifier. In these same embodiments, the group-based communication server is further configured to establish a supplemental communication link with a supplemental network endpoint. Here, the location of the supplemental network endpoint is at least partially specified by the supplemental host address identification(s), and the supplemental communication link is associated with a supplemental group identifier.

In some embodiments, the apparatus and method are further configured to cause the group-based communication server to send, to the client device, credential set upload data. The credential set upload data is configured to cause the client device to present, to the user, instructions for providing the credentials set to a third party application provider. The group-based communication server is further configured to send, to at least one location at least partially specified by the host address identification(s), a communication request message. In this embodiment, the group-based communication server is further configured to receive a communication response message. The group-based communication server is further configured to send, to the client device, communication confirmation data configured to cause the client device to present, to the user, a communication link confirmation indicating that a communication link with the at least one location was established.

Additionally, embodiments provided herein may include an apparatus and method for integrating a third party application requiring variable host address identification in a group-based communication system. The apparatus includes a group-based communication server, a group-based communication repository, and group-based communication channels. The apparatus also includes at least one processor and at least one memory with a computer program code. The at least one memory and the computer program code are configured to cause the apparatus to execute various steps.

In some embodiments of the apparatus and method, the group-based communication server is configured to receive a request to convert a test application into a blueprint application. In response, the group-based communication server is configured to generate a blueprint row. The blueprint row includes a third party application identifier and one or more templatized strings that include at least one placeholder. The blueprint row is generated at least in part by replicating a test application row and transforming at least one defined host address identification into a templatized string. The test application row is generated as a response to receiving the request, from a third party application provider, app creation data and an app creation confirmation. In these embodiments, the group-based communication server is further configured to store the blueprint row in an API applications table in the group-based communication repository.

In some embodiments, the group-based communication server is configured to modify the test application row at least once before generating the blueprint row.

In some embodiments, the group-based communication server sends app creation interface data to the third party application provider. The app creation interface data is configured to cause the third party application provider to render an interactive app creation interface.

In some embodiments, the group-based communication server is configured to receive a permission authorization from the third party application provider. The permission authorization indicates at least one of: (a) that the third party application provider has provided authorization to install the test application in a test workspace and (b) that the third party application provider has provided authorization of defined scopes by the test application.

These characteristics as well as additional features, functions, and details of various corresponding and additional embodiments are also described below.

BRIEF DESCRIPTION OF THE DRAWINGS

Figure 1:
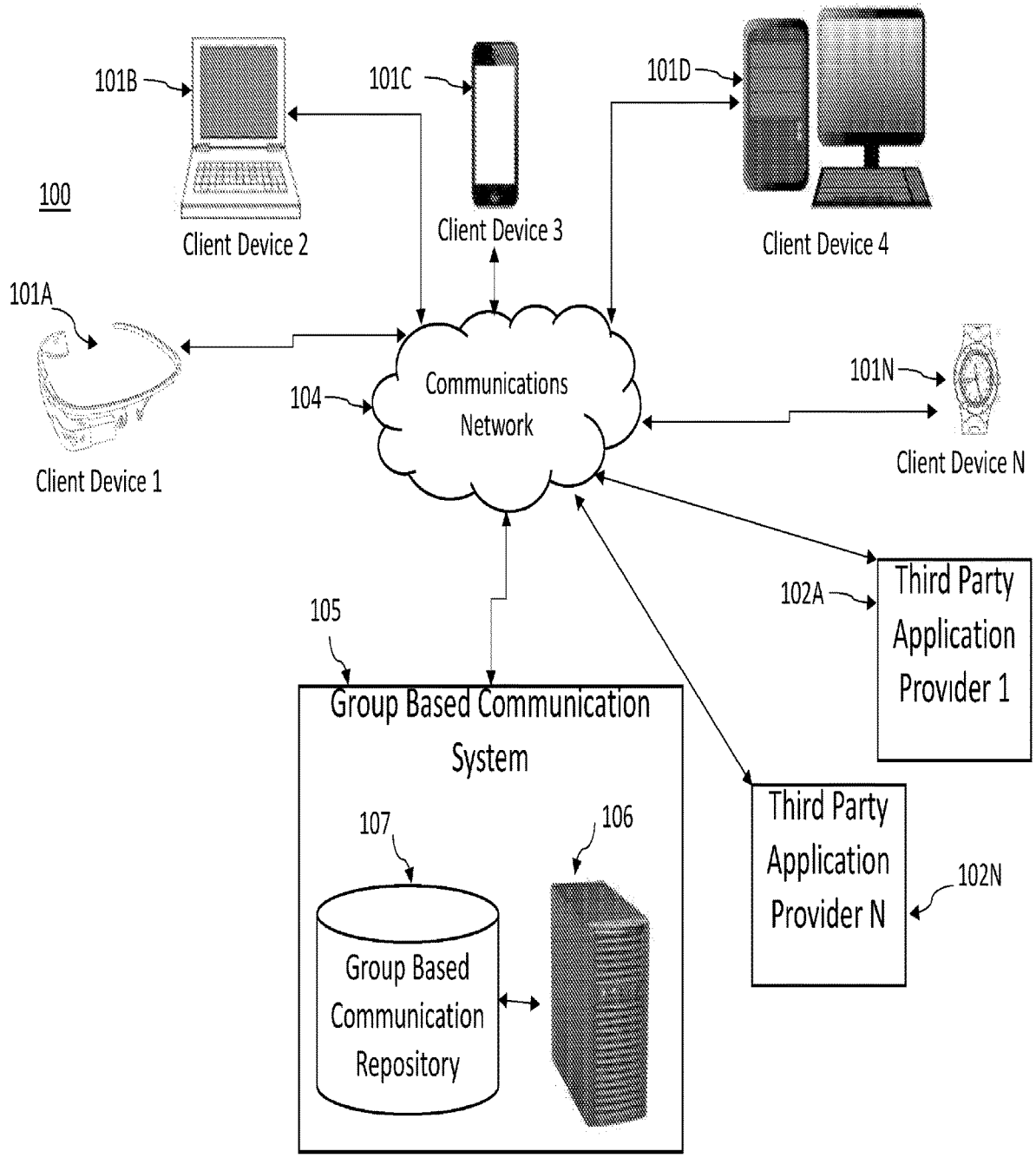
Figure 2:
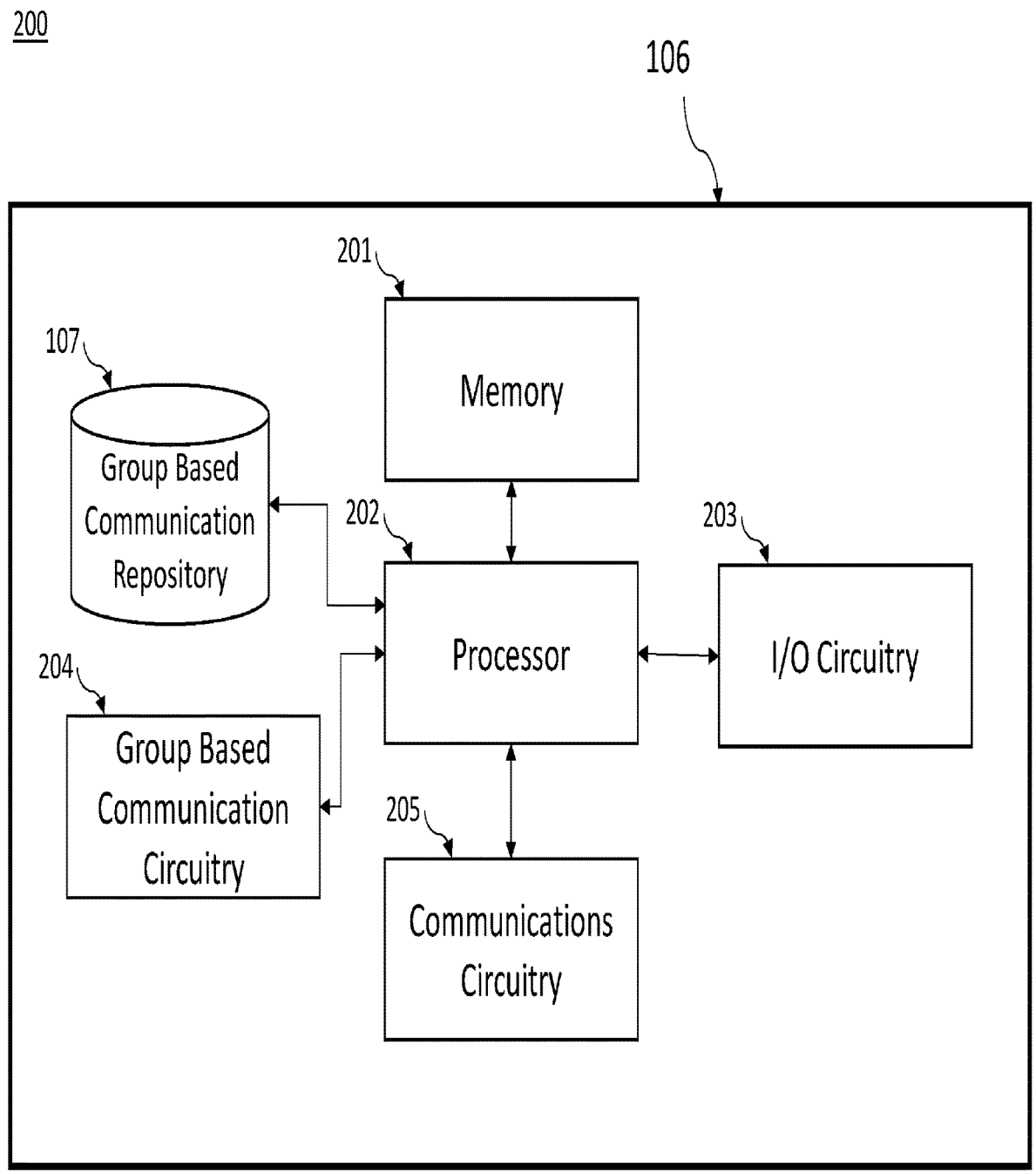
Figure 3:
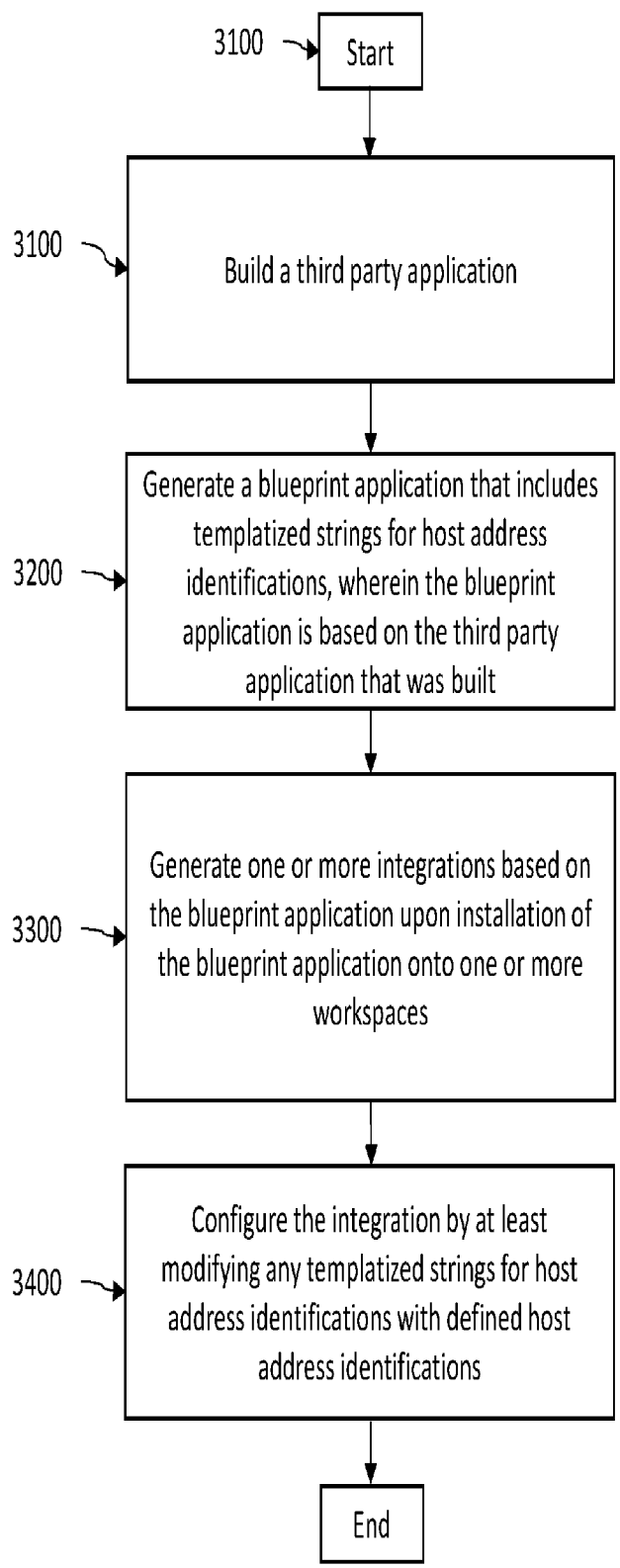
Figure 5:
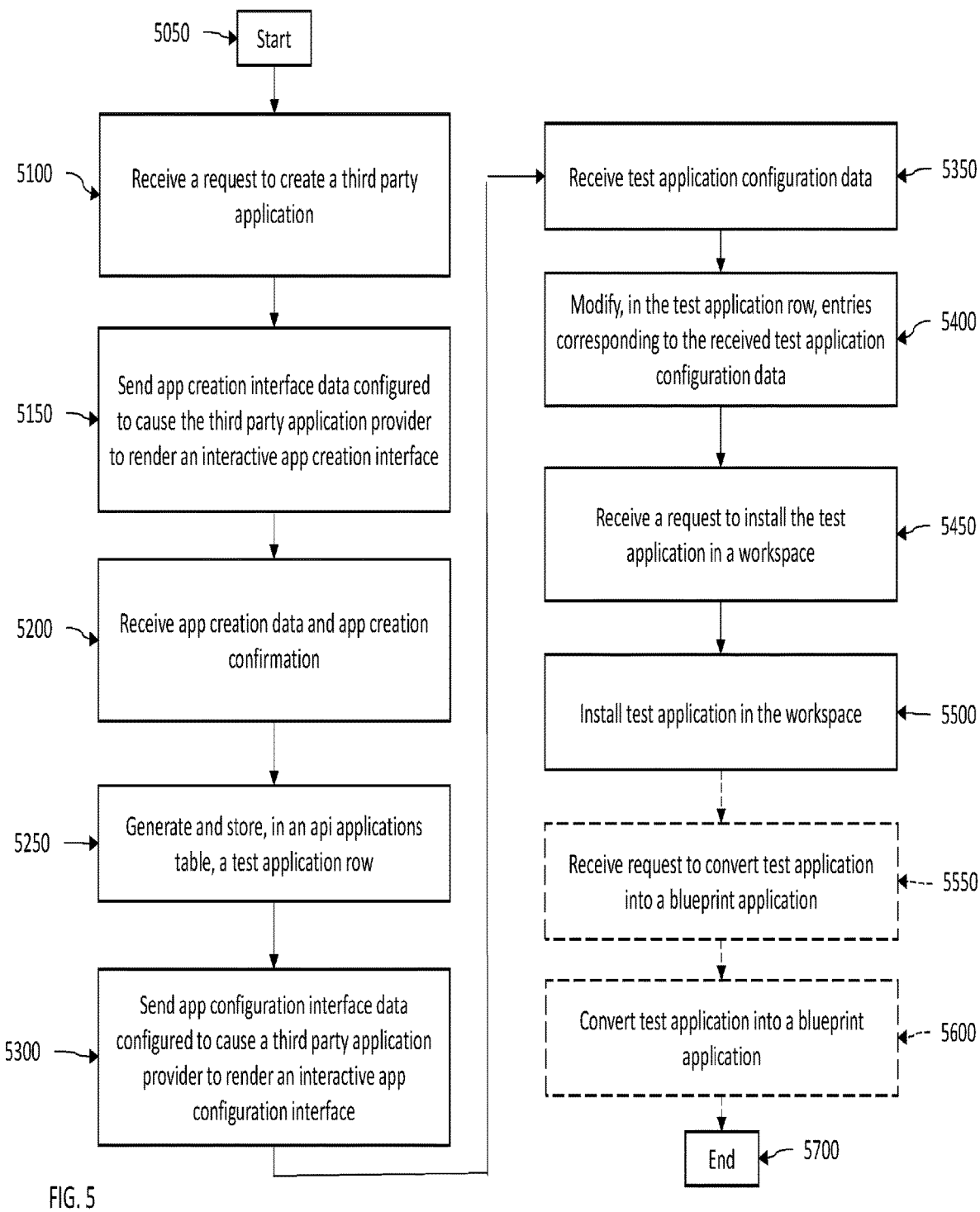
Figure 6:
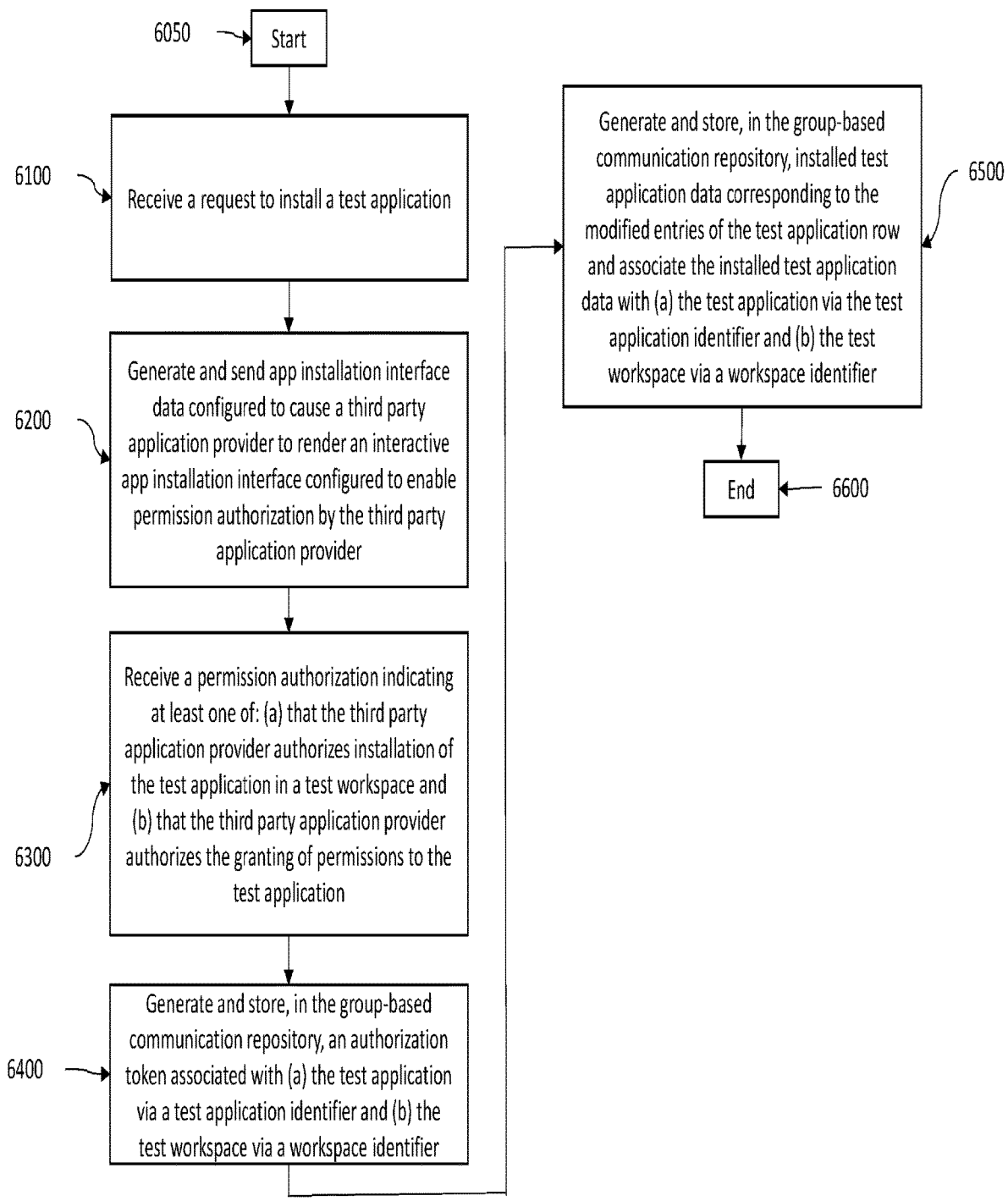
Figure 7:
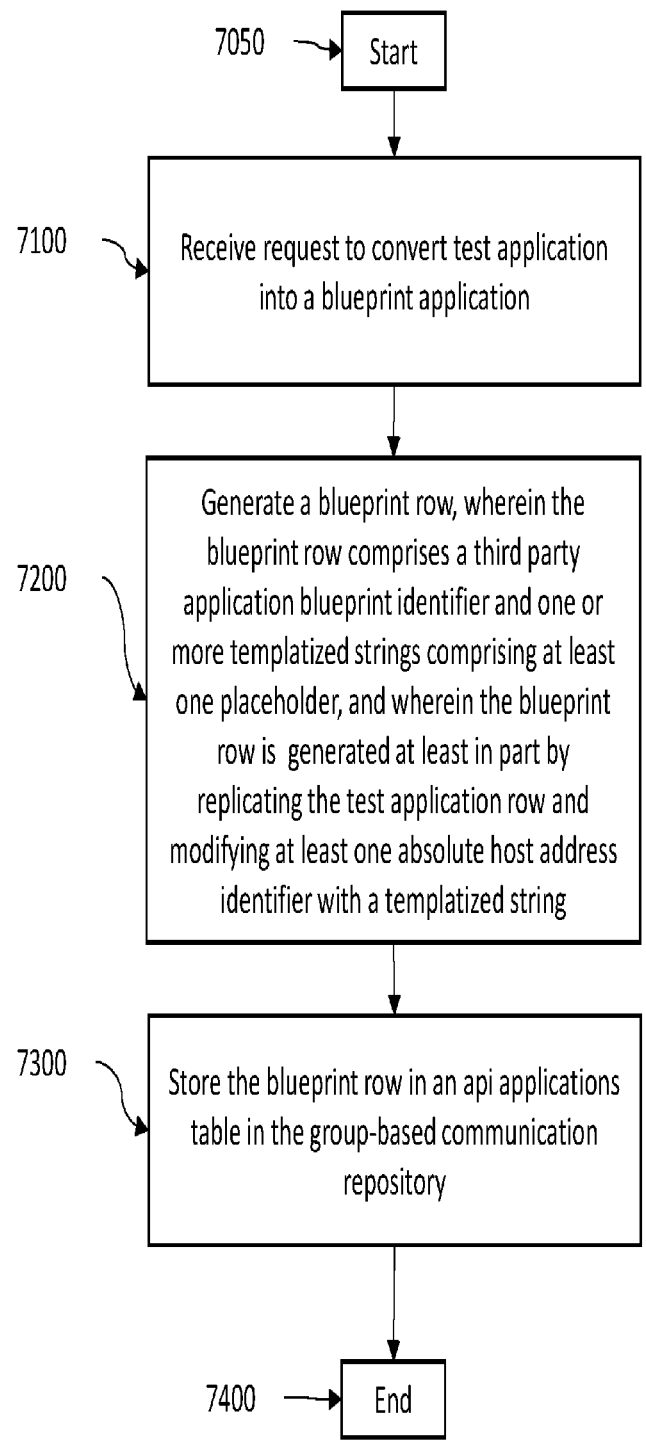
Figure 8:
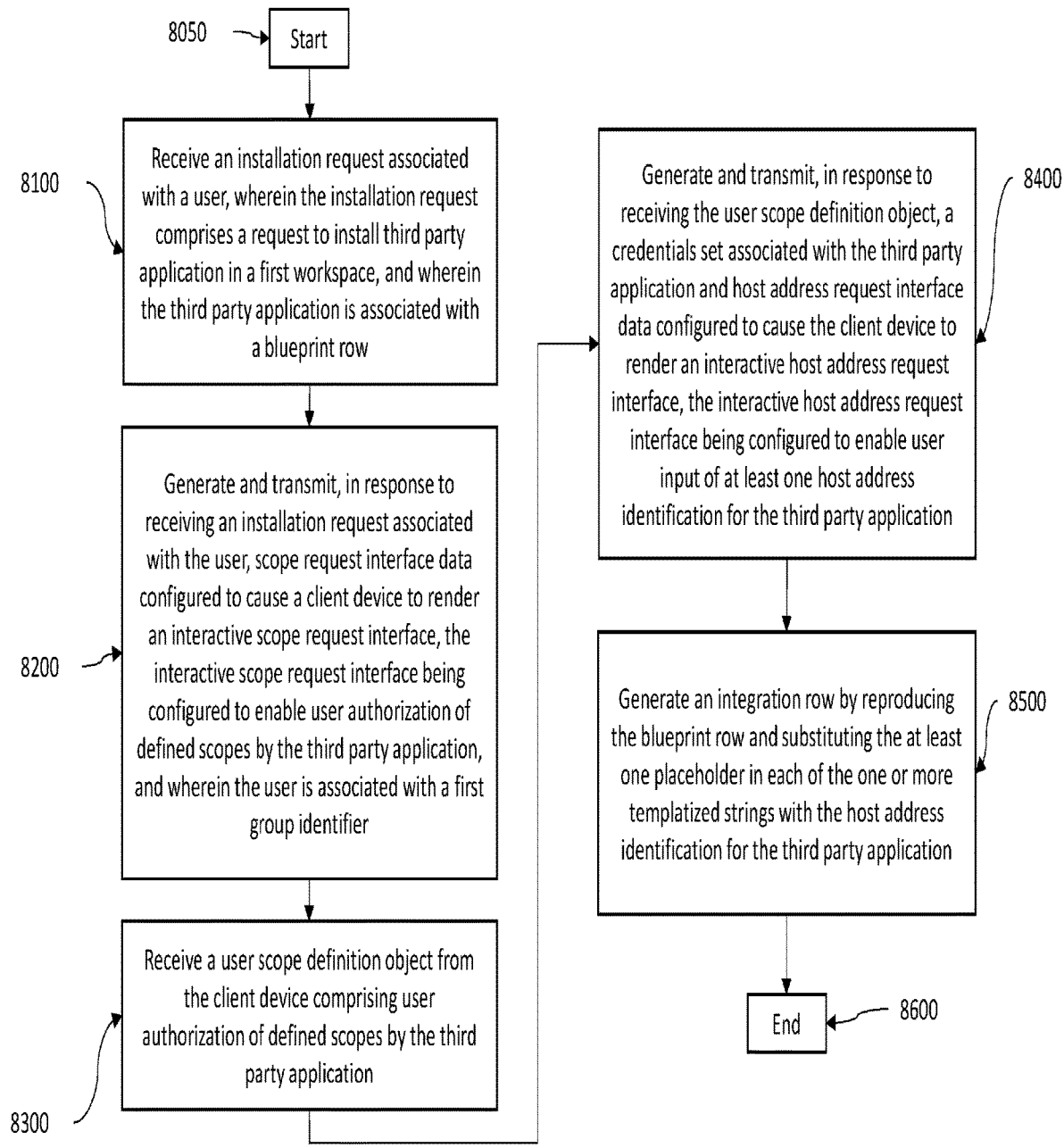
Figure 10A:
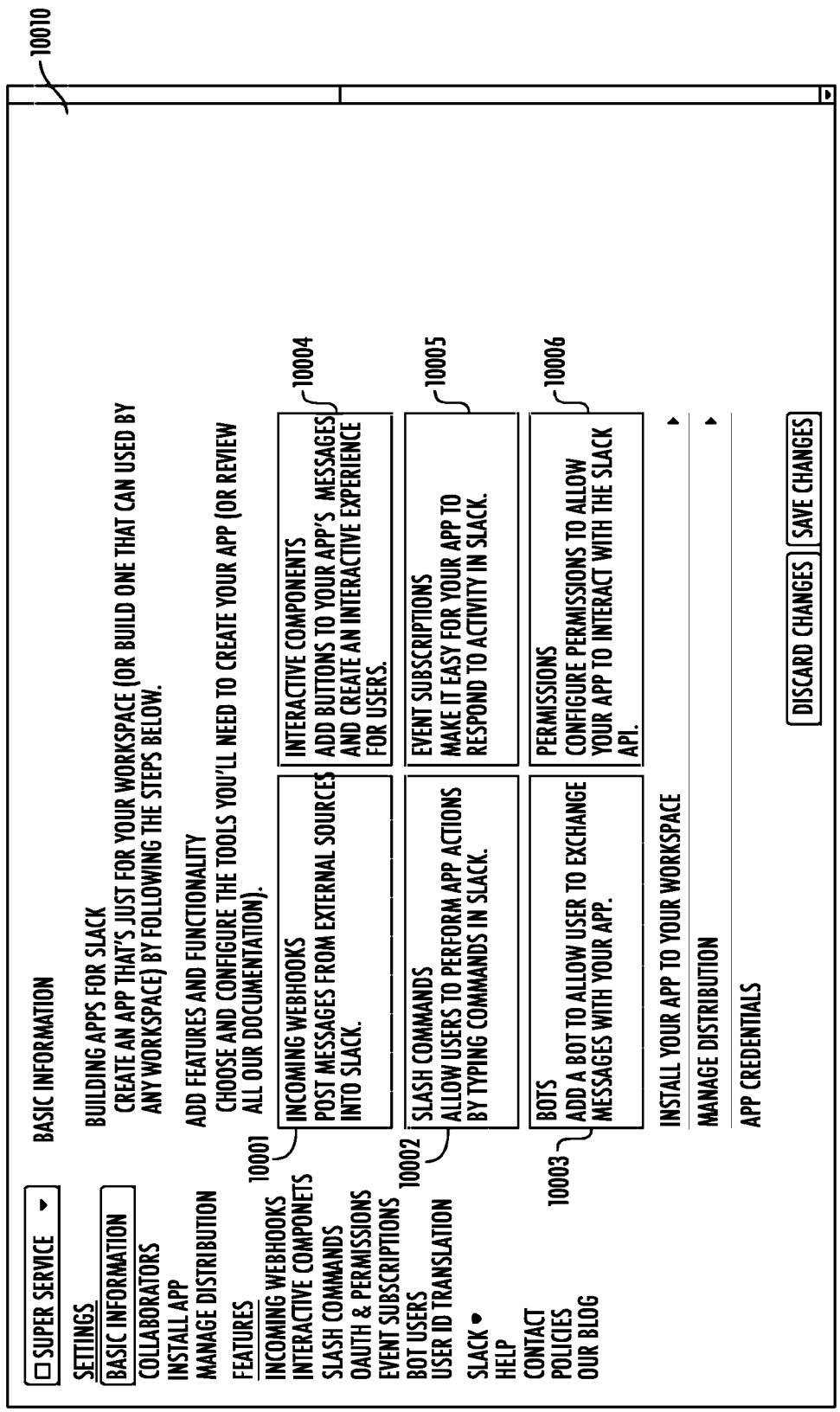
Figure 11:
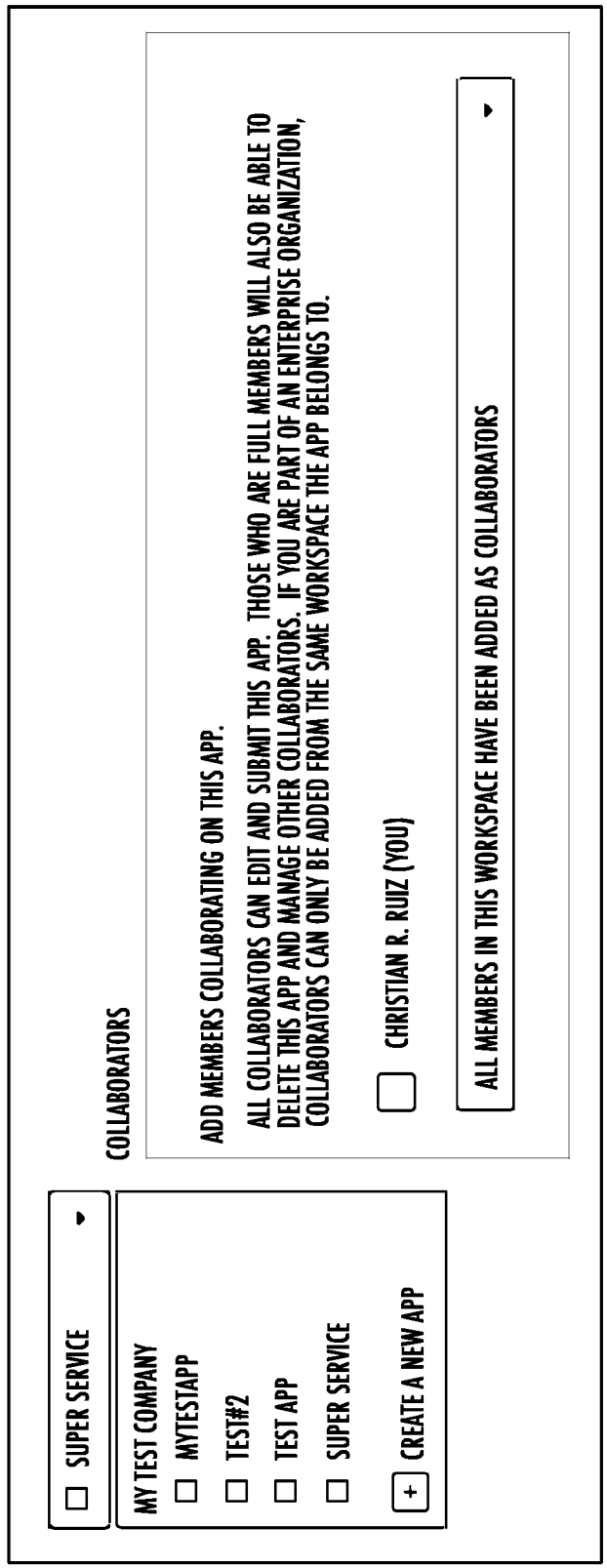
Figure 13A:
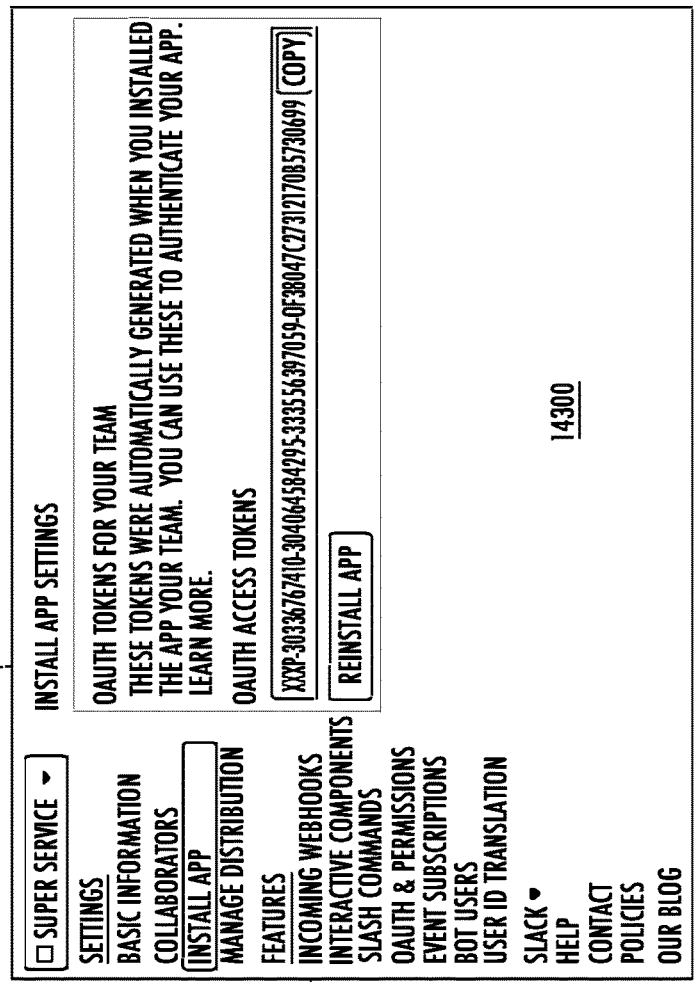
Figure 13C:
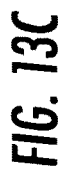
Figure 13B:
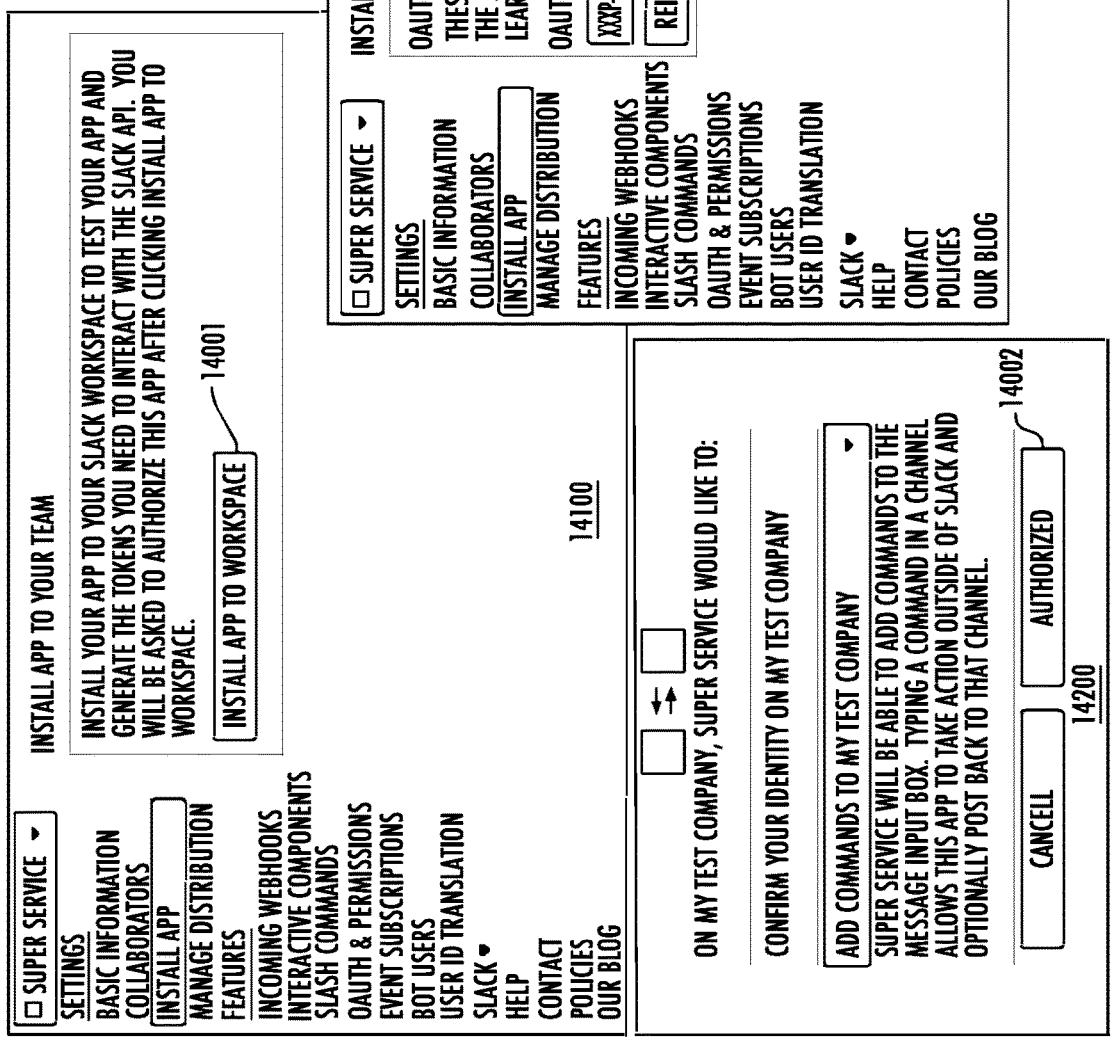
Figure 14:
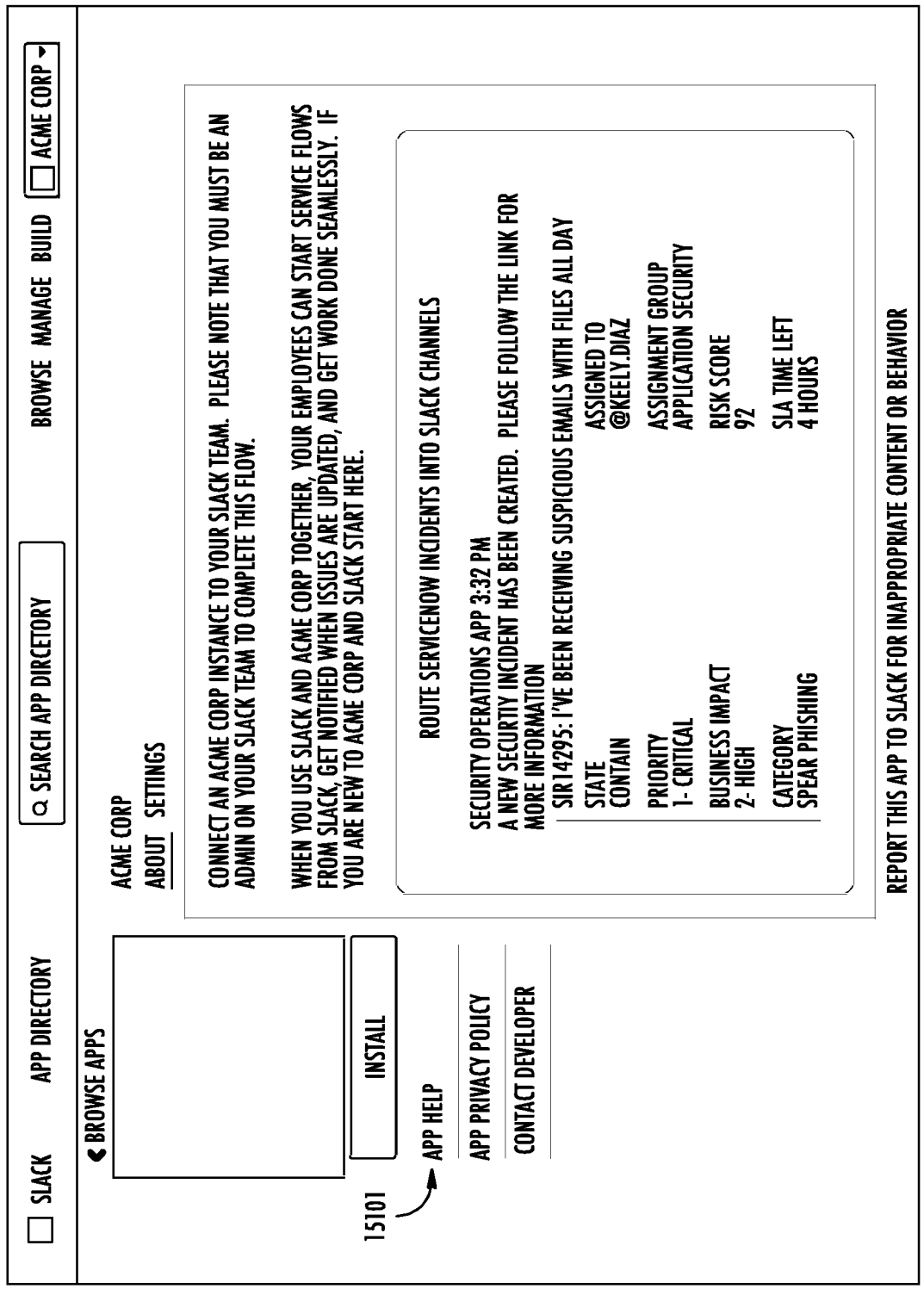
Figure 18:
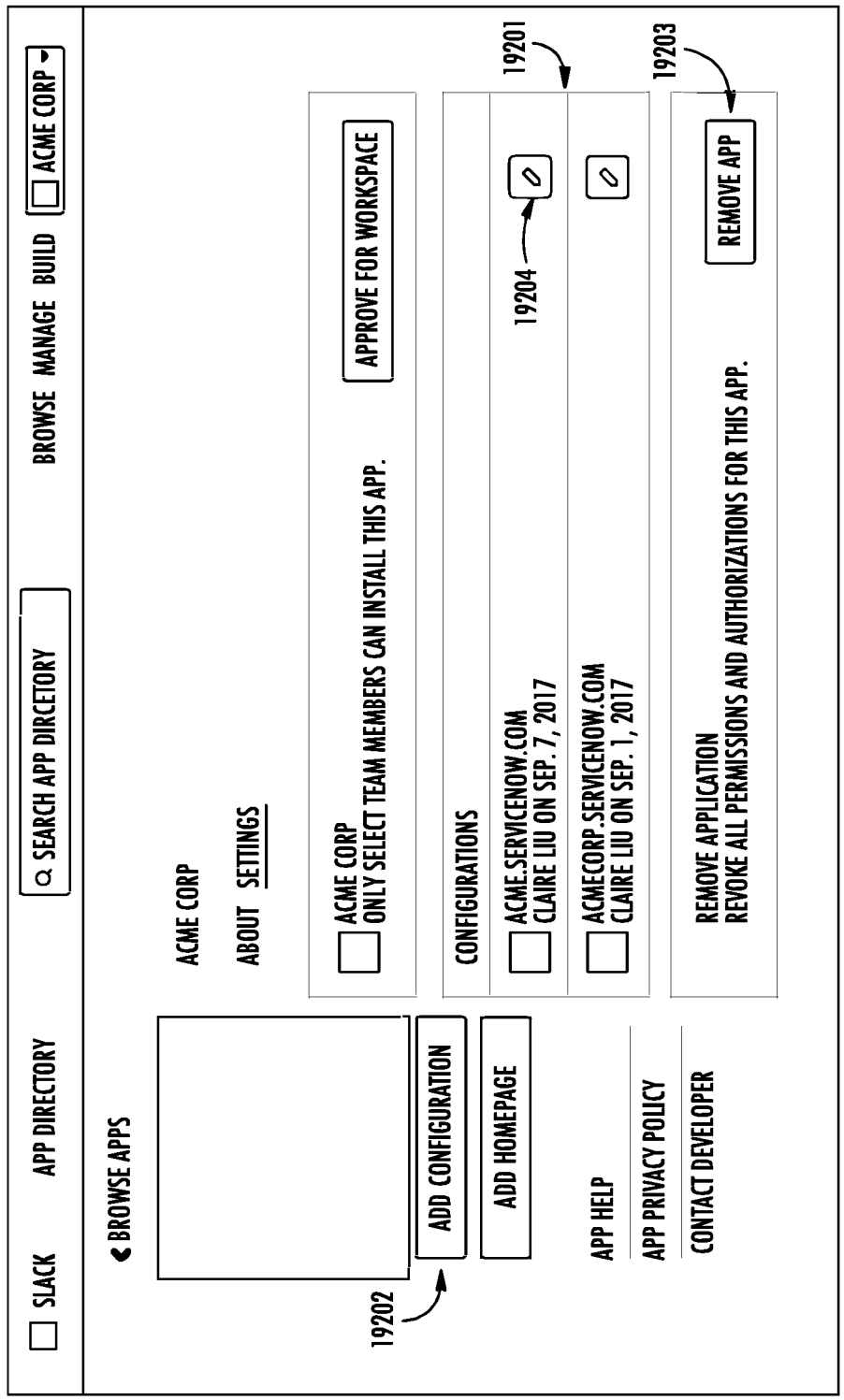
Figure 19:
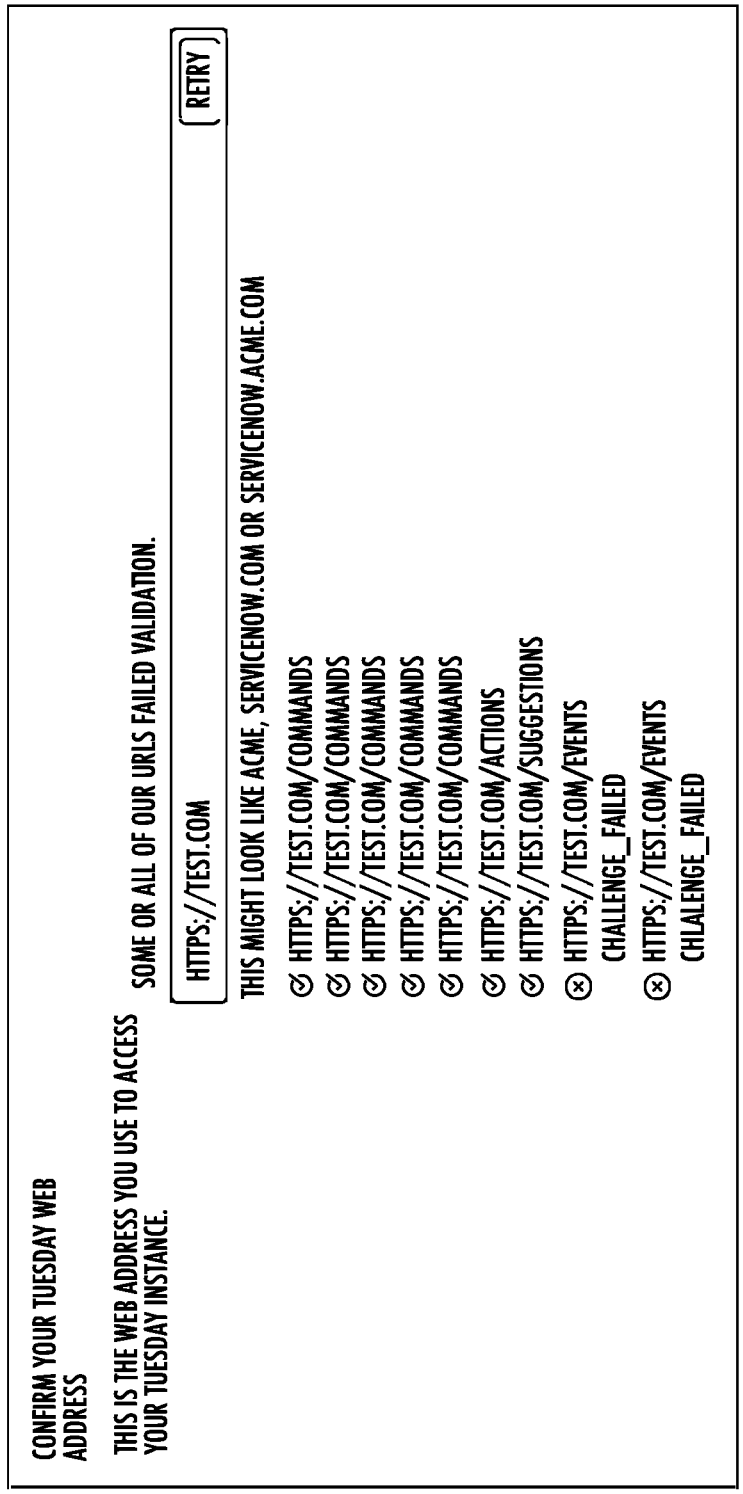
Figures 21A, 21B:
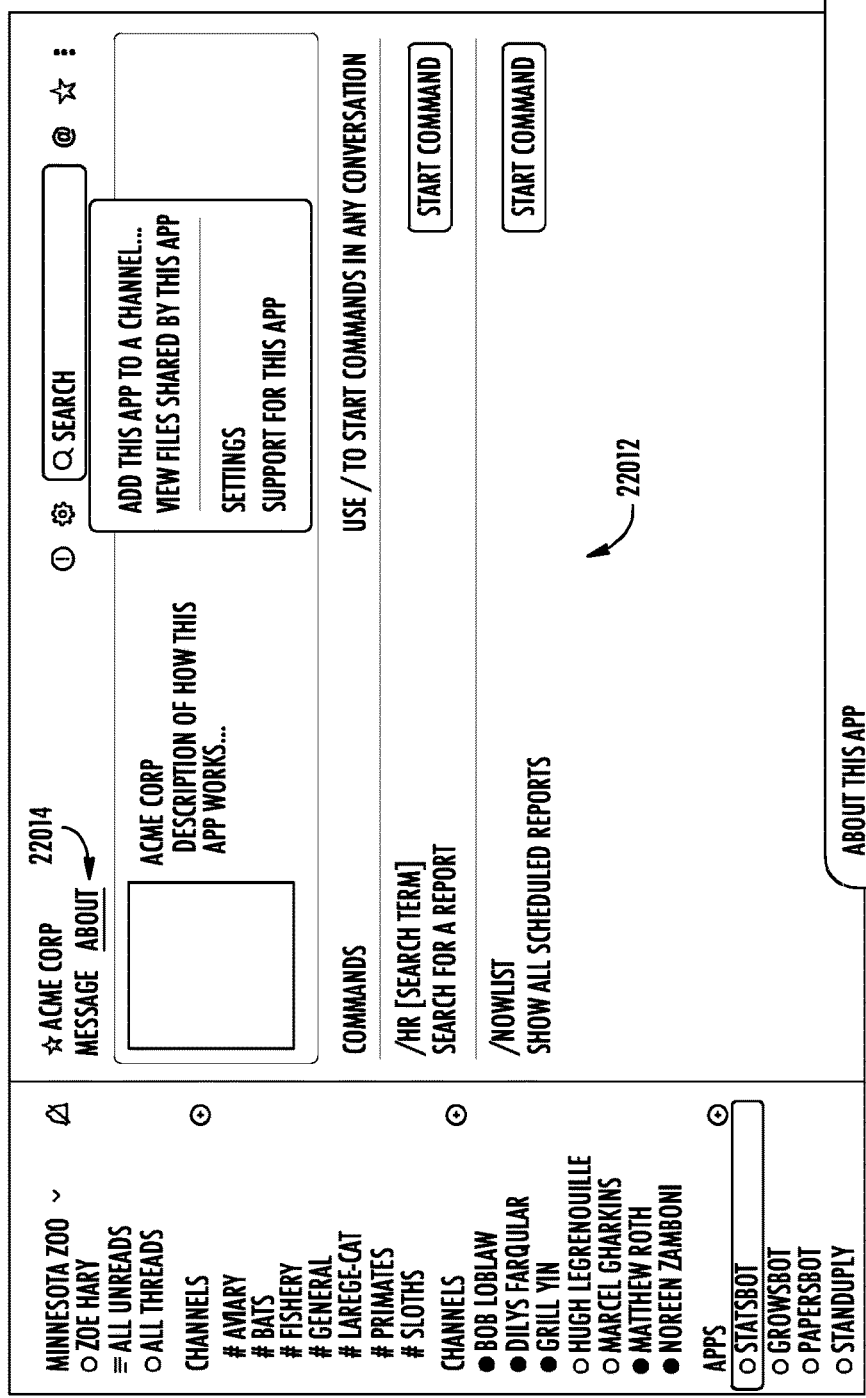

Having thus described the disclosure in general terms, reference will now be made to the accompanying drawings, which are not necessarily drawn to scale, and wherein:

FIG. 1 shows an example computing system 100 within which embodiments of the present invention may operate;

FIG. 2 shows an exemplary apparatus for implementing embodiments of the present invention;

FIG. 3 shows a flow chart of an example method 3000, which is an overview for building an installing third party applications supporting variable host addresses;

FIGS. 4A-4E show a signal diagram of an example data flow showing an embodiment embodiments of the present invention;

FIG. 5 shows a flowchart of an example method 5000 for building a test application;

FIG. 6 shows a flowchart of an example method 6000 for installing a test application;

FIG. 7 shows a flowchart of an example method 7000 for converting a test application into a blueprint application;

FIG. 8 shows a flowchart of an example method 8000 for installing a third party application associated with a blueprint row (i.e. a blueprint application);

FIGS. 9A-9D show displays 9000-9300, which are exemplary embodiments of an interactive app creation interface;

FIGS. 10A-10C show an exemplary embodiment of an interactive app configuration interface;

FIG. 11 shows an exemplary embodiment of a configurable feature of a third party application;

FIGS. 12A-12K show exemplary embodiments of an interactive app configuration interface;

FIG. 13A shows a display 14100, which is an exemplary embodiment of a display that enables a user of the third party application provider to install a test application onto a workspace;

FIG. 13B shows a display 14200, which is an exemplary embodiment of an interactive app installation interface in circumstances where display 14200 is rendered on a display screen associated with a third party provider or an interactive scope request interface in circumstances where display 14200 is rendered on a display screen of a client device;

FIG. 13C shows a display 14300, which is an exemplary embodiment of an interactive app configuration interface;

FIG. 14 shows an exemplary embodiment of an interactive app directory listing interface;

FIG. 15 shows an exemplary embodiment of an interactive host address request interface;

FIG. 16-17 show exemplary embodiments of views of an interactive integration configuration interface;

FIG. 18 shows an exemplary embodiment of an interactive integration configuration interface;

FIG. 19 shows an exemplary embodiment of an interactive integration configuration interface;

FIG. 20 shows an exemplary embodiment of an interactive interface rendered upon activating an actuator button 19203, which is shown in the exemplary embodiment of FIG. 19;

FIG. 21A shows an exemplary embodiment of a display comprising a workspace; and FIG. 21B shows an exemplary embodiment of a display rendered upon activating a tab selector 22014, which is shown in the exemplary embodiment of FIG. 21A.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

As used herein, the term "third party application" refers to a software program, platform, or service that is configured to communicate with the group-based communication system for providing service to a client device via a group-based communication interface. The third party application operates on a compiled code base or repository that is separate and distinct from that which supports the group-based communication interface. In at least one embodiment, the third party application may be integrated in a group workspace within a group-based communication system. In some embodiments, the third party application may communicate with the group-based communication system, and vice versa, through one or more application program interfaces (APIs). In some embodiments, the third party application receives tokens or other authentication credentials that are used to facilitate secure communication between the third party application and the group-based communication system in view of group-based communication system network security layers or protocols (e.g., network firewall protocols). For example, a third party application may be a Software as a Service ("SaaS") product or an Application ("App") product that is provided by a third party application provider and which is stored and maintained by the third party application provider.

As used herein, the term "third party application provider" refers to a provider of a third party application by way of a remote networked device, such as a server or processing device, maintained by a third party individual, company, or organization. A client device in a group-based communication system may access a third party application provided by the third party application provider to execute functions, flows, or actions. In some embodiments, the functions, flows, or actions produce an effect (e.g., an output, change, data modification, etc.) within the group-based communication system such as, for example, by manipulating data within the group-based communication system or posting messages within the group-based communication system, or executing some other action such as providing content to the group-based communication system for rendering in a group-based communication interface. In other embodiments, the functions, flows, or actions take effect within the third party application provider to produce an effect within the third party application provider. In yet other embodiments, the functions, flows, or actions produce effects within various combinations of the group-based communication system, the third party application provider, and other servers or systems.

As used herein, the term "third party application provider identifier" refers to one or more items of data by which a third party application provider that provides a third party application in a group-based communication system may be identified. For example a third party application provider identifier may comprise ASCII text, a pointer, a memory address, and the like.

As used herein, the term "third party application identifier" refers to one or more items of data by which a third party application within a group-based communication system may be identified. For example, a third party resource identifier may comprise ASCII text, a pointer, a memory address, and the like.

As used herein, the term "group-based communication object" refers to collection of data and instructions that represent an item or resource of the group-based communication system. In some embodiments, third party applications are permitted to perform actions on one or more group-based communication objects. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, files created and maintained in the group-based communication system, files linked or uploaded to the group-based communication system, user accounts, emojis posted in a group-based communication channel, and the like.

The term "group-based communication interface" refers to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.).

As used herein, the term "workspace" refers to a group of users and a set of group-based communication objects all of which are associated with a common group identifier. Thus, users sharing a group identifier also share group-based communication objects. In other words, users sharing a common group identifier with a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

As used herein, the term "blueprint application" refers to a third party application that is associated with a blueprint row. Such association would occur with the third party application that shares the third party application identifier held in the respective field of the blueprint row. A blueprint application includes all the information necessary to install a third party application onto a workspace. The blueprint application serves as a template that forms the basis for each integration of the third party application in a workspace. To fully integrate the third party application, the installation of the third party application may require some configuration steps to supply details necessary for the integration that are not defined in the blueprint application.

As used herein, the term "blueprint row" refers to a data structure that holds or points to information defining a blueprint application. Notably, a blueprint row includes at least one host address descriptor (i.e. an element that describes a host address) in the form of a templatized string, which features a variable as a placeholder. A templatized string is further defined below. By employing a templatized string, a blueprint row can be used to support variable host addresses. To provide further context, the group-based communication system may use a blueprint row as the reference data structure from which a plurality of integrations of a third party application may be generated.

As used herein, the term "templatized string" refers to a host address descriptor comprising a placeholder portion and a non-placeholder portion. The non-placeholder portion comprises string data that is common among all the integrations of the same version of a third party application in the group-based communication system. That is, each integration of a version of the third party application will have the same values/data in the non-placeholder portion as the other integrations of that same third party application. On the other hand, the placeholder portion may be replaced when the installation of the third party application in a workspace occurs. The placeholder portion is replaced with user-defined host addresses at installation or subsequent to installation of a third party application onto a workspace. Further, the placeholder portion may be replaced at a time after the installation of the third party application in a workspace occurs. Consequently, each integration of the third party application in the group-based communication system may have different values/data stored in the placeholder portion of its templatized string or strings. In other words, the placeholder portion differs among the various integrations of a third party application in the group-based communication system. In the context of a group-based communication system, the placeholder portion is replaced with a host address identification. As a consequence of such replacement, the templatized string is thus converted into a defined host address identification, which includes all the necessary information to locate a network endpoint or resource with which a communication link may be established.

As used herein, the term "test application" refers to a third party application that is configured for initial test or integration purposes and does not support variable host address identification. A test application is generally used at the development stage to test the functionality of a third party application before it is made available to other users of the group-based communication system.

As used herein, the term "test application row" refers to a data structure that holds or points to information defining a test application. The test application row includes information that the group-based communication system needs to reference for the proper functioning of a test application. The test application row may include, for example, a third party application identifier, a group identifier, a set of credentials, and the like. Notably, the test application row includes at least one host address descriptor in the form of a defined host address identification. For example, for illustration purposes, the test application row may hold at least one URL ("Uniform Resource Locator") of the following form: https//www.mywebsite.com/events-api-handler, which provides all necessary information to locate the identified resource (i.e. this URL is a defined host address identification). To provide further context, a group-based communication system may use a test application row as the reference data structure from which a blueprint row is generated in response to receiving a request to convert a test application into a blueprint application.

As used herein, the term "user identifier" refers to one or more items of data by which a user within a group-based communication system may be identified. For example, a group identifier may comprise ASCII text, a pointer, a memory address, and the like.

As used herein, the term "defined host address identification" refers to one or more items of data which together contain all the information necessary to locate a network endpoint or resource with which a communication link may be established. A defined host address identification includes at least a domain portion which comprises a domain name (otherwise referred to as a domain-name portion). However, a defined host address identification also includes a suffix if the suffix (for example, a URL path) is necessary information to locate a network endpoint or resource.

As used herein, the term "variable host address identification" refers to one or more items of data which together describe or contain information necessary to support the ability to identify various locations associated with a plurality of network endpoints or resources. The need for variable host address identification arises in the context of network endpoints or resources that vary over time or across integrations of a third party application. Because the location of such network endpoints or resources vary, the host address identification used to describe such network endpoints or resources must also vary accordingly. A variable host address identification supports the ability to locate such variable network endpoints or resources. To provide further context, in one exemplary embodiment, a variable host address identification may be embodied via a templatized string. The templatized string includes a placeholder that may be replaced with a host address identification in order to precisely define the location of a network endpoint or resource. Further, replacing the templatized string's placeholder with a different host address identification precisely defines a different location associated with a different network endpoint or resource. Thus, the templatized string is an embodiment of a host address identification that supports variable locations associated with a network endpoint or resource.

To provide even further context via a more specific exemplary embodiment, a variable host address identification may be embodied as a URL with a variable portion and a constant portion. The variable portion may be subsequently assigned a value in order to make the URL into a defined URL. For example, a URL of the form https://www.{{workspace-specific domain}}.com/events-api-handler (which, is also a templatized string) would be an exemplary embodiment of a variable host address identification because the portion labeled as {{workspace-specific domain}} may take various forms. For example, replacing the {{workspace-specific domain}} with a specific string value, such as "mywebsite," would cause the resulting URL to point to https://www.mywebsite.com/events-api-handler. On the other hand, replacing the {{workspace-specific domain}} with a different specific string value, such as "myOtherWeb site," would cause the resulting URL to point to https://www.myOtherWebsite.com/events-api-hander. The result is that the URL of the form https://www.{{workspace-specific domain}}.com/events-api-handler supports the ability to identify various locations associated with a plurality of network endpoints or resources, and therefore, it is an embodiment of a variable host address identification.

As used herein, the term "integration" or "integration" refers to an instance of a third party application that has been installed and configured to function in and/or communicate with at least one workspace of the group-based communication system.

As used herein, the term "integration row" refers to a data structure that holds information defining an integration of a third party application. Notably, an integration row holds at least some host address identification information that identifies a network endpoint or resource with which a communication link must be established. To provide further context, the group-based communication system may use a blueprint row as the reference data structure from which a plurality of integrations of a third party application may be generated. Thus, a third party application may have a plurality of integration rows associated to it via a third party application identifier.

As used herein, the term "scope definition object" refers to a data structure that holds information that defines permissions for a third party application. More specifically, a scope definition object comprises information indicating the types of actions that a third party application may take with respect to group-based communication objects. A scope definition object may comprise other information such as information regarding the workspace where a third party application is to be installed and other information necessary to set the permissions granted to the third party application within the group-based communication system. To provide further context, in one exemplary embodiment, a client device generates a scope definition object during an installation process associated with a third party application. The client device generates the scope definition object in response to receiving a permission authorization. The client device sends the scope definition object to a group-based communication server, which uses the group-based communication object to properly set the permissions associated with the third party application within the group-based communication system.

In another exemplary embodiment, a third party application provider, via a networked device such as a processing device, generates a scope definition object during an installation process of a test application. The third party application provider generates the scope definition object in response to receiving a permission authorization. The third party application provider sends the scope definition object to a group-based communication server, which uses the group-based communication object to properly set the permissions associated with the third party application or the test application within the group-based communication system.

As used herein, the term "interactive scope request interface" refers to a modal or dedicated interface component that is rendered to a group-based communication interface and is configured to enable user authorization of permission requests made on behalf of a third party application. The interactive scope request interface also presents viewable information regarding the permissions being requested. As a result of receiving a user authorization of permission requests, via the interactive scope request interface, a client device generates a scope definition object. The interactive scope request interface is presented on a display screen of a client device.

As used herein, the term "interactive integration configuration interface" refers to a modal or dedicated interface component that is rendered to a group-based communication interface and is configured to enable a user to configure an integration of a third party application in the group-based communication system. The interactive integration configuration interface is presented on a screen of a client device, and it enables a user to view a credentials set associated with an integration of a third party application, set a name for the integration, set an optional icon for the integration, specify at least one host address identification for the integration, and view indications of successful or failed communication links with at least one network endpoint or resource. The interactive integration configuration is accessible only after installation of a third party application that is associated with a blueprint application.

As used herein, the term "interactive app creation interface" refers to a modal or dedicated interface component that is rendered to a group-based communication interface and is configured to enable a user to specify attributes to be associated with a newly created third party application. For example, some of those attributes may include the name of the third party application and the workspace that will be associated with the third party application.

As used herein, the term "interactive app configuration interface" refers to a modal or dedicated interface component that is rendered to a group-based communication interface and is configured to enable a user to configure a third party application in the form of a test application. The interactive app configuration interface may include a plurality of views that enable configuration of a plurality of features for the test application. For example, one or more views of the interactive app configuration interface enables a user to specify host address identifications associated with one or more features of the test application.

As used herein, the term "interactive app installation interface" refers to a modal or dedicated interface component that is rendered to a group-based communication interface and is configured to enable a user to grant a permission authorization associated with one or more permissions requests and an authorization for an installation request. The interactive app installation request interface also presents viewable information regarding the permissions being requested. As a result of receiving a user authorization of permission requests, via the interactive app installation request interface, a device associated with the third party application provider generates a scope definition object. An interactive app installation interface is presented on a display screen associated with a third party provider.

As used herein, the term "interactive host address request interface" refers to a modal or dedicated interface component that is rendered to a group-based communication interface and is configured to enable a user to input information that comprises at least a portion of a host address identification. The interactive host address request interface is presented on a display screen of a client device during the installation process of a third party application that is associated with a blueprint row. The input provided via the interactive host address request interface is used by the group-based communication system to modify templatized strings in an integration row. As a consequence, the integration row is caused to hold defined host address identifications.

As used herein, the term "permission authorization" refers to a data structure that holds information indicating that a user has provided an input authorizing a request to grant one or more permissions to a third party application. A permission authorization may be represented via a temporary code that notifies a recipient that a user has authorized the request. To provide further context, a permission authorization is generated in response to a user interaction with an interactive scope request interface (presented on a display screen of a client device) or an interactive app installation interface (presented on a display screen of a device associated with a third party application provider). A user causes the client device or the device associated with a third party application provider to generate a permission authorization by interacting with, for example, a specific actuator button that forms part of the interactive scope request interface or the interactive app installation interface, respectively.

Overview

Various embodiments of the present invention generally relate to a method and apparatus for installing a third party application requiring variable host address identification in a group-based communication system. The need arises in the context of a single third party application that is installable on a plurality of separate workspaces of a group-based communication system, and wherein each workspace requires that the third party application establish a communication link with a different host address. The need also arises in the context of a specific integration of the third party application requiring a communication link with host addresses that may vary over time and after the third party application has been installed to one or more workspaces of the group-based communication system. In these contexts, the developer of the third party application cannot predict with particularity, during the development and testing phases of the third party application in connection with the group-based communication system, the plurality of host addresses with which the third party application must communicate to properly function within the plurality of workspaces where the third party application may be installed. Thus, the embodiments described herein disclose a group-based communication system that supports third party applications that require variable host address identifications.

To provide more context, a third party application would require support for variable host address identification if a third party application is installed in two or more workspaces (these would correspond to two integrations) of a group-based communication system, the two or more workspaces have resources located at different locations, and the third party application must communicate with the differing locations to function properly within each workspace.

Because third party applications within the group-based communication system may support numerous, robust, and flexible functions, it's not possible to enumerate all the scenarios where variable host addresses may be required. However, one such example could be illustrated by the implementation of an interactive button. In one embodiment, an interactive button may require that the group-based communication system send a payload object to a URL when a user of the group-based communication system interacts with the interactive button. For example, a third party application may require that the payload object be sent to a server that manages a database for an enterprise. The interactive button would thus be configured to manipulate entries in a database storing information associated with an enterprise. In such an embodiment, the URL specifies the location of the server that has access to the database of the enterprise.

The need to support variable host address identifications should now be apparent. In this embodiment, each workspace in the group-based communication system supports a different enterprise, each of which may have a server located at a different location. Even though it's possible that two or more enterprises may share the same server or servers, when the group-based communication system scales to a large-enough size, a scenario will occur where two enterprises require access to two different servers. Thus, the integration of the third party application in the workspaces associated with these two enterprises would require a connection to the different servers. That is, the third party application requires that the payload object be sent to different locations depending on the workspace where the interactive button is actuated. In other words, if the interactive button is actuated within the workspace associated with enterprise A, then the group-based communication server must send the payload object to the location where the server for enterprise A is located. On the other hand, if the interactive button is actuated within the workspace associated with enterprise B, then the group-based communication server must send the payload object to the location where the server for enterprise B is located.

Third party applications, after they are developed, can become publicly available to users of a group-based communication system for installation. Thus, a developer of a third party application supporting the interactive-button feature just described would not be able to predict, at the development stage, all the possible locations where payload objects would have to be sent. Every enterprise that could install the third party application to a workspace of the group-based communication system likely would have a different server located at a different location. In this scenario, as facilitated by the present invention, a third party application may be converted into a blueprint application. The blueprint application supports variable host addresses which are definable at the installation stage of the third party application onto a workspace. In this manner, each enterprise may specify the required host address identifications for their own integration. After creating an integration, an enterprise would retain the ability to configure the host address identifications to support host addresses that vary over time.

As a result of the inventions disclosed herein, each new integration of a third party application that requires a new custom URL (identifying the network endpoints or resources for communication links) does not require that a developer build a new third party application from scratch before making it available to end users of the group-based communication system.

The various embodiments disclosed herein provide for an efficient method of integrating third party applications supporting variable host address identifications within a group-based communication system. The third party applications, upon installation onto a new workspace that requires one or more custom URLs to obtain the desired functionality from the third party application, may be configured by users of the group-based communication system with minimal effort. In this manner, the resources expended in building functionalities that support separate communication links with separate network endpoints for separate integrations of the functionalities are reduced. The functionalities work across integrations requiring a connection to separate network endpoints that may vary from one integration to another, or that may vary over time after the integration is installed in a workspace.

Thus, the various embodiments disclosed provide for a more efficient group-based communication system. For example, by reducing the number of implementations required to support variable host addresses (i.e. instead of having a new third-party-application implementation for each custom URL, the disclosed invention allows one implementation that supports a plurality of integrations, each of which may support connections to custom URL(s)), the storage requirements on the system have been reduced. As a consequence of the reduced number of data structures and flows implemented on the group-based communication system, the size and cost of the infrastructure required to implement the group-based communication system and the third party application integrations may also be reduced. Thus, the solutions provided in this disclosure may be employed to obtain a more efficient and improved group-based communication system.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present invention may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version ="1.0" encoding ="UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
```

```
    </user_accounts_details>
    <client_details>//iOS Client with App and Webkit
            //it should be noted that although several client details
            //sections are provided to show example variants of client
            //sources, further messages will include only one to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
</client_details>
<client_details>//iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
</client_details>
<client_details>//Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client serial number>
        <client_UDID>FXXXXXXXX-XXXX-XXXX-XXXX-
XXXXXXXXXXXX</client UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
</client_details>
<client_details>//Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safa537.75.14</user_agent_string>
        <client_product_type>MacPro5,1</client_product_type>
        <client_serial_number>YXXXXXXXXZ</client serial number>
        <client_UDID>FXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</teamidentifier>
        <channel_identifier>ID_channel_1</channelidentifier>
        <contents>That is an interesting invention. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version ="1.0" encoding ="UTF-8"?
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
         <topic>disclosures</topic>
         <topic>patents</topic>
         <topic>policies</topic>
    </topics>
    <responses>
         <response>liked by ID_user_2</response>
         <response>starred by ID_user_3</response>
    </responses>
    <contents>That is an interesting disclosure. I have attached a copy our patent policy.</contents>
    <attachments>patent_policy.pdf</attachments>
    <conversation_primitive>
         conversation includes messages: ID_message_8, ID_message_9, ID_message_10,
         ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Third Party Applications Supporting Variable Host Addresses Overview

FIG. 3 shows a flow chart of an example method 3000, which is an overview for building and installing third party applications supporting variable host addresses in group-based communication system 105. Method 3000 is meant to show a high level example, while some of the other process flows discussed in relation to later figures show more detailed examples.

At 3100, the group-based communication system 105 is configured to enable a third party application provider to build a third party application. The third party application may involve an incoming webhook, a command, a bot, or any other application meant to cause routines and subroutines to be executed in the group-based communication system 105, a server or servers of at least one third party application provider 102A or 102N, or a combination of both.

After the third party application provider builds a first implementation of a third party application, the third party application provider may install the first implementation of the third party application onto a workspace for testing. Such an implementation of the third party application would thus serve as a test application which would be installed on a test workspace. The third party application provider may thus test the functions, services, and user experiences that the test application provides within the group-based communication system 105. To fine tune the test application, the third party application provider may adjust the configuration and source code associated with the test application iteratively until the third party provider attains the desired performance from the test application.

At 3200, the group-based communication server 106 generates a blue print application, which is based on the final version of the test application, which in turn is the final version of the third party application that the third party application provider built and tested. The blueprint application includes variables for host address identifiers. The group-based communication server 106 may carry out 3200 in response to the third party application provider submitting a request to convert an implementation of the third party application into a blueprint application. The third party application provider may request such conversion if the third party application provider anticipates that the final implementations or configurations of the third party application may require establishing at least one connection to variable or unpredictable, to the third party application provider, network endpoints (e.g. URI's or URL's). A blueprint application essentially is an installable implementation of the third party application that supports and may be configured with variable host addresses after it has been implemented—i.e. by the third party application provider. The host addresses comprise resources necessary for the proper functioning of an instance (e.g. an integration) of the third party application within the group-based communication system 105. For example, in some embodiments, the variable host addresses comprise network endpoints though which API's may be accessed, where a client device is redirected after an authentication procedure, where objects or payload data is sent such as data defining commands, events, and requests, and the like. In general, the variable host addresses comprise network endpoints with which the group-based communication system 105 is to establish a connection to enable an installed instance (e.g. an integration) of the third party application to function properly.

At 3300, the group-based communication server 106 generates one or more integrations based on the blueprint application upon installation of the blueprint application onto one or more workspaces. The group-based communication server 106 may carry out 3300 in response to receiving a request from a user of the group-based communication system 105 to install the blueprint application onto one or more workspaces of the group-based communication system 105. The system is configured to enable a plurality of users to install a blueprint application onto one or more workspaces, thus causing the group-based communication server 106 to generate an integration for each installation of the blueprint application. To that end, the blueprint application serves as a template from which every integration of the third party application is based and generated. However, after the installation process, the integrations of the third party application end up differing from the blueprint application in significant ways. For example, during the installation process, each integration of the third party application is associated with a set of credentials (such as authentication tokens) and other identifiers (such as a group identifier, user identifier, etc.). Additionally, each integration of the third party application ultimately is associated with defined host address identifications only. However, this is true only after the configuration step occurring at installation.

At 3400, the group-based communication server 106 configures the one or more integrations. The group-based communication server 106 may, for example, send a request to a client device in order to obtain one or more defined host address identifications. The group-based communication server 106, in response to receiving the defined host address identification data, then modifies the variable host address identifiers associated with an integration of the third party application. In this manner, the host address identifiers associated with the integration would contain all the information necessary to locate the network endpoints or resources.

Building a Test Application

FIG. 5 shows a flowchart of an example method 5000 for building a test application. Method 5000 will be described with reference to FIGS. 9A-13C, showing various displays and/or interactive user interfaces.

FIGS. 9A-13C show example displays and/or interactive user interfaces that may be presented or rendered by one or more display screens of one or more third party application providers 102A-N. For example, the displays may be presented to a user developer of the group-based communication system 105 by a mobile device and/or a stationary device. Example mobile devices may include a cellular telephone (including smart telephones and/or other types of mobile telephones), laptop, table, and/or the like. Additionally or alternatively, a consumer may access the displays and/or interactive user interfaces depicted in FIGS. 9A-13C via a stationary device, such as a desktop computer, work station, POS ("point-of-sale") device, and/or any other type of device.

In some embodiments, the displays depicted in FIGS. 9A-18 may be accessed via an application that executes locally and causes a device of the third party application provider, such as third party application providers 102A-N, to be configured to function as a specialized machine. Additionally or alternatively, cloud-based, multi-tenant, thin-client, and/or other types of online service techniques may be used. For example, the displays may be provided by one or more applications that execute on a remote device, such as a server and/or other networked machine. User input information may be generated by and sent from the device of the third party application provider to a remote device, while visual and/or audio information is sent from the remote device to the device of the third party application provider.

FIGS. 14-18 are additional example displays and/or interactive user interfaces which may be presented by one or more display screen. However, these displays and/or interactive user interfaces are configured to be rendered via a display screen of a client device, such as client devices 101A-N. The principle of operation of these displays is similar to those of FIGS. 9A-13C in that they may be accessed via an application that executes locally and causes a client device to be configured to function as a specialized machine. Additionally or alternatively, cloud-based, multi-tenant, thin-client, and/or other types of online service techniques may be used. For example, the displays may be provided by one or more applications that execute on a remote device, such as a server and/or other networked machine. User input information may be generated by and sent from the client device to a remote device, while visual and/or audio information is sent from the remote device to the client device.

Turning back to FIG. 5, method 5000 shown there may start at 5050 and proceed to 5100, where the group-based communication server 106 may receive, from a third party application provider, a request to create a third party application. For example, FIG. 9A shows an exemplary display 9000 with actuator button 9001 with label "Create New App." Display 9000 may be rendered on a display screen attached to the third party application provider, thus enabling a user of the third party application provider to provide an input indicating a request to create a third party application. Activating actuator button 9001, such as by a user click, may generate an object comprising a request to create a third party application which is associated with a user identifier associated with the user of the client device. In response, the third party application provider 102A may send the object to the group-based communication server 106.

At 5150, the group-based communication server 106 sends to the third party application provider, app creation interface data configured to cause the third party application provider to render an interactive app creation interface. For example, FIGS. 9B-9C show exemplary embodiment of interactive app creation interfaces 9100 and 9200. Interactive app creation interface 9100 enables a user of the third party application provider to specify app creation data such as a name for the third party application and a workspace to be associated with the third party application. The user of the third party application provider may specify the app creation data via input field 9002 and actuator button 9003. Input field 2002 may enable the user of the third party application provider to input a string. Actuator button 9003 enables the user of the third party application provider to cause the interactive app creation interface 9100 to display a drop-down menu that, in turn, enables the user of the third party application provider to select one of a plurality of workspaces. By inputting a selection, the user designates the workspace where the third party application will subsequently be installed for development purposes. In one embodiment, the user of the third party application provider may only select, via the drop-down menu, workspaces dedicated for development purposes only. An exemplary embodiment of the drop-down menu is shown in display 9300, as shown FIG. 9D, as drop-down menu 9004. In one embodiment, after the user of the third party application provider provides the necessary app creation data, actuator button 9005 becomes available for actuation as shown in display 9200. Thus, the user of the third party application provider may then activate actuator button 9005 to send the app creation data along with an object comprising an app creation confirmation to the group-based communication server 106

At 5200, the group-based communication server 106 receives the app creation data and the app creation confirmation from the third party application provider. In response, at 5250, the group-based communication server 106 generates and stores a test application row in an application program interface ("API") applications table that is stored in the group-based communication repository 107. The test application row includes the canonical information for the third party application such as a third party application identifier, a group identifier, a set of credentials such as a client identifier (used during an authentication process to authenticate the third party application provider), a client secret string (used during the authentication process to confirm the identity of the third party application provider), a verification token (to be used to verify that requests, such as those associated with commands or interactive messages, sent to the third party provider are actually coming from the group-based communication server 106), and the like. In addition, the test application row includes other data items comprising descriptors of the plurality of features and functionalities associated with and implemented by the third party application. These features include at least those configurable features exemplified in FIGS. 10A-10C, 11, and 12A-12K. For example, the test application row includes data items comprising descriptors and other details regarding functions associated with the test application such as incoming webhook URLs, slash commands, subscriptions to specific events that may occur in the group-based communication system, interactive components such as interactive buttons and other application actions, whether or not the third party application has a "bot user" associated with it, how a bot user appears in the workspace, and the like.

At 5300, the group-based communication server 106 sends, to the third party application provider, app configuration interface data configured to cause the third party application provider to render an interactive app configuration interface. The interactive app configuration interface may be automatically rendered for the user of the third party application provider after the third party application provider submits the app creation data and app creation confirmation. In other embodiments, the user of the third party application provider may navigate to a specific network endpoint (e.g. a specific URL) to access the interactive app configuration interface.

FIGS. 10A-10C collectively show an exemplary embodiment of an interactive app configuration interface. FIGS. 10A-10C show three different views of the interactive app configuration interface which may be rendered when a user of the third party application provider scrolls down the screen via actuator button 10010. The interactive app configuration interface enables configuration of various aspects of the third party application.

For example, FIG. 10A shows the basic information of the tab of the interactive app configuration interface. There, actuator buttons 10001-10006 enable a user of the third party application provider to add features and functionalities to the third party application. These features and functionalities enable functions for the third party application with respect to the group-based communication system 105. As an example, activating actuator button 10001 causes the interactive app configuration interface to render a display 13100 as shown in FIG. 12A. There, the user of a third party application provider may configure settings associated with a slash command of the third party application provider. As an example, the user of the third party application provider may specify a request URL associated with a slash command, which corresponds to a network endpoint where the group-based communication server 106 would send a payload object in the event that the slash command associated with the third party application is invoked within the group-based communication system 105.

Similarly, as shown in FIG. 12C, which shows a display that would be rendered upon activating actuator button 10001 (See FIG. 10A), the user of the third party application provider may specify a webhook URL. The webhook URL corresponds to a network endpoint where external messages intended for the group-based communication system 105 originate.

Similarly, as shown in FIG. 12D, which shows a display that would be rendered upon activating actuator button 10004 (See FIG. 10A), the user of the third party application provider may specify a request URL associated with an interactive component. The request URL associated with an interactive component corresponds to a network endpoint where the group-based communication server 106 would send a payload object in the event that the interactive component is activated by a user of the group-based communication system 105.

Similarly, as shown in FIG. 12E, which shows a display that would be rendered upon activating actuator button 10005 (See FIG. 10A), the user of a third party application provider may specify a request URL associated with event subscriptions. The request URL associated with event subscriptions corresponds to a network endpoint where the group-based communication server 106 would send a payload object when certain types of events occur within the group-based communication system 105. Some examples of these events may include messages being posted in certain group-based communication channels, a file being created in the group-based communication system 105, a member joining a group-based communication channel, a message in a group-based communication channel being read by a user, an authentication token being revoked, and the like. In essence, any conceivable action or event that could take place within the group-based communication system 105 could be used as an event that triggers the sending of a payload object to the request URL associated with event subscriptions.

Similarly, as shown in FIGS. 12F-12G, which show a display that would be rendered upon activating actuator button 10006 (See FIG. 10A), the user of a third party application provider may specify a redirect URL associated with OAuth and permissions. The redirect URL corresponds to a network endpoint to which a user of the group-based communication system 105 would be redirected upon completing an authentication process associated with the third party application.

The interactive app configuration interface provides many other configuration capabilities to the user of the third party application provider, but those details will not be discussed here so as not to overcomplicate this disclosure.

At 5350, the group-based communication server 106 receives, from the third party application provider, test application configuration data. Because the third party application would, at this stage, be in the development stage, the user of the third party application provider would need to test the third party application to fine tune the functionalities of the third party application. For these reasons, the test application configuration data would be associated with a test application (i.e. the implementation of the third party application intended for testing). The configuration data corresponds to those inputs, such as the request URL's, redirect URL, and the like, which the user of the third party application provider may specify via the app configuration interface as shown in FIGS. 10A-12H. As shown in FIGS. 10A-12H some of the configurable features also include permissions (i.e. scopes as seen in FIG. 12G), and even the enabling and disabling of a plurality of features (see, for example, FIG. 12C, where incoming webhooks may be activated or deactivated). In some embodiments, the group-based communication server 106 receives the test application configuration data upon user activation of an actuator button of the interactive app configuration interface.

At 5400, the group-based communication server 106 modifies, in the test application row (which is in the application programming interface ("API") applications table that is stored in the group-based communication repository 107), the entries corresponding to the received test application configuration data. For example, the test application row would thus store the request URL's, redirect URL, permissions, whether each feature is enabled or disabled, and the like, which the user of the third party application provider specified for the third party application.

At 5450, the group-based communication server 106 receives, form the third party application provider, a request to install the test application in a workspace. For example, FIG. 13A shows display 14100 with actuator button 14001, which enables the user of the third party application provider to install the test application onto a test workspace. Activating actuator button 14001 generates an object comprising a request to install the test application associated with the interactive app configuration interface. The third party application provider, in turn, sends the object to the group-based communication server 106.

At 5500, the group-based communication server 106 installs the test application in the workspace associated with the user of the third party application provider via a group identifier. In other embodiments, the user of the third party application provider may specify at 5450 the workspace where the test application is to be installed, and the group-based communication server 106 installs it in said workspace at 5500. The installation process is discussed in further detail in relation to method 6000 shown in FIG. 6.

After installing the test application onto a workspace, the user of the third party application provider may test the functionality, services, and user experiences provided by the test application. After observing and testing the test application, the user of the third party application provider may thus iteratively cause the group-based communication system 105 to repeat steps 5300-5500 in order to modify and fine-tune the implementation of the third party application. To do so, the user of the third party application provider may, for example, navigate to the specific network endpoint (e.g. a specific URL) that provides access to the interactive app configuration interface associated with the third party application. Thus, the group-based communication server 106 would carry out step 5300 and the process flow would continue from that step.

Figure 12I:
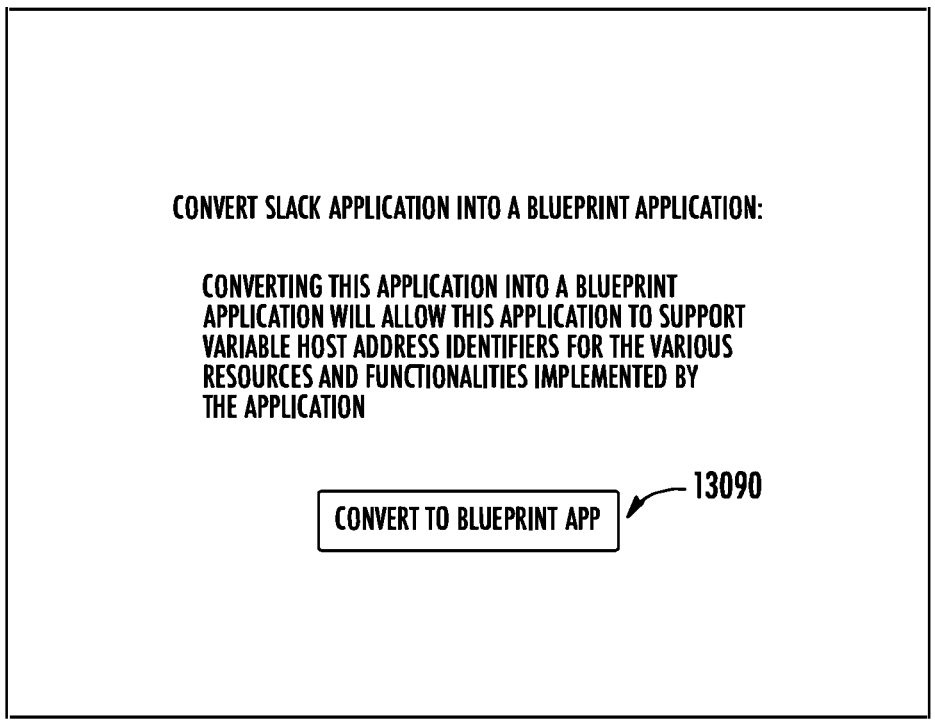

Once the user of the third party application provider has tested and confirmed that the test application provides the desired functionalities, then the test application has been built successfully and, in some embodiments, method 5000 ends. In other embodiments, method 5000 ends after step 5550, where the group-based communication server 106 receives a request to convert the test application into a blueprint application. In one embodiment, the request may be generated by a user of the third party application provider via activating actuator button 13090 as shown in FIG. 12I. In this embodiment, the group-based communication server 106 may then advance to step 5600, where the group-based communication server 106 programmatically converts the test application into a blueprint row. This step is discussed in more detail in relation to method 7000 and FIG. 7.

In other embodiments, the request to convert the test application into a blueprint application may be the result of events taking place outside of the interactive app configuration interface and, at least in part, outside of the group-based communication system 105. For example, in one embodiment, a developer of the third party application may contact the development team of the group-based communication system 105. The developer may then request that the development team of the group-based communication system 105 convert a test application into a blueprint application. The development team may then utilize specialized software and hardware tools, such as an ad-hoc conversion application implemented within the group-based communication system 105, to carry out the conversion into a blueprint application. For example, in one embodiment, the development team or a software developer may write a script in a scripting programming language configured to automate the execution of the conversion within the group-based communication system. In other embodiments, the group-based communication system supports the rendering and operation of an interactive developer interface. For example, group-based communication server 106 may be configured to send interactive developer interface data to a display device coupled to group-based communication server 106. The interactive developer interface data is configured to cause the display device to render a user interface that makes data items of the test application row viewable and accessible to a user. In this manner, the user (i.e. a software developer) can then provide a series of user inputs to group-based communication server 106, via the user interface, which cause the group-based communication server 106 to modify the values stored in a test application row. The result in either embodiment is a data structure comprising a blueprint row.

At 5600, the group-based communication system 105 converts the test application into a blueprint application. This method is discussed in detail with regards to method 7000 as shown in FIG. 7. This step generally comprises the group-based communication system 105 converting at least one of the URL's associated with the implementation of the test application into variable host address identifiers. This feature enables a single blueprint application to support a plurality of integrations of the third party application in the group-based communication system 105, wherein the address identifiers corresponding to resources or network endpoints may differ from one integration to another. Thus, when the third party application is installed in a plurality of workspaces and for a plurality of users within those workspaces, each integration of the third party application is capable of connecting to a plurality of different network endpoints that serve as a resource to the integration of the third party application.

Regardless of whether optional steps 5550 and 5600 occur and trigger the end of method 5000, method 5000 for building a test application ends after the third party application provider is satisfied with the functionalities of the test application during the testing phase of the test application.

A person having ordinary skill in the art would recognize that the user that builds the test application must necessarily provide code, in the form of machine-readable instructions, specifying the functions of the various features discussed above. In some embodiments, this code, when executed by a processor of a computing device, configures the computing device to perform functions implementing features and functions associated with the third party application as intended by the developer. The code may be stored in a data repository that is separate and distinct from the group-based communication repository 107. For example, in at least one embodiment, the data repository that stores the machine-readable instructions is coupled to a third party application provider 102. However, a person having ordinary skill would also understand that such separate repositories are not strictly necessary and thus, in some embodiments, the machine-readable instructions may also reside in the group-based communication repository 107.

For example, to provide further context, a developer may implement an interactive component feature for the third party application. The group-based communication system 105 is configured to enable the software developer to configure the third party application to include such an interactive component via the interactive app configuration interface. FIG. 12D provides the particular embodiment of the interactive app configuration interface that enables such a configuration. There, the developer may configure the interactive component feature to send a payload object to a URL specified as the Request URL. In this manner, when a user of the group-based communication system 105 activates the corresponding interactive button, the group-based communication server 106 is configured to send a payload object comprising, among other data objects, a group identifier (uniquely identifying the workspace where the interactive button was activated), a channel identifier (uniquely identifying the channel where the interactive button was activated), a response URL (i.e. the endpoint where the third party application provider is to send the response payload object after processing the payload object sent by the group-based communication server 106), a user identifier (uniquely identifying the user who activated the interactive component), a credentials set, and the like.

Subsequently, the computing system, which hosts the host address specified by the Request URL, processes the payload object to execute functions associated with the interactive component. To this end, the developer configures said computing system via machine-readable instructions. By providing such machine-readable instructions, the developer thus configures the computing system to provide service to a client device via the group-based communication system 106 and via the third party application. As previously mentioned, the machine-readable instructions that configure the computing device which hosts the host address may be stored at such computing device or may be stored at other data repositories in other locations (for example, in a cloud storage repository or the like).

A person having ordinary skill in the art would recognize that the machine-readable instructions may also configure the computing system to send a payload object to the response URL specified in the payload object transmitted by the group-based communication server 106. Such a response may comprise an acknowledgement message and may also comprise other outputs associated with the execution of functions associated with the interactive component.

A person having ordinary skill would understand that, even though the discussion provided above mentions an interactive component, the same principles apply to other features configurable for the third party application such as incoming webhooks, slash commands, bots, event subscriptions, etc.

Finally, a person having ordinary skill in the art would understand that even though the discussion provided above refers to the code, in the form of machine-readable instructions, as specifying the functions of the various features relating to a test application, such code would also support the various features associated with a blueprint application when the test application is converted into a blueprint application and is subsequently installed onto a workspace. Thus, the code, in the form of machine-readable instructions, provides the functionality of various features included in blueprint application integrations. This will become apparent in view of the remaining discussion provided in this disclosure.

Installing the Test Application

FIG. 6 shows a flowchart of an example method 6000 for installing a test application. Method 6000 will be described with reference to FIGS. 13A-13C, showing various displays and/or interactive user interfaces.

At 6100, the group-based communication server 106 receives, form a third party application provider, a request to install the test application in a workspace. The request may be similar to the request described at step 5450 of method 6000. Here, for example, FIG. 13A shows display 14100 with actuator button 14001, which enables the user of the third party application provider to install the test application onto a test workspace. Activating actuator button 14001 generates an object comprising a request to install the test application associated with the interactive app configuration interface. The third party application provider may, in turn, send the object comprising the installation request to the group-based communication server 106.

At 6200, the group-based communication server 106 generates and sends, to the third party application provider, app installation interface data configured to cause the third party application provider to render an interactive app installation interface which is configured to enable permission authorization by the third party application provider. For example, FIG. 13B shows display 14200 which is an exemplary embodiment of an interactive app installation interface. As shown, the interactive app creation interface may provide information to a user of the third party provider. For example, display 14200 shows the interactive app creation interface as disclosing the name of the test application ("Super Service") the name of the test workspace ("My Test Company"), and a list of permissions requested by the test application (e.g. confirm the user's identity on My Test Company and add commands to My Test Company). The test application may request permission to perform, in the test workspace, any type of function that is supported by the group-based communication system 105. Some potential actions may include, for example and without limitation, adding messages to public group-based communication channels in the test workspace, creating files in the test workspace, posting emojis to private group-based communication channels, modifying attributes in user accounts associated with the test workspace, reading and processing data posted in a specific group-based communication channel, modify files posted in a plurality of group-based communication channels, and the like.

In other embodiments, the interactive app creation interface may be configured to enable the user of the third party application provider to choose with granularity the permissions granted to be granted to the test application. For example, in such an embodiment, display 14200 is configured to provide a drop-down menu of the actions that the test application, Super Service, may take within the test workspace, My Test Company. In such an embodiment, the drop-down menu displays a plurality of potential actions that the user may select and enable for the test application. Such potential actions are actions implemented and supported by the test application and would need prior configuration and implementation such as during the testing phase of development. For example, FIGS. 12F-12G show an embodiment of the interactive app configuration interface that would enable a user of the third party application provider to specify the permissions to be requested by the test application during installation.

The interactive app installation interface enables permission authorization by the third party application provider. For example, with reference to display 14200 in FIG. 13B, actuator button 14002 enables the user of the third party application provider to authorize the permissions that the test application is requesting. Thus, if the user of the third party application provider activates actuator button 14002, the third party application provider then generates an installation authorization object and a scope definition object. The installation authorization object comprises an indication that a user has authorized the installation of the test application. The scope definition object comprises information regarding the workspace where the test application is to be installed, the permissions to be associated with the test application, and any other data necessary for the implementation of the permissions granted to the test application. For example, depending on the permissions authorized, the scope definition object may include channel identifiers to which the test application has been granted permissions, user identifiers, group identifiers, and the like. After generating the installation authorization object and the scope definition object, the third party application provider sends the objects to the group-based communication server 106.

A person of ordinary skill in the art would understand that in other embodiments, only one object could be used at this step, such that the object would indicate both, that the user has authorized installation of the test application and/or the scope definitions related to the permission(s) granted to the test application. Similarly, a person of ordinary skill would understand that the specific form of the message authorizing installation and specifying the permissions could be embodied via other techniques.

At 6300, the group-based communication server 106 receives, from the third party application provider, a permission authorization indicating at least one of: (a) that the third party application provider authorizes installation of the test application in a test workspace and (b) that the third party application provider authorizes the granting of permissions to the test application.

In response, at 6400 the group-based communication server 106 generates and stores, in the group-based communication repository, an authorization token associated with (a) the test application via a test application identifier and (b) the test workspace via a group identifier. For example, in one embodiment, the group-based communication system 105, in response to receiving the permission authorization at 6300, initiates an authorization procedure to generate the authorization token. An example authorization procedure comprises OAuth 1.0 or 2.0. Using OAuth allows a user to authorize a third party application to access a specific resource associated with a user account, and the user may set the third party application's authorization with regard to the associated requested resource to any acceptable scope (e.g., write, read, etc.). Once the third party application's authorization is set, then the external application may, for example, access the requested resource without having to access the user account or log into the group-based communication system 105 as the user. The details of an OAuth authorization procedure will not be discussed in this paper to avoid overcomplicating this disclosure. In one embodiment, at 6400, an OAuth authorization procedure is used to generate a token which can be used to authenticate the identity of the test application as it operates within the group-based communication system 105, with third party application providers, or with other external resources.

The group-based communication server 106 then stores, in the group-based communication repository the authorization token. The data structure where the authorization token is stored associates the authorization token with the test application via a third party application identifier and at least one group identifier associated with a workspace. In some embodiments, each installation of a third party application has the same third party application identifier but has a different authorization token (such as when the third party application is installed in more than one workspace). That is, the third party application has a different authorization token per workspace. Thus, an authorization token may be used, by the group-based communication system 105, to uniquely identify an installation of a third party application in the group-based communication system 106. Further, the association of an authorization token with a group identifier indicates that the installation of the test application is owned by the workspace corresponding to the group identifier. In other words, users belonging to the same workspace—i.e. users whose user accounts have an association with the same group identifier as the third party application—can edit various features of the third party application. For example, at least some users belonging to the same workspace may have access to one or more of the exemplary tabs of an interactive app configuration interface as shown in FIGS. 10A-12K.

The authorization token corresponding to an installation of the third party application is accessible to a user of the third party application provider via the interactive app configuration interface. For example, after the completion of method 6000 for installing the test application, an exemplary embodiment of the interactive app configuration interface 14300 (see FIG. 13C) provides details regarding the authorization token associated with the test application.

At 6500, the group-based communication server 106 generates and stores, in the group-based communication repository, installed test application data corresponding to the modified entries of the test application row (see, for example, step 5400, where the test application row is modified) and associates the installed test application data with (a) the test application via the test application identifier and (b) the test workspace via a group identifier. In one embodiment, this step consists of the group-based communication server 106 first generating, in a row format, data containing the configuration details of the test application. The data is generated in a format compatible for storage in a table of the group-based communication repository 107. The table stores configuration details for a plurality of third party applications.

After the group-based communication server 106 generates the data containing the configuration details of the test application, the group-based communication server 106 then accesses the group-based communication repository 107 to store the generated data. During the storing step, the group-based communication server 106 associates the data with a test application identifier and a workspace identifier to signify the association of the test application data with a workspace.

In one embodiment, after step 6500, the group-based communication server 106 also generates and stores, in the group-based communication repository 107, a plurality of rows for each of the following features, functions, or elements of the test application: a third party application row specifying the permissions associated with the third party application and its authorization token (among other things, this row would associate the test application—via its third party application identifier—with a workspace—via a group identifier—to capture the relationship between the test application, the workspace, and the test application's permissions within that workspace), a bot row providing installation details for a bot functionality associated with the third party application including a bot token (the token may be used to authenticate the identity of the bot when it performs actions within the group-based communication system 105 or with external entities such as a third party application provider) an incoming-webhook row providing installation details regarding incoming messages including channel identifiers where the messages are to be posted, a slash command row providing installation details regarding a slash command including a location where a notification of a command invocation is to be sent, a subscription row providing installation details of a subscription to a specific event or events that may occur in the group-based communication system, and an interactive component row providing installation details of an implementation of an interactive button.

A person having ordinary skill in the art would recognize that a third party application may include more than one of each of the aforementioned features. For example, a particular implementation of a third party application may implement two or more interactive buttons, two or more event subscriptions, two or more commands, and so on. In such an embodiment, the group-based communication repository 107 would include a row for each of these implemented features such that, for example, it would include two or more rows for the interactive buttons, two or more rows for the event subscriptions, etc.

Further, a person having ordinary skill would recognize that the aforementioned rows may be included in a single table corresponding to a single installation of the third party application or may be distributed on more than one table or in a plurality of tables. For example, in one such embodiment, a separate table includes all the rows comprising the implementation details for all incoming webhooks for all third party applications. Similarly, a separate table may include all the implementation details for all slash commands for all third party applications. And so on. Thus, in this embodiment, each table row of each table (i.e. the tables including all implementation details for the incoming webhooks, slash commands, interactive buttons, bot users, and the like) includes a third party application identifier and an authentication token which jointly identify the corresponding installation of a third party application within the table.

After the group-based communication system 105 stores, in the group-based communication repository 107, the data associated with the installation of the test application, method 6000 ends at 6600.

At the conclusion of method 6000, the user of the third party application provider is able to use and test the functionality of the test application in the test workspace. For this reason, the host address identifiers associated with the test application must be defined host addresses. Otherwise, the third party application provider would not be able to test features that require accessing resources accessible via the host address identifiers.

For example, with reference to the test application, Super Service, and FIGS. 12A-12B, the slash command feature requires a request URL. FIG. 12A specifies that the host address identifier for the request URL is "https://example-.com/slash/command." Thus, during the testing phase, the user of the third party application provider would need to test that the proper functionality is implemented at the internet location corresponding to "https://example.com/slash/command." To provide further context, with regards to the slash command depicted in FIGS. 12A-12B, whenever a user invokes within a group-based communication channel the command "/command," the group-based communication system 105 then sends a payload object to the internet location corresponding to "https://example.com/slash/command." Of course, this would happen only if the Super Service test application is granted access to the group-based communication channel where the command was invoked. More importantly, the user of the third party application provider is able to test the functionality of the command only because the host address identifier that is provided as the request URL is, in fact, a defined URL (that is, the host address identifier contains all the information necessary to locate the network endpoints or resources). If the host address identifier did not contain all the information necessary to locate the network endpoint where the payload object is to be sent, the test application would simply not be able to properly execute the functions implemented with the slash command.

Converting the Test Application into a Blueprint Application

As previously discussed, a third party application may be implemented to communicate with variable host addresses (for example, the request URL of a slash command or an interactive component as shown in FIGS. 12A-12B and 12D). Even though at the testing phase, the host address identifications must include all the information necessary to locate the network endpoint or resources, the final implementation of a third party application may be intended to support variable host addresses identifications. In that sense, the host addresses with which a third party application communicates would vary from one integration of the third party application within the group-based communication system 105 to another integration within the group-based communication system 105.

To provide more context, such a scenario would arise if a third party application is installed in two or more workspaces, the two or more workspaces have resources located at different locations, and the third party application must communicate with the differing locations to function properly within each workspace. Because third party applications within the group-based communication system 105 may support numerous, robust, and flexible functions, it's not possible to enumerate all the scenarios where variable host addresses may be required. However, one such example could be illustrated by the implementation of an interactive component such as that illustrated in FIG. 12D. FIG. 12D shows an embodiment of an interactive app configuration interface enabling a user to provide a request URL associated with an interactive component. In one embodiment, the interactive component is a message button, and the group-based communication system 105 sends a payload object to the request URL when a user of the group-based communication system 105 interacts with the message button.

In one embodiment, a third party application requires that the payload object be sent to a server that manages a database for an enterprise. The message button would thus be configured to manipulate entries in a database storing information associated with an enterprise. In such an embodiment, the request URL specifies the location of the server that has access to the database of the enterprise.

The need to support variable host addresses should now be apparent. In this embodiment, each workspace in the group-based communication system 105 supports a different enterprise, each of which may have a server located at a different location. Even though it's possible that two or more enterprises may share the same server or servers, when the group-based communication system 105 scales to a large-enough size, a scenario will occur where two enterprises require access to two different servers. Thus, the integration of the third party application in the workspaces associated with these two enterprises would require a connection to the different servers. That is, the third party application requires that the payload object be sent to different locations depending on the workspace where the message button was actuated. In other words, if the message button is actuated within the workspace associated with enterprise A, then the group-based communication server 106 must send the payload object to the location where the server for enterprise A is located. On the other hand, if the message button is actuated within the workspace associated with enterprise B, then the group-based communication server 106 must send the payload object to the location where the server for enterprise B is located.

A developer of the third party application supporting the feature just described would not be able to predict, at the development stage (including the testing phase), all the possible locations where payload objects would have to be sent. Every enterprise that could install the third party application to a workspace of the group-based communication system 105 likely would have a different server located at a different location. In such a scenario, a third party application may be converted into a blueprint application. The blueprint application supports variable host addresses which are definable at the installation stage of the third party application onto a workspace. In this manner, each enterprise may specify the required host address identifiers for their own integration. After creating an integration, an enterprise would retain the ability to configure the host address identifiers to support host addresses that vary over time.

FIG. 7 shows a flowchart of an example method 7000 for converting a test application into a blueprint application.

At 7100, the group-based communication server 106 receives a request to convert a test application into a blueprint application. Step 7100 is similar to step 5550 discussed in relation with method 5000. In one embodiment, the request may be generated by a user of the third party application provider via activating actuator button 13090 as shown in FIG. 121. FIG. 121 is an embodiment of a display associated with an interactive app configuration interface. For example, the display shown in FIG. 121 may be one tab of a plurality of tabs that an interactive app configuration interface may be configured to display. In this embodiment, the group-based communication server 106 may advance to step 7200 after the activation of actuator button 13090.

In other embodiments, the request to convert the test application into a blueprint application may be the result of events taking place outside of the interactive app configuration interface and, at least in part, outside of the group-based communication system 105. For example, in one embodiment, a developer of the third party application may contact the development team of the group-based communication system 105. The developer may then request that the development team of the group-based communication system 105 convert a test application into a blueprint application. The development team may then utilize specialized software and hardware tools, such as an ad-hoc conversion application implemented within the group-based communication system 105, to carry out the conversion into a blueprint application. For example, in one embodiment, the development team or a software developer may write a script in a scripting programming language configured to automate the execution of the conversion within the group-based communication system. In this particular embodiment, then the group-based communication server 106 receives the request to convert the test application into a blueprint application when the development team or software developer executes the script in group-based communication server 106. A person having ordinary skill in the art would recognize that for this particular embodiment, steps 7200 and 7300 are executed as a result of executing the scripting programming language in group-based communication server 106.

In other embodiments, the group-based communication system supports the rendering and operation of an interactive developer interface. For example, group-based communication server 106 may be configured to send interactive developer interface data to a display device coupled to group-based communication server 106. The interactive developer interface data is configured to cause the display device to render a user interface that makes data items of test application rows viewable and accessible to a user. In this manner, the user (i.e. a software developer) can then provide a series of user inputs to group-based communication server 106, via the user interface, which cause the group-based communication server 106 to modify the values stored in a test application row. In this particular embodiment, the request to convert a test application into a blueprint application occurs when the user submits a user input that causes group-based communication server 106 to receive a request to modify the values stored in the test application row.

To provide further context, in one embodiment, a user first provides a series of user inputs, via the interactive developer interface, indicating that one or more data items stored in a test application row are designated for conversion. In particular, the user inputs may designate one or more data items comprising host address descriptors as those data items that need conversion. Subsequently, the user may activate, such as by clicking, tapping, or by providing a series of keyboard inputs, an actuator button rendered in the interactive developer interface. Activating the button causes the interactive developer interface to send, to group-based communication server 106, a request to convert a test application into a blueprint application.

At 7200, in response to receiving the request, the group-based communication server 106 generates a blueprint row, wherein the blueprint row comprises a third party application blueprint identifier and one or more templatized strings comprising at least one placeholder, and wherein the blueprint row is generated at least in part by replicating the test application row and modifying at least one defined host address identification with a templatized string. In one embodiment, to carry out step 7200, the group-based communication server 106 first accesses the group-based communication repository 107 to retrieve a copy of the data stored in the test application row that is associated with the test application. In one embodiment, the test application row data is created in step 5200 and modified in step 5400 of method 5000. After receiving the data stored in the test application row, the group-based communication server 106 then generates a blueprint row by first replicating the test application row and then modifying any row elements that contain a host address identifier (such as a URL) into a templatized string. The templatized string consists of a placeholder portion and a suffix (i.e. the non-placeholder portion of the templatized string). When taken together, and when the placeholder is replaced by a defined domain name, the placeholder and suffix comprise a host address identifier that contains all the necessary information to locate a network endpoint or resource. However, the placeholder of the templatized string is variable and does not need to include a definite host address identifier at this stage.

In one embodiment, the group-based communication server 106 is configured to analyze the host address identifiers stored in the test application row so as to identify the suffix portion and the domain-name portion of each host address identifier. In this manner, the group-based communication server 106 preserves the suffix portion of each defined host address identification and modifies the domain-name portion with a variable or placeholder in order to generate a templatized string in the blueprint row.

In some embodiments, the group-based communication server 106 generates app configuration interface data that renders a display configured to request the suffix portion of at least one templatized string from a user. For example, FIG. 12K shows an exemplary embodiment of the interactive app configuration interface requesting the suffixes for the templatized strings for various host address identifiers. In this manner, after the user enters the requested suffixes, the group-based communication server 106 modifies the corresponding elements of the blueprint row to reflect the submitted suffixes.

Figure 12J:
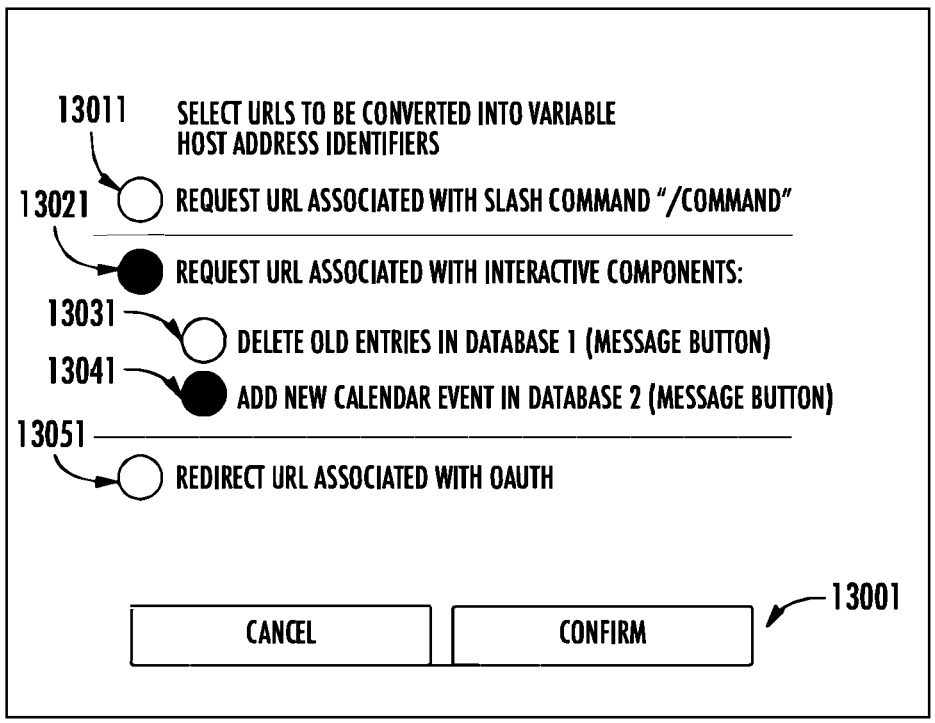

In yet an alternative embodiment, only some specific row elements of the blueprint row include a templatized string. For example, in one embodiment, after a user activates actuator button 13090 (see FIG. 12I), the group-based communication server 106 generates and sends interactive app configuration data that causes the device of the user to render a display like in FIG. 12J. FIG. 12J is another tab of the interactive app configuration interface and it enables user selection of the host address identifiers that need to be converted into variable host address identifiers. For example, a user may select which of the URLs required by the implementation of the third party application need to support variable host address identifiers. This embodiment would be tailored for when the third party application provider expects that only some of the host address identifications required by the third party application might differ among the plurality of integrations of the third party application within the group-based communication system 105. In the embodiment shown in FIG. 12J, the user has activated actuator buttons 13021 and 13041, which indicate that the user is requesting that the message button for adding a new calendar event in database 2 support a variable host address identifier as its request URL.

Upon activating actuator button 13001, then the group-based communication server 106 proceeds to replicate the test application row to generate the blueprint row by modifying the appropriate row elements with a templatized string as previously discussed. However, this time, not all the row elements that include a host address identifier are so modified; instead, only those row elements corresponding to the user selection, such as that shown in FIG. 12J, are modified with a templatized string.

A person of ordinary skill in the art would be able to recognize that the group-based communication server 106 may request the suffixes associated with the user selections made with regards to FIG. 12J after the user activates actuator button 13001. In such an embodiment, a display similar to the one shown in FIG. 12K may be provided to enable user input of the required suffixes.

To provide additional context, to generate a templatized string, the group-based communication server 106 may retrieve an defined host address identification from the test application row that may have the following form: https://testing.slack.com/api/slack/events. Subsequently, after a series of steps (such as those discussed above regarding identifying or requesting suffixes and identifying the domain-name portions), the group-based communication server 106 may generate a templatized string as an element of the blueprint row that has the following form: https://{{INSTANCE URL}}/api/slack/events.

The group-based communication system 105 may support variable host address identifiers for any functionality of a third party application that requires communication with a network endpoint or resource. For example, as previously discussed with regards to FIGS. 12A-12H, each of a slash command, incoming webhook, interactive component, event subscription, OAuth process, and a bot of the third party application may require that the group-based communication server 106 communicate with a network endpoint or resource. Thus, the group-based communication system 105 may support variable host address identifiers for each of these network endpoints or resources via the blueprint application and its associated blueprint row. A person of ordinary skill in the art would be able to recognize that other types of functions may also require that the group-based communication server 106 communicate with a network endpoint or resource and, thus, the invention disclosed herein is not limited to the specific network endpoints or resources discussed here. The invention disclosed herein contemplates supporting variable host address identifiers for any network endpoint or resource and for any function requiring a connection to such.

In the embodiment where the initial request to convert the test application into a blueprint application is the result of events taking place outside of the group-based communication system 105 (see the discussion of step 7100), the developer of the third party application may also provide to the development team of the group-based communication system 105 other information required to carry out step 7200. For example, the developer of the third party application may provide one or more of the information regarding the variable host address identifiers that need conversion into variable host address identifiers, the suffix portions, and the domain-name portions. In such an embodiment, the ad-hoc conversion application mentioned in step 7100, then generates the blueprint row based on the input data from the development team, where the input data comprises instructions regarding the elements in the test application row that need to be converted into variable host address identifiers and the portions that need to be preserved or modified to generate the required templatized strings. For example, in the embodiment previously described as implementing an interactive developer interface (see the discussion of step 7100 above), a user may thereby designate the various portions that need to be preserved or modified to generate the templatized strings. Subsequently, the ad-hoc conversion application implementing the interactive developer interface generates the blueprint row by following steps similar to those described above in the context of step 7200—i.e. first replicating the test application row and then modifying specific row elements.

At 7300, the group-based communication server 106 stores the blueprint row in an API applications table in the group-based communication repository 107. The blueprint row is associated with the blueprint application via a blueprint identifier that is stored in the blueprint row. Method 7000 for converting a test application into a blueprint application then ends at 7400. An exemplary embodiment of computer-readable instructions for creating and implementing an API applications table is reproduced below. A person having ordinary skill would recognize that these exemplary instructions would cause a group-based communication server 106 to access a group-based communication repository 107 and generate an API applications table (named, in this exemplary embodiment, api_apps) containing a plurality of columns for data items comprising an id (an identifier for the api_apps table), a team_id (a group identifier), an owner_id (an identifier for a user or entity who owns the table), a parent_app_id (a third party application identifier), an is_blueprint (an indicator comprising information about whether a row comprises a blueprint row), and so on. Thus, in one embodiment, the group-based communication server 106 stores the blueprint row in a table such as the api_apps table reproduced below:

```
CREATE TABLE 'api_apps' (
  'id' bigint(20) unsigned NOT NULL,
  'team_id' bigint(20) unsigned NOT NULL,
  'owner_id' bigint(20) unsigned NOT NULL,
  'parent_app_id' bigint(20) unsigned NOT NULL,
  'is_blueprint' tinyint(3) unsigned NOT NULL,
  'blueprint_id' bigint(20) unsigned NOT NULL,
  'date_create' int(10) unsigned NOT NULL,
  'date_deleted' int(10) unsigned NOT NULL,
  'secret' varchar(255) NOT NULL,
  'name' varchar(255) NOT NULL,
  'desc' text NOT NULL,
  'long_desc' text NOT NULL,
  'long_desc_formatted' text NOT NULL,
  'url' varchar(255) NOT NULL,
  'redirect_url' text NOT NULL,
  'scope' text CHARACTER SET ascii NOT NULL,
  'num_users' int(10) unsigned NOT NULL,
  'num_teams' int(10) unsigned NOT NULL,
  'service_id' int(10) NOT NULL,
  'payload' mediumtext NOT NULL,
  'directory_payload' mediumtext,
  'is_directory_approved' tinyint(3) unsigned NOT NULL DEFAULT '0',
  'is_directory_published' tinyint(3) unsigned NOT NULL DEFAULT '0',
  'support_url' text NOT NULL,
  'top_apps_display_priority' smallint(5) unsigned NOT NULL DEFAULT '0',
  'can_edit' tinyint(3) unsigned NOT NULL DEFAULT '1',
  'calls' tinyint(3) unsigned NOT NULL DEFAULT '0',
  'should_translate_userids' tinyint(3) unsigned NOT NULL DEFAULT '1',
  'is_communication_disabled' tinyint(3) unsigned NOT NULL DEFAULT '0',
  'is_distributed' tinyint(3) unsigned NOT NULL,
  'command_token' varchar(255) NOT NULL,
  'next_command_token' varchar(255) NOT NULL,
  PRIMARY KEY ('id'),
);
```

In another embodiment, the ad-hoc conversion application mentioned in step 7100 stores the blueprint row in an API applications table in the group-based communication repository 107.

Installing a Blueprint Application

After creating a blueprint application, the third party application associated with the blueprint application may become publicly available to a plurality of users of the group-based communication system 105. The details of such publication will not be discussed here to avoid overcomplicating the disclosure. For purposes of this discussion, it should suffice to disclose that after storing the blueprint row and other implementation details related to a third party application, the group-based communication system 105 may then include the third party application in a directory of third party applications (the "App Directory") that are available for users. Thus, users of the group-based communication system 105 may access the App Directory to browse third party applications and select at least one of a plurality of third party applications for installation within one or more workspaces with which the user is associated.

In one embodiment, a user of a client device 101A (note that even though this discussion refers to client device 101A, this discussion is equally applicable to any of client devices 101A-N) may view an interactive app directory listing interface such as the one depicted in FIG. 14. As shown in FIG. 14, the interactive app directory listing interface provides information regarding the third party application. The interactive app directory listing also enables installation of the third party application onto a workspace. To that end, the user of client device 101A may activate actuator button 15101, which causes the client device 101A to send an installation request to the group-based communication server 106. In some embodiments, the group-based communication system 105 may require a log in by user of client device 101A before the user may activate actuator button 15101. In this manner, the installation request that is sent to the group-based communication server 106 includes an indication regarding the workspaces to which the requesting user belongs and a third party identifier for the third party application that is to be installed. Thus, the group-based communication server 106 would have the necessary information to identify the workspace where the third party application is to be installed.

If the third party application associated with the installation request is, in turn, associated with a blueprint row, activating actuator button 15101 starts a method 8000 for installing a blueprint application in the group-based communication system 105. At 8100, the group-based communication server 106 receives an installation request associated with a first user, wherein the installation request comprises a request to install the third party application that is associated with a blueprint row in a first workspace. The installation request corresponds to the request generated by client device 101A upon activation of actuator button 15101.

At 8200, the group-based communication server 106, in response to receiving the installation request associated with the first user, generates and transmits scope request interface data configured to cause a client device to render an interactive scope request interface, the interactive scope request interface being configured to enable user authorization of defined scopes for the third party application, and wherein the first user is associated with a first group identifier. The functionality of the interactive scope request interface utilized at 8200 may be similar to display 14200 of FIG. 13B, which was already discussed in the context of step 6200 of method 6000. However, in the context of method 8000, the interactive scope request interface is rendered on a display screen of client device 101A. As in step 6200, here, the interactive app creation interface may provide additional information to the user of client device 101A. For example, the interactive scope request interface may list the name of the third party application, the name of the workspace where the third party application is to be installed, and a list of permissions requested by the third party application. Regarding the list of permissions, the third party application may request permission to perform, in the workspace where it will be installed, any type of function that is supported by the group-based communication system 105. Some examples have already been discussed with regards to step 6200 and that discussion applies to method 8000 as well.

In other embodiments, the interactive scope request interface may be configured to enable the user of client device 101A to choose with granularity the permissions granted to be granted to the third party application. For example, in such an embodiment, the interactive scope request interface may be configured to provide a drop-down menu of the actions that the third party application may take in the workspace where it will be installed. In such an embodiment, the drop-down menu displays a plurality of potential actions that the user may select and enable for the third party application. Such potential actions are actions implemented and supported by the third party application.

Actuator button 14002 enables the user of client device 101A to authorize the permissions for the third party application. Thus, if the user of client device 101A activates actuator button 14002, the client device 101A generates an installation authorization object and a scope definition object. The installation authorization object comprises an indication that a user has authorized the installation of the third application. The scope definition object comprises information regarding the workspace where the test application is to be installed, the permissions to be associated with the test application, and any other data necessary for the implementation of the permissions granted to the test application. For example, depending on the permissions authorized, the scope definition object may include channel identifiers to which the test application has been granted permissions, user identifiers, group identifiers, and the like. After generating the installation authorization object and the scope definition object, the third party application provider sends the objects to the group-based communication server 106.

A person of ordinary skill in the art would understand that in other embodiments, only one object could be used at this step, such that the object would indicate both, that the user has authorized installation of the third party application and/or the scope definitions related to the permission(s) granted to the third party application. Similarly, a person of ordinary skill would understand that the specific form of the message authorizing installation and specifying the permissions could be embodied via other techniques.

At 8300, the group-based communication server 106 receives a user scope definition object from the client device comprising user authorization of defined scopes by the third party application. In addition or alternatively, as previously discussed, the group-based communication server 106 may receive other objects such as an installation authorization object or an object comprising an indication of both, that the user has authorized installation of the third party application and the scope definitions related to the permission(s) granted to the third party application.

In some embodiments, in response to receiving the user scope definition object and installation authorization object, the group-based communication server 106 temporarily stores data comprising the user permissions granted to the third party application. The group-based communication server 106 may subsequently use the data comprising the permissions to record such permissions in an integration row, which is further discussed in the context of step 8500 below. A person having ordinary skill would understand that in other embodiments, the group-based communication server 106 may generate and store an integration row in response to receiving the user scope definition object and installation authorization object at step 8300. Further, this integration row includes the permissions associated with the installation of the third party application as defined by the user scope definition object and installation authorization object received at 8300.

In response, at 8400, the group-based communication server 106 generates and transmits, by the group-based communication server and in response to receiving the user scope definition object, a credentials set associated with the third party application and host address request interface data configured to cause the client device to render an interactive host address request interface, the interactive host address request interface being configured to enable user input of at least one host address identification for the third party application. For example, FIG. 15 shows an embodiment of a rendering of an interactive host address request interface that may be displayed on a display screen of client device 101A. There, interactive box 16101 enables a user of client device 101A to input a host address identifier. After a user inputs a host address identifier, such as https://companyname.superservice.com, the user of client device 101A may cause client device 101A to send the host address identifier the group-based communication server 106. The client device 101A sends the host address identifier upon receiving user input indicating an activation of actuator button 16102.

A person having ordinary skill in the art would recognize that the interactive host address request interface may enable the user of client device 101A to input more than one host address identifier. Such feature would be desirable if the third party application requires connections to a plurality of network endpoints each of which require a different domain name for its host address identifier.

In one embodiment, the interactive host address request interface also displays for the user of client device 101A a credentials set. To that end, the group-based communication server 106 generates the credentials set associated with the integration of the third party application in the workspace where the third party application is being installed. The credentials set includes data fields required to establish a connection between the group-based communication system 105 and a network endpoint or resource in order to implement the functions of the third party application within a given workspace. To provide further context, one specific embodiment of the credentials set is illustrated below:

```
{
'client_id' : 44852554851.1234568909,
'client_secret' : 98573d651e8fb18ab80f84fj5k2ldk4k,
'verification_token' : Bt0uiVjjGQUywXVu20KlnM19,
'app_id' : A68C9A9AA9,
'app_template_id' : A730KB832F,
"access_token": "xoxp-6050345600-6 ...",
"scope": "bot,commands,incoming-webhook",
"user_id": "U061H1BMX",
"team name": "Your Team Name",
"team_id": "T061GA5HN",
"bot": {
"bot_user_id": "U0663PMA5",
"bot_access_token": "xoxb-6207803345-I1blJhLllmmbkb"
}
```

In addition, as shown in FIG. 15, the interactive host address request interface provides instructions to the user of client device 101A regarding how to utilize the credentials set. There, the user of client device 101A is instructed to provide the credentials set to the third party application provider. In this manner, the third party application provider is able to support the operations of the third party application within the group-based communication system 105. For example, in one embodiment, the third party application provider may include the credentials set as part of communication messages sent to the group-based communication server 106. Such communication messages may be necessary to send data, to the group-based communication server 106, which the third party application requires for its proper operation. Similarly, the third party application provider may send, to the group-based communication server 106, communication messages to request and retrieve information from the group-based communication system 105. Again, the retrieved information may be needed for the proper functioning of the third party application.

By including the credentials set with communication messages, the third party application provider and the group-based communication server 106 may secure the communications. For example, the credentials set may be utilized by the third party application provider and the group-based communication server 106 to authenticate the identity of the source of received communications.

In an alternative embodiment, instead of instructing the user of client device 101A to navigate to an external network endpoint to provide the credentials set, the group-based communication server 106 automates the process by re-directing the user of client device 101A to the proper network endpoint where the user of client device 101A is to provide the credentials set. Alternatively, in another embodiment, the group-based communication server 106 establishes a communication link with the proper network endpoint and sends the credentials set as a payload object.

Of note is the credentials set generated at step 8400 and rendered via the interactive host address request interface. At this stage (i.e. at step 8400), because the host address identifiers have not been provided prior to step 8400 and prior to generating the interactive host address request interface data, the group-based communication server 106 must execute an authentication procedure with itself in order to generate tokens that usually are generated during an authentication procedure. For example, the credentials set include at least a verification token and an access token; these tokens are normally generated via an authentication procedure such as OAuth 1.0 or 2.0. During third party application installations for third party applications that do not require variable host addresses, the group-based communication server 106 executes an OAuth procedure with a third party application provider in order to generate the necessary tokens. However, for a blueprint application, such an OAuth procedure with a third party application is not possible because the host addresses are not known before step 8400.

The solution to the problem of not knowing the host addresses for an OAuth procedure is that the group-based communication server 106 sends an OAuth request to itself and follows the remaining of the procedure by responding to itself and emulating the actions that a third party application provider would otherwise execute. In this manner, the group-based communication server 106 is able to generate the verification token and access token provided via the interactive host address request interface.

At 8500, the group-based communication server generates an integration row by reproducing the blueprint row and substituting the at least one placeholder in each of the one or more templatized strings with the host address identification for the third party application. To carry out this step, the group-based communication server 106 first retrieves, from the group-based communication repository 107, the blueprint row associated with the third party application. The group-based communication server 106 then replicates the blueprint row and adds new row elements that associate the replicated blueprint row with a group identifier (corresponding to the workspace where the third party application is being installed), a user identifier, a blueprint application identifier, a blueprint row identifier, and the like. Additionally, in some embodiments, the integration row includes the credentials set generated at 8400. Further, in the same or other embodiments, the group-based communication server 106 stores in the integration row permission data associated with the particular integration of the third party application. To that end, the group-based communication server 106 references the temporarily stored permissions data that was generated at, or immediately subsequent to, step 8300. Finally, in the same or other embodiments, the integration row includes data comprising an indicator regarding whether each of the features implemented and included in the blueprint application are enabled or disabled for the particular installation of the third party application represented in the integration row.

The resulting data structure is referred to as an integration row. The group-based communication server 106 then stores the integration row in the group-based communication repository 107 for later reference. An exemplary embodiment of the elements included in the integration row is reproduced below:

```
{
'id : 2344567,
*istencil_app_id' :123456,
'is_communicaton_disabled' : 0,
'is_distributed' : 0,
'payload': has variables where URLs will go,
'client_id' : 44852554851.1234568909,
'client_secref : 98573d651e8fb18ab80f84fj5k2ldk4k,
'verification_token' : Bt0uiVjjGQUywXVu20KlnM19,
'app_id' : A68C9A9AA9,
'app_template_id' : A730KB832F,
"access_token": "xoxp-6050345600-6 ...",
"scope": "bot,commands,incoming-webhook",
"user_id": "U061H1BMX",
"team name": "Your Team Name",
"team_id": "T061GA5HN",
"bot": {
"bot_user_id": "U0663PMA5",
"bot_access_token": xoxb-6207803345-I1blJhLllmmbkb"
}
```

After generating the integration row associated with the third party application and the workspace where third party application is being installed, then the group-based communication server 106 accesses the group-based communication repository 107 to modify the row elements in the integration row. Specifically, the group-based communication server 106 modifies those row elements that contain templatized strings and causes those row elements to include defined host address identifications. The group-based communication server 106 utilizes the host address identifier(s) provided by the user at step 8400 to generate an defined host address identification for each row element that contains a templatized string. In one embodiment, the host address identifiers provided by the user replace only the domain-name portion of the templatized strings, thus preserving the suffix portion of the templatized strings in the defined host address identifications.

A person having ordinary skill in the art would recognize that some of the functions described in the context of steps 8400 and 8500 may take place in an alternative order. For example, an ordinarily skilled artisan would recognize that the group-based communication system 105 may, in an alternate embodiment, first generate and store the integration row, then cause the interactive host address request interface to be displayed for the user of client device 101A, and then modify the stored integration row in response to receiving the host address identifiers that the user provides via the interactive host address request interface. Similarly, other sequencing orders are possible; for example, an ordinarily skilled artisan would recognize that the group-based communication server 106 could first collect the host address identifiers, then generate an integration row by replacing elements of the blueprint row before storing the integration row in the group-based communication repository 107, and then displaying the credentials set for the user of client device 101A. Some sequences of steps may be more efficient than others, especially since some sequences may require the use of a temporary memory allocations for holding values that the group-based communication server 106 manipulates (such as when generating and modifying row elements before storing them). However, the invention is not limited to a particular sequence of steps and this disclosure should be construed as contemplating any combination or variation of the sequence of steps and sub-steps (expressed or implied) discussed herein.

In at least one embodiment, after generating the integration row, the group-based communication server 106 generates data containing the configuration details of the blueprint application that was installed, and then accesses the group-based communication repository 107 to store the data. For example, the group-based communication server 106 causes the group-based communication repository 107 to include one row for each of the following features, functions, or elements of the test application: a third party application row specifying the permissions associated with the third party application and its authorization token (among other things, this row would associate the test application—via its third party application identifier— with a workspace—via a group identifier—to capture the relationship between the test application, the workspace, and the test application's permissions within that workspace), a bot row providing details for a bot functionality associated with the third party application including a bot token (the token may be used to authenticate the identity of the bot when it performs actions within the group-based communication system 105 or with external entities such as a third party application provider) an incoming-webhook row providing details regarding incoming messages including channel identifiers where the messages are to be posted, a slash command row providing details regarding a slash command including a location where a notification of a command invocation is to be sent, a subscription row providing details of a subscription to a specific event or events that may occur in the group-based communication system, and an interactive component row providing details of an implementation of an interactive button.

A person having ordinary skill in the art would recognize that the integration of a blueprint application may include more than one of each of the aforementioned features. For example, a particular implementation of a blueprint application may implement two or more interactive buttons, two or more event subscriptions, two or more commands, and so on. In such an embodiment, the group-based communication repository 107 would include a row for each of these implemented features.

Further, a person having ordinary skill would recognize that the aforementioned rows may be included in a single table corresponding to a single installation of the third party application or may be distributed on more than one table or in a plurality of tables. For example, in one such embodiment, a separate table includes all the rows comprising the implementation details for all incoming webhooks for all third party applications. Similarly, a separate table may include all the implementation details for all slash commands for all third party applications. And so on. Thus, in this embodiment, each table row of each table (i.e. the tables including all implementation details for the incoming webhooks, slash commands, interactive buttons, bot users, and the like) includes a third party application identifier and an authentication token which jointly identify the corresponding installation of a third party application within the table.

After 8500, the method 8000 for installing a blueprint application, which results in an integration, ends at 8600.

Configuring Third Party Application

In one embodiment, after step 8500 of method 8000, the group-based communication server 106 generates and sends, to the client device 101A, integration configuration interface data which causes the client device 101A to render an interactive integration configuration interface. FIG. 18 shows an exemplary embodiment of an interactive integration configuration interface which provides information related to the integration of a third party application in a workspace. For example, the interactive integration configuration interface shows, in display area 19201, that the integration has two different configurations available, each of which has a different domain name for its host address identifications. The presence of the two configurations (with their two different domain names) indicates that the integration is configured to cause the group-based communication system 105 to establish a communication link with two different sets of network endpoints (one set per configuration) on behalf of the third party application. Thus, each configuration has a different set of URLs specifying the network endpoints for the communication links needed for the operation of the third party application. The different configurations may be needed when a user has installed the third party application in more than one workspace or when the user has installed the third party application in more than one group-based communication object (e.g. two or more group-based communication channels) within one single workspace. Further details are provided below.

In one aspect of the invention, a user may install a third party application in more than one workspace, such as when one enterprise wants to use the same third party application in more than one workspace. The interactive integration configuration interface thus enables users to manage the various configurations and integrations of a third party application. For example, the user of client device 101A may select whether only one configuration is active at a time in one workspace, or more than one configuration is active at the same time in the given workspace.

In at least one embodiment, users of a workspace may access an integration configuration interface via a series of inputs. For example, FIG. 21A shows a display of a workspace comprising various channels, direct messages, and third party applications. In FIG. 21A, the third party application indicated by 22012 has been selected by a user input, which causes the group-based communication system 105 to display details related to the selected third party application in display area 22010. There, a user may select tab selector 22014, which causes the group-based communication system 105 to display further details about the third party application. For example, in one embodiment, activating tab selector 22014 via a click, screen tap, or a series of keyboard inputs causes the group-based communication system 105 to render a display such as that shown in FIG. 21B. There, a user may further select item 22020, which sends a user input to the group-based communication system 105 that, in turn, causes the group-based communication system 105 to render an interactive configuration interface similar to that shown in FIG. 18.

Returning to FIG. 18, by activating actuator button 19202, the user of client device 101A causes the client device 101A to access a different view of the interactive integration configuration interface. Such an interface may be similar to the interactive host address request interface previously discussed for method 8000. For example, FIGS. 16, 17, and 19 show various views of the interactive integration configuration interface. With reference to FIG. 16, the interactive internal interface discloses whether any connection problems exist with the host address identifier that the user of client device 101A has provided. The interactive integration configuration interface also enables the user to configure the integration of the third party application within a workspace by allowing the user of client device 101A to specify a valid host address identifier.

Additionally, the interactive integration configuration interface enables the user to provide a name and an image for the integration and gain access to the credentials set associated with the integration of the third party application. Such information would be useful if additional configuration steps are needed at a network endpoint hosted by another entity such as when a user or administrator needs to provide the credentials set to the third party application provider. In at least one embodiment, even though the credentials set is accessible to any user of a workspace, some of the data items comprising the credentials set are accessible only to the user who first installed a third party application in a workspace. As will be described below, users of a workspace may subsequently add or install the third party application onto various group-based communication objects. Thus, for example, data items such as a client secret and an authorization token, which are sensitive pieces of data for securing communications with the group-based communication server 106, may only be accessible to the user who first installed the third party application in a workspace but not to any other users of the workspace.

In some embodiments, only the user of the group-based communication system 105 who first installed the third party application is able to gain access to the interactive integration configuration interface. Thus, after the group-based communication server 106 receives a request to access the interactive integration configuration interface associated with an integration of a third party application, the group-based communication server 106 first verifies that the user identifier associated with the requesting user is included in the credentials set of the integration row as the user identifier for the user who has administrative access. Only if the group-based communication server 106 finds a match for the user identifier does the group-based communication server 106 send the integration configuration interface data to the client device 101A. In a different embodiment, any user associated with the group identifier included in the credentials set of the integration row may access the interactive integration configuration interface.

In one embodiment of the interactive integration configuration interface, the user of client device 101A may view status and error messages regarding communication links between the group-based communication system 105 and the network endpoints that the integration needs to access to perform is functions. For example, with reference to FIGS. 17 and 19, the interactive integration configuration interface indicates which network endpoints have successfully established a communication link with the group-based communication system 105 and which have presented errors (such as a non-response to a HTTP request). This information is useful to a user of a client device 101A who is configuring and troubleshooting communication problems between an integration and the network endpoints.

Returning to FIG. 18, actuator buttons 19204 and 19203 enable the user of a client device 101A to modify aspects of the integrations. Actuator button 19204 enables the user of client device 101A to access the configuration details of pre-existing configurations. Activating actuator button 19204 would cause the client device 101A to render a display similar to FIGS. 15-17 for the selected configuration. Actuator button 19203 enables a user to uninstall the integration of the third party application. Activating button 19203 causes an interactive interface, similar to that shown in FIG. 20, to be rendered on a display of client device 101A. Providing the necessary user inputs via the interactive interface shown in FIG. 20 causes one or more integration rows associated with the third party application to be deleted from the group-based communication repository 107.

In yet another aspect of the invention, the group-based communication system 105 is configured to allow users to add third party applications to group-based communication objects. The group-based communication server 106 may provide users with different alternatives for adding third party applications to additional group-based communication objects. In some embodiments, during the installation process, and via the group-based communication object permissions interfaces, the group-based communication server 106 may give users the option to select and grant additional permissions for the third party application. These permissions may be requested such as described in relation to step 8200 of method 8000 and other sections discussing permission requests of this disclosure. As part of these permission requests, the group-based communication server 106 may request permission for the third party application to gain access to various group-based communication objects in a workspace. For example, in one embodiment, as part of the permissions requested at the installation stage of a blueprint application, the group-based communication server 106 may request permission for the third party application to gain access to two or more group-based communication channels included in the workspace where the third party application is to be installed.

In other embodiments, a user may right-click on a group-based communication object, such as a group-based communication channel included in a workspace, which enables a user selection for installing a third party application on the corresponding group-based communication object. A user having ordinary skill would understand that other modes of adding or installing a third party application to group-based communication objects may exist, such as via a workspace configuration interface that enables users to manage third party installations on various group-based communication objects or the like.

Regardless of the mode utilized for adding or installing a third party application to a group-based communication object, the user may want to configure the third party application such that the third party application communicates, for its implementation with each of the group-based communication objects, with a different set of network endpoints during its operation. The interactive integration configuration interface facilitates the configuration of a third party application that supports two or more group-based communication channels or group-based communication objects, where each configuration enables the third party application to establish communication links with a different set of network endpoints.

For example, in one embodiment, after a user adds a third party application associated with a blueprint row to a group-based communication channel, the group-based communication server 106 prompts the user to add a configuration for the third party application. In one embodiment, the prompt may be similar to the interactive host address request interface shown in FIG. 15, which enables the user to specify one or more host address identifiers needed for the operation of the third party application. Additionally, the host address request interface allows the user to specify a name for the configuration, which determines the name of the configuration as it would appear in a display area 19201 (see FIG. 18). Subsequently, the user may access the interactive integration configuration interface via the methods described above in order to configure the host addresses that the third party application users to operate within the group-based communication channel.

In the manner exemplified above, the user may subsequently add the third party application to additional group-based communication channels. As a consequence, the interactive integration configuration interface would enable configuration of the host addresses that the third party application utilizes to operate within each of the group-based communication channels. The interactive integration configuration interface would include the various configurations in a display area similar to 19201 (see FIG. 18).

This latter feature is desirable to users of the group-based communication system 105 because different channels in a workspace may be dedicated for different purposes such as for supporting activities for different teams within an enterprise. Thus, because different teams in an enterprise may utilize different resources that may be stored or exist in different locations of a network, those teams may require that a third party application communicate with different host addresses.

Signal Diagram

FIGS. 4A-4E show a signal diagram of an example data flow represented by method 4000, which results in the building of a test application, installation of the test application, configuration of the test application, conversion of the test application into a blueprint application, installing a third party application via the blueprint application to generate an integration of the third party application, establishing a communication link to a variable host address, installing a third party application via the blueprint application to generate a second integration of the third party application, and establishing a communication link to a second variable host address. Method 4000 is described as being performed by a third party application provider, a client device, a group-based communication server and a group-based communication repository.

At 4001, the group-based communication server 106 receives, from a third party application provider 102A, a request to create a third party application. The request may be generated as discussed in relation to step 5100 of method 5000 and FIGS. 9A-9D. At 4002, the group-based communication server 106 sends to the third party application provider 102A creation interface data. In an embodiment, the creation interface data is configured to cause the third party application provider to render on a display screen an interactive app creation interface. Other details relevant to this signal are further discussed in relation to step 5150 of method 5000.

At 4003, the group-based communication server 106 receives, from the third party application provider 102A, app creation data and a creation confirmation. In response, the group-based communication server 106 generates a test application row at step 4004. Further details regarding the test application row, the app creation data and the creation confirmation have been provided in the discussion regarding step 5200 of method 5000.

At 4005, after generating a test application row, the group-based communication server 106 accesses the group-based communication repository 107 and there stores the newly generated test application row. Then, at 4006, the group-based communication server 106 sends to the third party application provider app configuration interface data. In one embodiment, the app configuration interface data is configured to cause the third party application provider to render via a display screen an interactive app configuration interface. Further details regarding the interface are discussed in relation to step 5300 of method 5000.

At 4007, the group-based communication server 106 receives, from the third party application provider, test application configuration data. Further details regarding the test application configuration is disclosed in the discussion related to 5350 of method 5000.

At 4008, the group-based communication server 106 accesses the group-based communication repository 107 to modify the test application row that is associated with the third party application that is being built. Further details regarding this modification is provided in the discussion of 5400 of method 5000.

At 4009, the group-based communication server 106 receives, from the third party application provider 102A, a request to install the test application (i.e. the test version of the third party application that is being built). More details regarding this request is provided in the discussion of 5450 of method 5000 and 6100 of method 6000.

At 4010, in response, the group-based communication server 106 sends, to the third party application provider 102A, app installation interface data. In one embodiment, the app installation interface data is configured to cause the third party application provider to render an interactive app installation interface via a display screen. Additional details regarding the interactive app installation interface and the app installation interface data are provided in the discussion of step 6200 of method 6000.

At 4011, the group-based communication server 106 receives, from the third party application provider 102A, a permission authorization. Additional details regarding the permission authorization are provided in the discussion of step 6300 of method 6000.

In response, at 4012, the group-based communication server 106 generates an authorization token. As discussed in step 6400 of method 6000, the authorization token may be the result of an OAuth procedure, the details of which are not shown in FIG. 4A so as not to overcomplicate the diagram. However, additional details regarding the authorization token are provided in the discussion of step 6400 of method 6000.

At 4013, the group-based communication server 106 sends, to the group-based communication repository 107 the authorization token for storing. Additional details regarding the storing of the authorization token are provided in the discussion of step 6400 of method 6000.

At 4014, the group-based communication server 106 generates installed test application data. Additional details regarding the installed test application data are provided in the discussion of step 6500 of method 6000.

At 4015, the group-based communication server 106 sends the installed test application data to the group-based communication repository 107 for storing. Additional details regarding this feature are provided in the discussion of step 6500 of method 6000.

At 4016, the group-based communication server 106 receives, from the third party application provider 102A, a request to convert the test application into a blueprint application. Additional details regarding the request are provided in the discussions of step 5550 of method 5000 and step 7100 of method 7000.

At 4017 and 4018, the group-based communication server 106 accesses the group-based communication repository 107 to retrieve a test application row data. The test application row data corresponds to the test application associated with the received request to convert the test application into a blueprint application. Additional details regarding the test application row data and how it is used may be found in the discussion of step 7200 of method 7000.

At 4019, the group-based communication server 106 replicates the test application row to generate a blueprint row. Additional details and context regarding this replication step are provided in the discussion of step 7200 of method 7000.

At 4020, the group-based communication server 106 replicates the test application row to generate a blueprint row. Additional details and context regarding this replication step are provided in the discussion of step 7200 of method 7000.

At 4021, the group-based communication server 106 stores the blueprint row in the group-based communication repository 107. Additional details and context regarding this storing step are provided in the discussion of step 7300 of method 7000.

At 4022, the group-based communication server 106 receives, from a client device 101A, a request to install a third party application. Additional detail and context regarding an embodiment of the installation request are provided in relation to method 8000, with regards to at least in part step 8100 and the preceding discussion regarding the generation of the installation request that is sent to the group-based communication server 106.

At 4023, in response to receiving the request to install the third party application that is associated with a blueprint row, the group-based communication server 106 generates scope request interface data. Subsequently, at 4024, the group-based communication server 106 sends scope request interface data to client device 101A. Additional details and context regarding this replication step are provided in the discussion of step 8200 of method 8000.

At 4025, the group-based communication server 106 receives from the client device 101A a scope definition object and a user authorization. Additional details and context regarding this replication step are provided in the discussion of step 8300 of method 8000.

At 4026 and 4027, in response to receiving the scope definition object and user authorization, the group-based communication server 106 accesses the group-based communication repository 107 to retrieve a blueprint row. The blueprint row is then used to generate an integration row to be associated with the third party application via a third party application identifier. The steps carried out here are similar to those steps disclosed in the context of step 8500 of method 8000, but they are slightly modified in the embodiment of method 4000 to illustrate the various sequence of steps that may be implemented. This flexibility was previously discussed in the discussion of method 8000.

To generate the blueprint row, the group-based communication server 106 replicates, at 4028, the blueprint row to generate the integration row. In some embodiments, after generating the integration row, the group-based communication server 106 also adds (or appends) other data fields to the integration row to associate it with a particular workspace. For example, the group-based communication server 106 adds a group identifier associated with the workspace where the third party application is being installed. Thus, the integration row associates the installation of the third party application to a specific workspace (hence, it is called an integration application). Other additional data fields include a third party application identifier, an integration row identifier, an identifier for the blueprint application from which the integration row is based, and a plurality of host address identifiers associated with the host addresses that support the functionalities of the integration (these host address identifiers may be in defined or variable form, and the discussion regarding method 7000 is relevant here). In addition, the integration row includes fields (which may hold null values or defined values—depending on whether the group-based communication server 106 has enough information to define such values) for a client identifier, a client server identifier, authorization token, verification token, scope definition object, group name, bot definitions, bot identifier, tokens associated with the bot functionality, etc. An exemplary embodiment of the data fields included in the integration row is shown below, although this particular embodiment includes values for each of the data fields:

```
{
id : 2344567,
*'stencil_app_id' :123456,
'is_communicaton_disabled' : 0,
'is_distributed' : 0,
'payload': has variables where URLs will go,
'client_id' : 44852554851.1234568909,
'client_secref : 98573d651e8fb18ab80f84fj5k2ldk4k,
'verification_token' : Bt0uiVjjGQUywXVu20KlnM19,
'app_id' : A68C9A9AA9,
'app_template_id' : A730KB832F,
"access_token": "xoxp-6050345600-6 ...",
"scope": "bot,commands,incoming-webhook",
"user_id": "U061H1BMX",
"team name": "Your Team Name",
"team_id": "T061GA5HN",
"bot": {
"bot_user_id": "U0663PMA5",
"bot_access_token": xoxb-6207803345-I1blJhLllmmbkb"
}
```

After generating the integration row, the group-based communication server 106 stores the integration row in the group-based communication repository 107 at 4029.

At 4030, the group-based communication server 106 generates a credentials set. The credentials set is associated with the integration of the third party application in the workspace, and the group-based communication server 106 generates it based on the received scope definition object, user authorization, the data stored in the integration row. Subsequently, at 4031, the group-based communication server 106 stores the credentials set in the group-based communication repository 107. In one embodiment, the credentials set is stored in the integration row and, thus, the group-based communication server 106 modifies the integration row at this step.

At 4032, the group-based communication server 106 generates host address interface data. The host address interface data generated at 4032 is similar to the host address interface data discussed with regards to step 8400 of method 8000. Here, as in there, the host address interface data is configured to cause a client device (such as 101A) to render on a display screen an interactive host address request interface. The interactive host address request interface enables user input of at least one host address identification. Further details regarding the interactive host address request interface and the host address identification are provided in the relevant discussion of step 8400 of method 8000. One notable difference of 4032 and step 8400 is that the group-based communication server 106 does not need to generate the credentials set at 4032 like it does at step 8400 because in method 4000, the credentials set is already stored in the group-based communication repository when method 4000 reaches 4032.

At 4033, the group-based communication server 106 sends to the client device 101A, the host address request interface data and credentials set. Here, step 8400 is relevant because the interactive host address request interface that is discussed there is relevant to 4033. Similarly, the host address identification(s) that a user inputs and the various figures discussed there are also relevant to 4033.

At 4034, the group-based communication server 106 receives from the client device 101A host address identification data. Additional details and context regarding the host address identification data provided by the client device 101A, which is based on user input, are provided in the discussions of steps 8400 and 8500 of method 8000. Here, the host address identification data corresponds to the user input provided in, for example, interactive box 16101 of FIG. 15.

At 4035, the group-based communication server 106 accesses the group-based communication repository 107 to modify the integration row. The group-based communication server 106 modifies each of the templatized strings included in the integration row (note that the templatized strings were originally included in the blueprint row). To that end, the group-based communication server transforms the templatized strings into defined host address identifications by modifying the placeholder portion of the host address identifications with the user-submitted host address identifications.

At 4036, the client device 101A sends to the third party application provider the credentials set associated with the integration of the third party application. This step may be the result of a re-directing process initiated by the group-based communication server 106. In that embodiment, the client device 101A is re-directed to the proper network endpoint where the third party application expects to receive the payload object comprising the credentials set. In an alternative embodiment, the signal involved in step 4036 may originate from the group-based communication server 106 such that the group-based communication server 106, and not the client device 101A, sends the credentials set to the third party provider. In yet another embodiment, the client device itself navigates to the correct network endpoint where the third party provider expects the payload object comprising the credentials set. In this embodiment, the interactive host address request interface discussed with relation to 4032-4034 and step 8400 may be used to display instructions via a display screen of client device 101A. Additionally, the embodiments discussed with regards to step 8400 for providing the credentials set to the third party application are applicable to 4036 as well.

At 4037, the third party application provider, in response to receiving the credentials set, then uploads the credentials set so as to configure the portions of the third party application that are implemented in the third party application provider. The credentials may be necessary, for example, to authenticate the integration of the third party application within a workspace of the group-based communication system 105. Further, the credentials are used to establish a connection between the third party provider and the group-based communication system 105 so as to support the integration of the third party application in the group-based communication system 105.

In other embodiments, the third party application provider may, instead of uploading the credentials, perform any other necessary manipulations with or to the credentials in order to support the required functionalities associated with the third party application.

At 4038, 4039, and 4040, the group-based communication server 106 initiates a process to establish a communication link with the host addresses specified by the host address identifications included in the integration row. FIG. 4C depicts the connections with a dashed line because the communication links may be established with any of the third party application provider 102A, a client device 101A, another off-site server, or any combination of these. The specific network endpoint(s) with which the group-based communication server 106 establishes a connection varies and ultimately depends on the user input provided in the interactive host address request interface.

In one embodiment, to carry out any of 4038, 4039 or 4040, the group-based communication server 106 may first send, to each of the host addresses specified by the host address identifications included in the integration row, a message comprising a communication request. In one embodiment, the group-based communication server 106 sends the communication request as a response to receiving a user input comprising a submission of configuration data.

To provide further context, with reference to FIG. 15, the interactive host address request interface enables a user to provide various host address identifications and to save the input data by activating actuator button 16102. Similarly, an interactive integration configuration interface, such as that embodied by FIG. 18, provides a similar function and a similar actuator button for saving the input data. When a user activates one of the actuator buttons for saving the input data, such as those provided in FIGS. 15 and 18, then the group-based communication server 106 sends an HTTPS request to the host addresses specified by the user. The HTTPS includes the client secret and the verification token in order to authenticate the source of the communication request. In some embodiments, the third party application provider uses the client secret and/or the verification token sent at 4036 to confirm whether the data matches those data items received as part of the credentials set received at 4038. If the data items match, then the third party application provider validates the communication request and sends, in response and via an HTTPS response, the client secret and the verification token to the group-based communication server 106.

In response to each message comprising a communication request, the group-based communication server 106 may thus receive a message comprising a communication response, which confirms for the group-based communication server 106 that the host addresses specified by the host address identifications are available and may be reached (i.e. data could be sent to and received from the hosts). It is also possible for the group-based communication server to not receive a message comprising a communication response. In that case, the group-based communication server would determine that the host address from which it received no response is not available and/or unreachable. The embodiments shown in FIGS. 17 and 19, which were discussed in the context of method 8000, are relevant to this discussion because there, the group-based communication system 105 may indicate that a communication link has been successfully established or that a communication link is invalid.

To illustrate one embodiment of carrying out 4038, 4039, and 4040, the group-based communication server first sends a message comprising an HTTP request to a URL specified by at least one of the host address identifications included in the integration row. Subsequently, and in response to sending the HTTP request, the group-based communication server may receive an HTTP response. In such a scenario, the group-based communication system 105 has established a successful communication link and displays a confirmation for the user such as via the interactive integration configuration interface (as shown in FIGS. 17 and 19). On the other hand, The group-based communication server may not receive any messages as a response of sending the HTTP request. In such a scenario, the group-based communication system 105 has found an error in the communication link and displays an error message for the user such as via the interactive integration configuration interface (as shown in FIGS. 17 and 19).

At optional step 4041, the third party application provider sends a confirmation and redirect URL to client device 101A. The confirmation is an indication that the communication link(s) has been established with the group-based communication server 106 to support all relevant functions of the integration of the third party application. In this embodiment, the third party application provider also sends a re-direct host address identification (i.e. a URL) to the client device 101A to re-direct the client device 101A to a network endpoint associated with the group-based communication server.

At 4042, the group-based communication server 106 generates integration configuration interface data. The previous discussions relating to FIG. 18 and the interactive integration configuration interface shown there provide additional detail and context regarding this step 4042.

At 4043, the client device 101A accesses the integration configuration endpoint associated with the group-based communication server. Note that the specific sequence of steps may be altered such that 4043 could occur before 4042 but after 4041.

At 4044, the group-based communication server 106 sends to the client device 101A the integration configuration interface data. Again, the discussion relating to FIG. 18 and the interactive integration configuration interface shown there provides additional detail and context regarding 4044.

At 4045, the group-based communication server 106 receives an internal configuration save request from the client device 101A. In response, the group-based communication server 106 may modify the integration row associated with the integration of the third party application to reflect any changes effectuated via the interactive integration configuration interface.

At 4046, the group-based communication server 106 sends a redirect host address identification (e.g. a URL) to the client device 101A. At 4047, the client device 101A accesses a network endpoint corresponding to the app directory listing of the third party application associated with the integration and the integration configuration interface of steps 4043-4045. At 4048, the group-based communication server 106 sends to the client device the data associated with the network endpoint corresponding to the app directory listing. In one embodiment accessing the network endpoint corresponding to the app directory listing of the third party application causes the client device 101A to render via a display screen the interactive integration configuration interface such as that depicted in FIG. 18. In this embodiment, the group-based communication server 106 sends to the client device 101A integration configuration data.

Figure 4A:
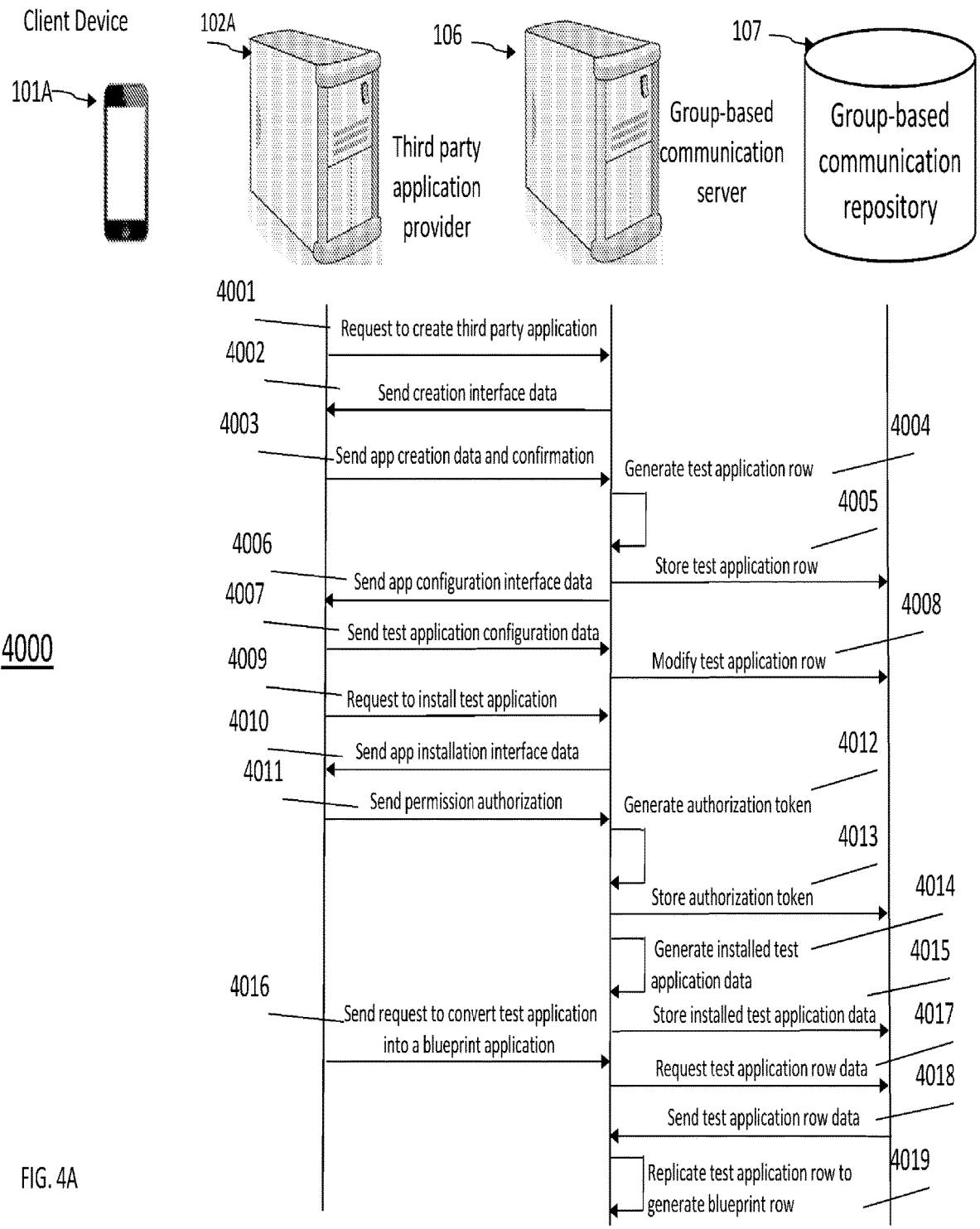
Figure 4B:
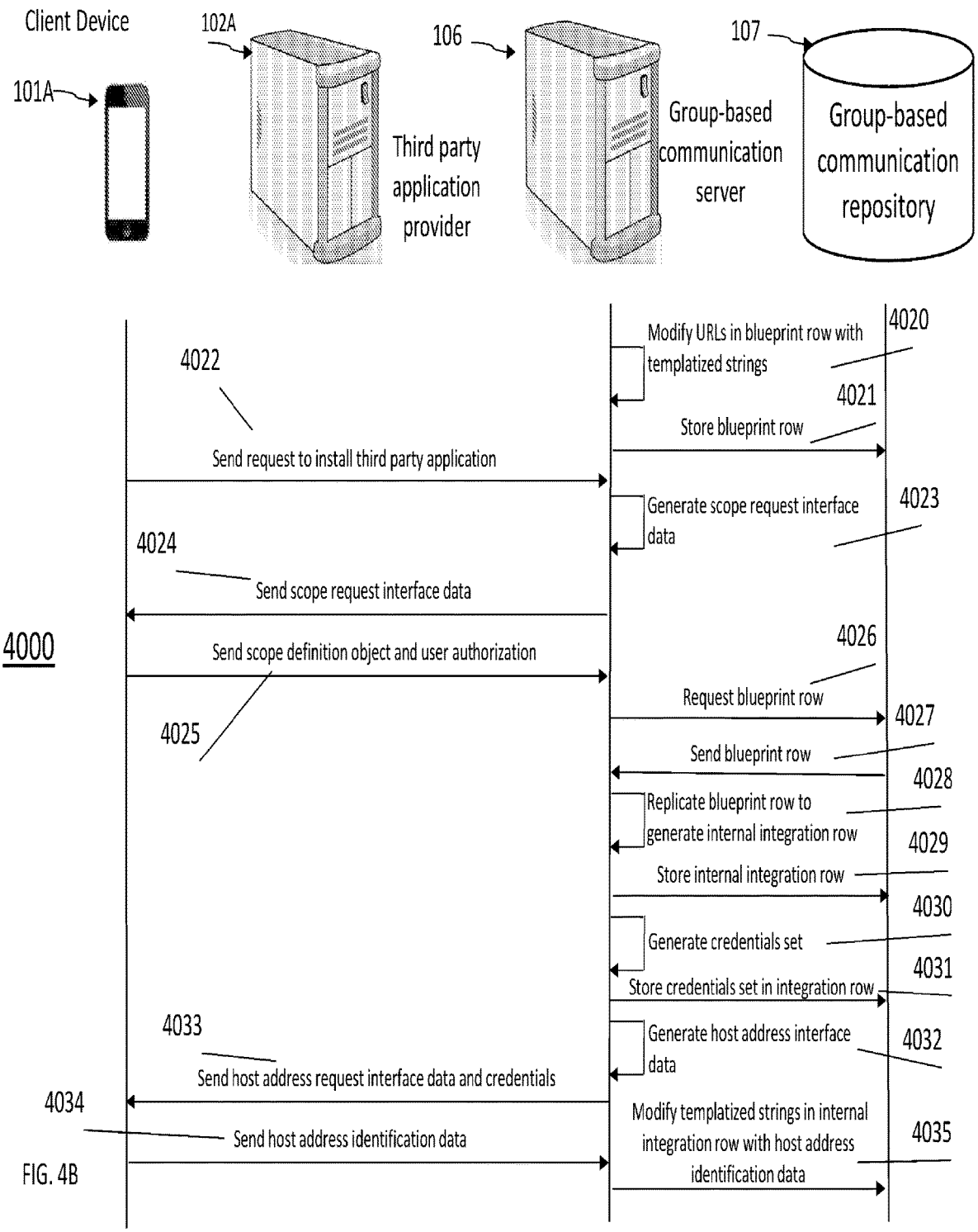
Figure 4C:
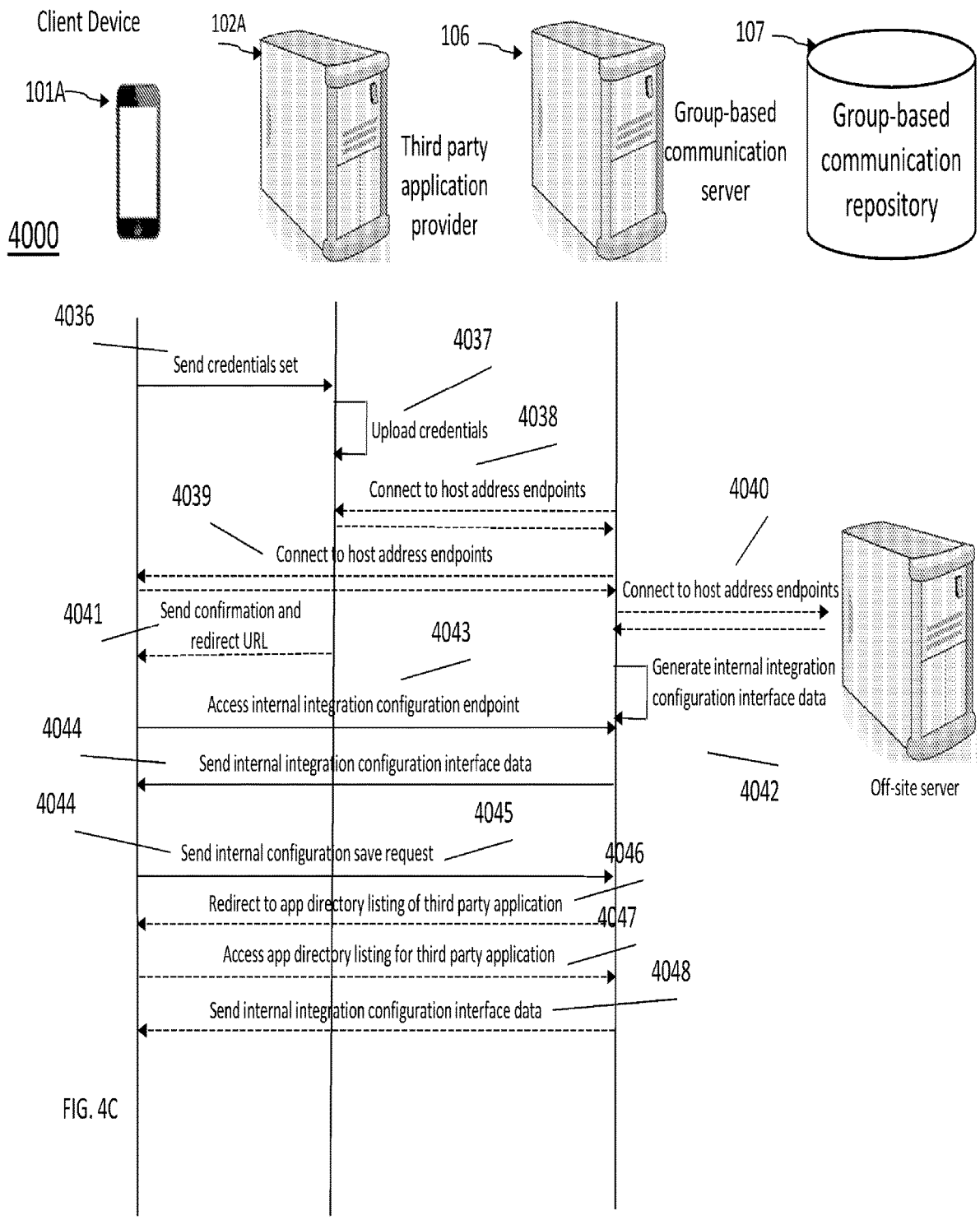
Figure 4D:
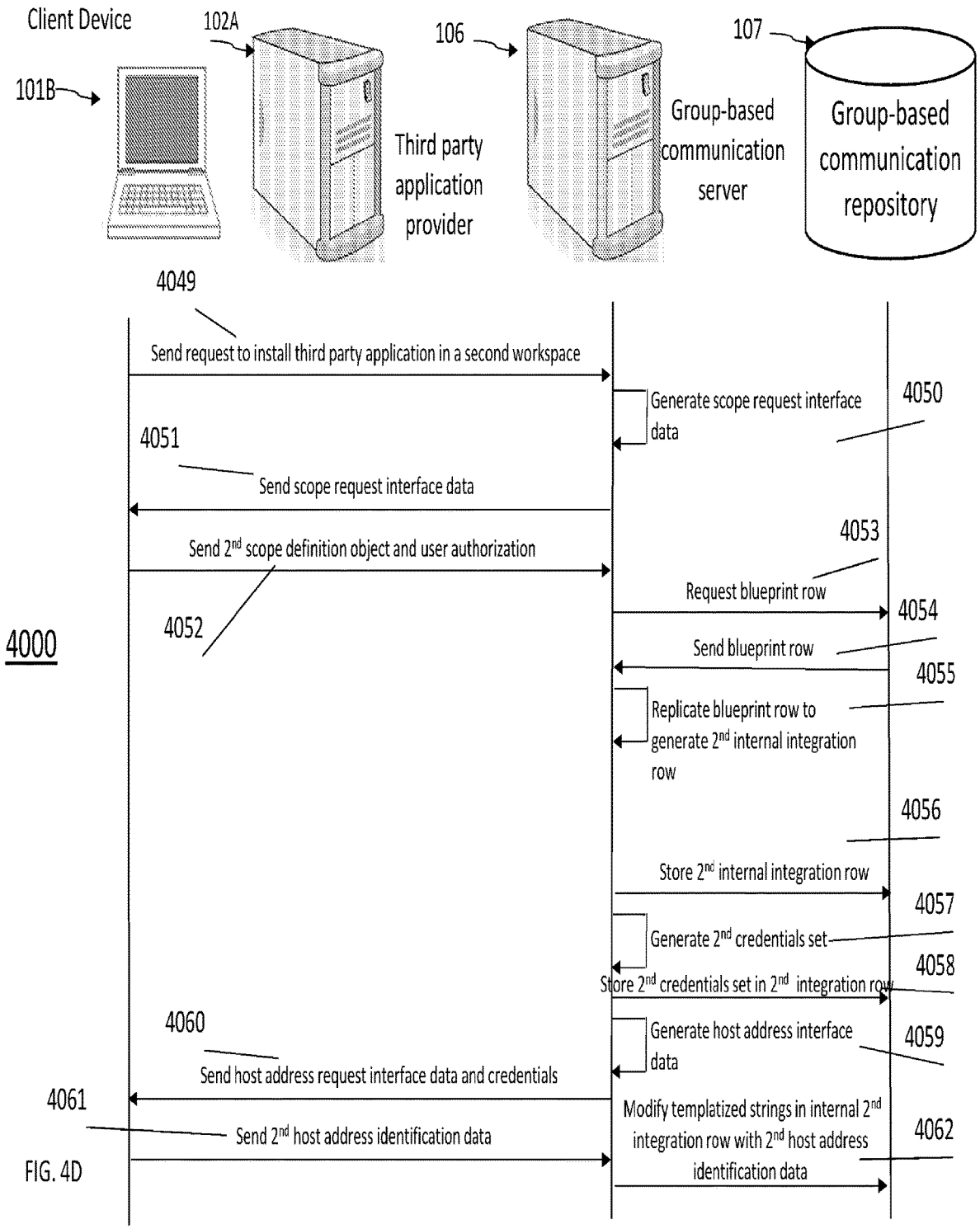
Figure 4E:
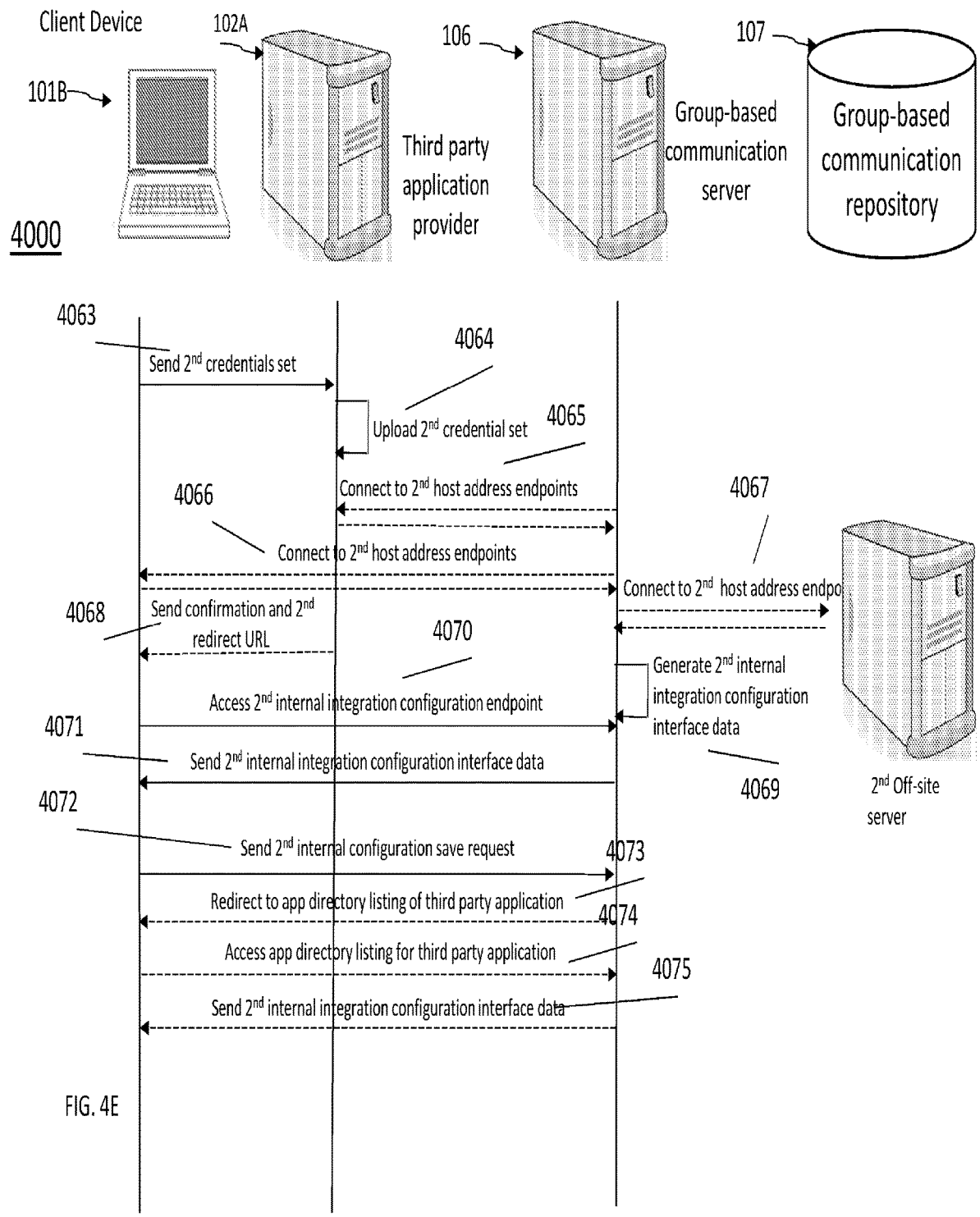

FIGS. 4D-4E and corresponding steps 4049-4075 are similar to previously discussed steps for FIGS. 4A-4C, and the similarities should be apparent upon looking at the figures. This disclosure will not repeat the minutiae of each step so as not to overextend the length of this document. However, FIGS. 4D-4E illustrate some important features of the disclosed invention and those features are highlighted herein. At 4049, a second user, belonging to a second workspace and using a second client device 101B, sends to the group-based communication server 106 a request to install the third party application in the second workspace. The subsequent steps are similar to the steps that the system executes after step 4022, although now the steps involve a second workspace and a second integration. However, some important features include, for example, step 4053-4055. There, the group-based communication server utilizes the same blueprint row as is utilized for steps 4026 and 4027. This means that the same blueprint row serves as the reference from which both, the first and second integration rows are generated. This feature is important because the final values of the first and second integration rows are different (such as in steps 4062 and 4035). The two integration rows correspond to two different integrations of the same third party application in the group-based communication system 105, where the two integrations are associated with two differing users, two differing workspaces, and two differing sets of host address identifications. In the end, as shown in 4065-4067, the group-based communication server 106 must establish a connection to a second set of host address endpoints, which are different from the host address endpoints of steps 4038-4040.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable storage media storing computer-executable instructions that, when executed by at least one processor, perform a method of adding a third-party application to a group-based communication channel of a group-based communication system, the method comprising:

receiving a request to install the third-party application in the group-based communication channel of the group-based communication system;

generating a host address descriptor for the third-party application, wherein the host address descriptor comprises at least one placeholder for replacement to identify one or more selected communication channels to host the third-party application;
receiving at least one host address identification for the third-party application;
receiving authorization of defined scopes for the third-party application; and
configuring the third-party application to be available for use in the one or more selected communication channels to host the third-party application based on the defined scopes for the third-party application by substituting the at least one placeholder with the at least one host address identification for the third-party application.

2. The one or more non-transitory computer-readable storage media of claim 1, the method further comprising including the third-party application in an application directory comprising a plurality of third-party applications available to be installed within the group-based communication channel of the group-based communication system.

3. The one or more non-transitory computer-readable storage media of claim 1, the method further comprising:
causing for display the defined scopes for the third-party application and a user input; and
upon selection of the user input, the defined scopes for the third-party application are accepted, and the third-party application is installed in the group-based communication channel of the group-based communication system.

4. The one or more non-transitory computer-readable storage media of claim 1, wherein the defined scopes for the third-party application comprise permissions for using the third-party application that must be accepted before the third-party application is installed.

5. The one or more non-transitory computer-readable storage media of claim 1, the method further comprising providing, in the one or more selected communication channels to host the third-party application, an indication that the third-party application is available for use in the one or more selected communication channels to host the third-party application.

6. The one or more non-transitory computer-readable storage media of claim 1, the method further comprising, upon receiving the request, requesting additional credentials of an administrator to install the third-party application.

7. The one or more non-transitory computer-readable storage media of claim 1, the method further comprising establishing, by the at least one host address identification, a communication link between a group-based communication server and a third-party application provider for installing the third-party application.

8. A method of adding a third-party application to a group-based communication channel of a group-based communication system, the method comprising:
receiving a request to install the third-party application in the group-based communication channel of the group-based communication system;
generating a host address descriptor for the third-party application, wherein the host address descriptor comprises at least one placeholder for replacement to identify one or more selected communication channels to host the third-party application;
receiving at least one host address identification for the third-party application;
receiving authorization of defined scopes for the third-party application; and
configuring the third-party application to be available for use in the one or more selected communication channels to host the third-party application based on the defined scopes for the third-party application by substituting the at least one placeholder with the at least one host address identification for the third-party application.

9. The method of claim 8, further comprising including the third-party application in an application directory comprising a plurality of third-party applications available to be installed within the group-based communication channel of the group-based communication system.

10. The method of claim 8, further comprising:
causing for display the defined scopes for the third-party application and a user input; and
upon selection of the user input, the defined scopes for the third-party application are accepted, and the third-party application is installed in the group-based communication channel of the group-based communication system.

11. The method of claim 8, wherein the defined scopes for the third-party application comprise permissions for using the third-party application that must be accepted before the third-party application is installed.

12. The method of claim 8, further comprising providing, in the one or more selected communication channels to host the third-party application, an indication that the third-party application is available for use in the one or more selected communication channels to host the third-party application.

13. The method of claim 8, further comprising, upon receiving the request, requesting additional credentials of an administrator to install the third-party application.

14. The method of claim 8, further comprising establishing, by the at least one host address identification, a communication link between a group-based communication server and a third-party application provider for installing the third-party application.

15. A system for adding a third-party application to a group-based communication channel of a group-based communication system, the system comprising:
at least one processor; and
one or more non-transitory computer-readable storage media storing computer-executable instructions that, when executed by the at least one processor, perform a method of adding the third-party application to the group-based communication channel of the group-based communication system, the method comprising:
receiving a request to install the third-party application in the group-based communication channel of the group-based communication system;
generating a host address descriptor for the third-party application, wherein the host address descriptor comprises at least one placeholder for replacement to identify one or more selected communication channels to host the third-party application;
receiving at least one host address identification for the third-party application;
receiving authorization of defined scopes for the third-party application; and
configuring the third-party application to be available for use in the one or more selected communication channels to host the third-party application based on the defined scopes for the third-party application by substituting the at least one placeholder with the at least one host address identification for the third-party application.

16. The system of claim 15, the method further comprising including the third-party application in an application directory comprising a plurality of third-party applications available to be installed within the group-based communication channel of the group-based communication system.

17. The system of claim 15, the method further comprising:
   causing for display the defined scopes for the third-party application and a user input; and
   upon selection of the user input, the defined scopes for the third-party application are accepted, and the third-party application is installed in the group-based communication channel of the group-based communication system.

18. The system of claim 15, wherein the defined scopes for the third-party application comprise permissions for using the third-party application that must be accepted before the third-party application is installed.

19. The system of claim 15, the method further comprising providing, in the one or more selected communication channels to host the third-party application, an indication that the third-party application is available for use in the one or more selected communication channels to host the third-party application.

20. The system of claim 15, the method further comprising, upon receiving the request, requesting additional credentials of an administrator to install the third-party application.

* * * * *